US012483185B2

(12) United States Patent
Moss et al.

(10) Patent No.: US 12,483,185 B2
(45) Date of Patent: Nov. 25, 2025

(54) TORQUE ACTUATED RAIL ASSEMBLY

(71) Applicant: RMH TECH LLC, Colorado Springs, CO (US)

(72) Inventors: Jonathon Moss, Grandview, TX (US); Nikolaus Jo Holley, Colorado Springs, CO (US); Dustin M. M. Haddock, Colorado Springs, CO (US); Robert M. M. Haddock, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 18/690,529

(22) PCT Filed: Sep. 9, 2022

(86) PCT No.: PCT/US2022/043045
§ 371 (c)(1),
(2) Date: Mar. 8, 2024

(87) PCT Pub. No.: WO2023/039155
PCT Pub. Date: Mar. 16, 2023

(65) Prior Publication Data

US 2024/0380356 A1 Nov. 14, 2024

Related U.S. Application Data

(60) Provisional application No. 63/242,326, filed on Sep. 9, 2021.

(51) Int. Cl.
*F16M 11/16* (2006.01)
*H02S 20/22* (2014.01)

(52) U.S. Cl.
CPC .................................... *H02S 20/22* (2014.12)

(58) Field of Classification Search
CPC .. H02S 20/22; H02S 20/24; F24S 2025/6007; F24S 25/65; F24S 2025/807; F24S 25/35;
(Continued)

(56) References Cited

U.S. PATENT DOCUMENTS 42,992 A 5/1864 Howe
97,316 A 11/1869 Rogers
(Continued)

FOREIGN PATENT DOCUMENTS

AT 13076 8/1903
AT 26329 11/1906
(Continued)

OTHER PUBLICATIONS

"6 Pcs Solar Panel Mid Clamps, Aluminum Solar Panel Brackets Roof Solar Mid Clamp Mounting Accessories Solar Mid Clamp for Solar Panel Mounting," Amazon, Feb. 14, 2023, 6 pages [retrieved online Mar. 27, 2024 from: tinyurl.com/45tunvth].
(Continued)

*Primary Examiner* — Amy J. Sterling
(74) *Attorney, Agent, or Firm* — Sheridan Ross P.C.

(57) ABSTRACT

A system to connect a structure, such as a photovoltaic module, to a rib of a metal panel of a building surface. The system includes a torque actuated rail assembly comprises a lag clip or a lag foot and a rail. The lag clip or lag foot includes a lag catch and an aperture to receive a fastener to selectively couple the lag clip or lag foot to the rib. The rail includes a hook. When the rail is in a first configuration, the rail is disengaged from the lag clip or lag foot. When a force is applied to the rail, it transitions to a second configuration in which the hook is coupled to the catch and the rail is engaged to the lag clip or lag foot.

20 Claims, 23 Drawing Sheets

(58) Field of Classification Search
CPC ....... F24S 25/615; F24S 25/636; Y02B 10/10; Y02E 10/50
See application file for complete search history.

(56) References Cited

U.S. PATENT DOCUMENTS

| | | | |
|---|---|---|---|
| 106,580 | A | 8/1870 | Hathorn |
| 189,431 | A | 4/1877 | Creighton |
| 224,608 | A | 2/1880 | Rendle |
| 250,580 | A | 12/1881 | Rogers |
| 332,413 | A | 12/1885 | List |
| 386,316 | A | 7/1888 | Hawthorne |
| 405,605 | A | 6/1889 | Sagendorph |
| 407,772 | A | 7/1889 | Curtis et al. |
| 446,217 | A | 2/1891 | Dickelman |
| 459,876 | A | 9/1891 | Powers |
| 472,014 | A | 3/1892 | Densmore |
| 473,512 | A | 4/1892 | Laird |
| 491,173 | A | 2/1893 | Hayward |
| 507,776 | A | 10/1893 | Berger et al. |
| 529,774 | A | 11/1894 | Baird |
| 602,983 | A | 4/1898 | Folsom |
| 733,697 | A | 7/1903 | Chronik |
| 756,884 | A | 4/1904 | Parry |
| 831,445 | A | 9/1906 | Kosmatka |
| 881,757 | A | 3/1908 | Winsor |
| 884,850 | A | 4/1908 | Peter |
| 927,522 | A | 7/1909 | Gery |
| 933,784 | A | 9/1909 | Peter |
| 939,516 | A | 11/1909 | Laird |
| 942,693 | A | 12/1909 | Wintermute |
| 1,054,091 | A | 2/1913 | Darnall |
| 1,085,474 | A | 1/1914 | Peterson |
| 1,136,460 | A | 4/1915 | Wright |
| 1,230,363 | A | 6/1917 | Baird |
| 1,279,669 | A | 9/1918 | Deming |
| 1,330,309 | A | 2/1920 | Dixon |
| 1,399,461 | A | 12/1921 | Childs |
| 1,463,065 | A | 7/1923 | Sieger |
| 1,465,042 | A | 8/1923 | Hruska |
| 1,511,529 | A | 10/1924 | Standlee |
| 1,620,428 | A | 3/1927 | Becker |
| 1,681,830 | A | 8/1928 | White |
| 1,723,166 | A | 8/1929 | Hayman |
| 1,735,927 | A | 11/1929 | Shaffer |
| 1,735,937 | A | 11/1929 | Shaffer |
| 1,780,852 | A | 11/1930 | Sullivan |
| 1,794,976 | A | 3/1931 | Mueller |
| 1,812,009 | A | 6/1931 | Lenke |
| 1,893,481 | A | 1/1933 | Adams |
| 1,946,862 | A | 2/1934 | Koch, Jr. |
| 1,957,933 | A | 5/1934 | Brandl |
| 2,022,541 | A | 11/1935 | Faistenhammer |
| 2,079,768 | A | 5/1937 | Levow |
| 2,150,497 | A | 3/1939 | Fernberg |
| 2,183,008 | A | 12/1939 | Camp |
| 2,183,844 | A | 12/1939 | Murphy |
| 2,192,720 | A | 3/1940 | Tapman |
| 2,201,320 | A | 5/1940 | Place |
| 2,243,322 | A | 5/1941 | Uum |
| 2,250,401 | A | 7/1941 | Sylvester |
| 2,274,010 | A | 2/1942 | Stellin |
| 2,340,692 | A | 2/1944 | Ridd |
| 2,356,833 | A | 8/1944 | Doe |
| 2,429,833 | A | 10/1947 | Luce |
| 2,443,362 | A | 6/1948 | Tinnerman |
| 2,448,752 | A | 9/1948 | Wagner |
| 2,457,250 | A | 12/1948 | Macomber |
| 2,472,586 | A | 6/1949 | Harvey |
| 2,504,776 | A | 4/1950 | Woodfield et al. |
| 2,525,217 | A | 10/1950 | Glitsch |
| 2,574,007 | A | 11/1951 | Anderson |
| 2,658,247 | A | 11/1953 | Heuer |
| 2,714,037 | A | 7/1955 | Singer et al. |
| 2,730,381 | A | 1/1956 | Curtiss |
| RE24,133 | E | 3/1956 | Bloedow |
| 2,740,027 | A | 3/1956 | Budd et al. |
| 2,808,491 | A | 10/1957 | Rhee et al. |
| 2,810,173 | A | 10/1957 | Bearden |
| 2,875,805 | A | 3/1959 | Flora |
| 2,985,174 | A | 5/1961 | Guth |
| 2,997,763 | A | 8/1961 | Serfass |
| 3,039,161 | A | 6/1962 | Gagnon |
| 3,064,772 | A | 11/1962 | Clay |
| 3,095,672 | A | 7/1963 | Di Tullio |
| 3,112,016 | A | 11/1963 | Peterson |
| 3,136,206 | A | 6/1964 | Adams |
| 3,194,524 | A | 7/1965 | Trumbull |
| 3,208,119 | A | 9/1965 | Seckerson |
| 3,221,467 | A | 12/1965 | Henkels |
| 3,231,076 | A | 1/1966 | Frieman |
| 3,232,393 | A | 2/1966 | Attwood |
| 3,232,573 | A | 2/1966 | Berman |
| 3,242,620 | A | 3/1966 | Kaiser |
| 3,247,316 | A | 4/1966 | Weimer, Jr. |
| 3,269,075 | A | 8/1966 | Marini et al. |
| 3,288,409 | A | 11/1966 | Bethea, Jr. |
| 3,296,750 | A | 1/1967 | Zaleski |
| 3,298,653 | A | 1/1967 | Omholt |
| 3,300,935 | A | 1/1967 | Giorgio |
| 3,301,513 | A | 1/1967 | Masao |
| 3,307,235 | A | 3/1967 | Hennings |
| 3,318,057 | A | 5/1967 | Norsworthy |
| 3,333,799 | A | 8/1967 | Peterson |
| 3,335,995 | A | 8/1967 | Pickles |
| 3,341,909 | A | 9/1967 | Havener |
| 3,363,864 | A | 1/1968 | Olgreen |
| 3,394,524 | A | 7/1968 | Howarth |
| 3,411,190 | A | 11/1968 | Augier |
| 3,411,252 | A | 11/1968 | Boyle, Jr. |
| 3,425,127 | A | 2/1969 | Long |
| 3,482,369 | A | 12/1969 | Burke |
| 3,495,363 | A | 2/1970 | Johnson |
| 3,496,691 | A | 2/1970 | Seaburg et al. |
| 3,503,244 | A | 3/1970 | Joslin |
| 3,523,709 | A | 8/1970 | Heggy et al. |
| 3,527,619 | A | 9/1970 | Miley |
| 3,528,050 | A | 9/1970 | Hindenburg |
| 3,565,380 | A | 2/1971 | Langren |
| 3,572,623 | A | 3/1971 | Lapp |
| 3,590,543 | A | 7/1971 | Heirich |
| 3,656,747 | A | 4/1972 | Revell, Jr. et al. |
| 3,667,182 | A | 6/1972 | Stemler |
| 3,667,185 | A | 6/1972 | Maurer |
| 3,715,705 | A | 2/1973 | Kuo |
| 3,719,919 | A | 3/1973 | Tibolla |
| 3,753,326 | A | 8/1973 | Kaufman, Sr. |
| D229,392 | S | 11/1973 | Faust |
| 3,778,537 | A | 12/1973 | Miller |
| D229,743 | S | 1/1974 | Moore |
| 3,792,560 | A | 2/1974 | Naylor |
| 3,809,799 | A | 5/1974 | Taylor |
| 3,810,069 | A | 5/1974 | Jaconette, Jr. |
| 3,817,270 | A | 6/1974 | Ehrens et al. |
| 3,824,664 | A | 7/1974 | Seeff |
| 3,845,601 | A | 11/1974 | Kostecky |
| 3,861,098 | A | 1/1975 | Schaub |
| 3,864,789 | A | 2/1975 | Leitner |
| 3,904,161 | A | 9/1975 | Scott |
| 3,914,001 | A | 10/1975 | Nelson et al. |
| 3,921,253 | A | 11/1975 | Nelson |
| 3,934,385 | A | 1/1976 | Paulus |
| 3,960,352 | A | 6/1976 | Plattner et al. |
| 3,964,149 | A | 6/1976 | Hugh |
| 3,965,540 | A | 6/1976 | Moore |
| 3,986,746 | A | 10/1976 | Chartier |
| 3,998,018 | A | 12/1976 | Hodges |
| 4,001,474 | A | 1/1977 | Hereth |
| 4,007,574 | A | 2/1977 | Riddell |
| 4,018,538 | A | 4/1977 | Smyrni et al. |
| 4,034,532 | A | 7/1977 | Reinwall, Jr. |
| 4,043,579 | A | 8/1977 | Meyer |
| 4,051,289 | A | 9/1977 | Adamson |
| 4,084,289 | A | 4/1978 | Naimo |

(56) References Cited

U.S. PATENT DOCUMENTS

| | | | |
|---|---|---|---|
| 4,100,709 | A | 7/1978 | Good |
| 4,127,975 | A | 12/1978 | Judkins |
| 4,130,970 | A | 12/1978 | Cable |
| 4,132,390 | A | 1/1979 | Pfarr, Jr. |
| 4,141,182 | A | 2/1979 | McMullen |
| 4,147,257 | A | 4/1979 | Zippel |
| 4,162,595 | A | 7/1979 | Ramos et al. |
| 4,162,755 | A | 7/1979 | Bott |
| 4,189,882 | A | 2/1980 | Harrison et al. |
| 4,189,891 | A | 2/1980 | Johnson et al. |
| 4,200,107 | A | 4/1980 | Reid |
| 4,203,646 | A | 5/1980 | Desso et al. |
| 4,203,648 | A | 5/1980 | Seidler |
| 4,213,282 | A | 7/1980 | Heckelsberg |
| 4,215,677 | A | 8/1980 | Erickson |
| 4,223,053 | A | 9/1980 | Brogan |
| 4,223,667 | A | 9/1980 | Paymal |
| 4,252,458 | A | 2/1981 | Keen |
| 4,261,338 | A | 4/1981 | McAlister |
| 4,261,384 | A | 4/1981 | Dahlbring |
| 4,263,474 | A | 4/1981 | Tennant |
| 4,270,721 | A | 6/1981 | Mainor, Jr. |
| 4,280,484 | A | 7/1981 | Mancosu |
| 4,291,934 | A | 9/1981 | Kund |
| 4,296,530 | A | 10/1981 | Muller et al. |
| 4,307,976 | A | 12/1981 | Butler |
| 4,321,416 | A | 3/1982 | Tennant |
| 4,351,140 | A | 9/1982 | Simpson |
| 4,358,916 | A | 11/1982 | Lacasse |
| 4,366,656 | A | 1/1983 | Simpson |
| 4,393,859 | A | 7/1983 | Marossy et al. |
| 4,406,505 | A | 9/1983 | Avramovich |
| 4,449,335 | A | 5/1984 | Fahey |
| 4,456,321 | A | 6/1984 | Jones et al. |
| 4,461,514 | A | 7/1984 | Schwarz |
| 4,467,582 | A | 8/1984 | Hague |
| 4,475,776 | A | 10/1984 | Teramachi |
| D277,934 | S | 3/1985 | Beckrot |
| 4,546,586 | A | 10/1985 | Knudson |
| 4,560,224 | A | 12/1985 | Weisenburger |
| 4,567,706 | A | 2/1986 | Wendt |
| 4,570,405 | A | 2/1986 | Knudson |
| 4,588,240 | A | 5/1986 | Ruehl et al. |
| 4,593,877 | A | 6/1986 | van der Wyk |
| 4,601,600 | A | 7/1986 | Karlsson |
| 4,649,684 | A | 3/1987 | Petree et al. |
| 4,656,794 | A | 4/1987 | Thevenin et al. |
| 4,666,116 | A | 5/1987 | Lloyd |
| 4,669,808 | A | 6/1987 | Owen |
| 4,674,252 | A | 6/1987 | Nicholas et al. |
| 4,682,454 | A | 7/1987 | Simpson |
| 4,686,809 | A | 8/1987 | Skelton |
| 4,701,586 | A | 10/1987 | Hagberg |
| 4,704,058 | A | 11/1987 | Crunwell |
| 4,753,425 | A | 6/1988 | Yang |
| 4,773,791 | A | 9/1988 | Hartkorn |
| 4,782,642 | A | 11/1988 | Conville |
| 4,799,444 | A | 1/1989 | Lisowski |
| 4,805,364 | A | 2/1989 | Smolik |
| 4,809,476 | A | 3/1989 | Satchell |
| 4,810,573 | A | 3/1989 | Harriett |
| 4,835,927 | A | 6/1989 | Michlovic |
| 4,840,529 | A | 6/1989 | Phillips |
| 4,848,858 | A | 7/1989 | Suzuki |
| 4,854,096 | A | 8/1989 | Smolik |
| 4,864,081 | A | 9/1989 | Bates |
| D304,421 | S | 11/1989 | Holdaway |
| 4,878,331 | A | 11/1989 | Taylor |
| 4,883,397 | A | 11/1989 | Dubost |
| 4,895,338 | A | 1/1990 | Froutzis |
| 4,901,963 | A | 2/1990 | Yoder |
| 4,901,964 | A | 2/1990 | McConnell |
| 4,905,444 | A | 3/1990 | Semaan |
| 4,909,011 | A | 3/1990 | Freeman et al. |
| 4,949,929 | A | 8/1990 | Kesselman et al. |
| 4,961,712 | A | 10/1990 | Schwenk et al. |
| D312,315 | S | 11/1990 | Westphal |
| 4,970,833 | A | 11/1990 | Porter |
| 4,987,699 | A | 1/1991 | Gold |
| 4,991,368 | A | 2/1991 | Amstutz |
| 4,993,959 | A | 2/1991 | Randolph |
| 5,007,612 | A | 4/1991 | Manfre |
| 5,019,111 | A | 5/1991 | Dempsey et al. |
| 5,036,949 | A | 8/1991 | Crocker et al. |
| 5,039,352 | A | 8/1991 | Mueller |
| 5,092,939 | A | 3/1992 | Nath et al. |
| 5,094,435 | A | 3/1992 | Depperman |
| D326,403 | S | 5/1992 | Kleiss |
| 5,118,571 | A | 6/1992 | Petersen |
| 5,119,612 | A | 6/1992 | Taylor et al. |
| 5,125,608 | A | 6/1992 | McMaster et al. |
| 5,127,205 | A | 7/1992 | Eidson |
| 5,138,820 | A | 8/1992 | Pearce |
| 5,140,793 | A | 8/1992 | Knudson |
| 5,152,107 | A | 10/1992 | Strickert |
| 5,154,385 | A | 10/1992 | Lindberg et al. |
| 5,164,020 | A | 11/1992 | Wagner et al. |
| 5,176,462 | A | 1/1993 | Chen |
| 5,187,911 | A | 2/1993 | Cotter |
| 5,209,619 | A | 5/1993 | Rinderer |
| 5,213,300 | A | 5/1993 | Rees |
| 5,222,340 | A | 6/1993 | Bellem |
| 5,224,427 | A | 7/1993 | Riches et al. |
| 5,228,248 | A | 7/1993 | Haddock |
| 5,251,993 | A | 10/1993 | Sigourney |
| 5,268,038 | A | 12/1993 | Riermeier et al. |
| 5,271,194 | A | 12/1993 | Drew |
| 5,277,006 | A | 1/1994 | Ruster |
| 5,282,340 | A | 2/1994 | Cline et al. |
| 5,287,670 | A | 2/1994 | Funaki |
| 5,290,366 | A | 3/1994 | Riermeier et al. |
| 5,307,601 | A | 5/1994 | McCracken |
| 5,312,079 | A | 5/1994 | Little, Jr. |
| 5,313,752 | A | 5/1994 | Hatzinikolas |
| D347,701 | S | 6/1994 | McCracken |
| 5,352,154 | A | 10/1994 | Rotter et al. |
| 5,356,519 | A | 10/1994 | Grabscheid et al. |
| 5,356,705 | A | 10/1994 | Kelch et al. |
| D351,989 | S | 11/1994 | Cline et al. |
| 5,363,615 | A | 11/1994 | Christopher et al. |
| 5,363,624 | A | 11/1994 | Cotter |
| 5,379,567 | A | 1/1995 | Vahey |
| 5,390,453 | A | 2/1995 | Untiedt |
| 5,391,084 | A | 2/1995 | Kreitzman |
| 5,392,574 | A | 2/1995 | Sayers |
| 5,408,797 | A | 4/1995 | Bellem |
| 5,409,549 | A | 4/1995 | Mori |
| 5,413,063 | A | 5/1995 | King |
| 5,413,397 | A | 5/1995 | Gold |
| 5,417,028 | A | 5/1995 | Meyer |
| 5,425,209 | A | 6/1995 | Funaki |
| 5,426,906 | A | 6/1995 | McCracken |
| 5,439,307 | A | 8/1995 | Steinhilber |
| 5,453,027 | A | 9/1995 | Buell et al. |
| D364,338 | S | 11/1995 | Cline |
| 5,479,752 | A | 1/1996 | Menegoli |
| 5,482,234 | A | 1/1996 | Lyon |
| 5,483,772 | A | 1/1996 | Haddock |
| 5,483,782 | A | 1/1996 | Hall |
| 5,491,931 | A | 2/1996 | Haddock |
| 5,497,591 | A | 3/1996 | Nelson |
| 5,511,348 | A | 4/1996 | Cornell |
| 5,522,185 | A | 6/1996 | Cline |
| 5,533,839 | A | 7/1996 | Shimada |
| D372,421 | S | 8/1996 | Cline |
| 5,557,903 | A | 9/1996 | Haddock |
| D375,449 | S | 11/1996 | Dahlberg |
| 5,571,338 | A | 11/1996 | Kadonome et al. |
| 5,596,858 | A | 1/1997 | Jordan |
| 5,596,859 | A | 1/1997 | Horton et al. |
| 5,598,785 | A | 2/1997 | Zaguroli, Jr. |
| 5,600,971 | A | 2/1997 | Suk |
| D378,343 | S | 3/1997 | Macor |
| 5,609,326 | A | 3/1997 | Stearns et al. |

(56) References Cited

U.S. PATENT DOCUMENTS

| | | | |
|---|---|---|---|
| 5,613,328 | A | 3/1997 | Alley |
| 5,634,618 | A | 6/1997 | Farmer, Jr. et al. |
| 5,640,812 | A | 6/1997 | Crowley et al. |
| 5,647,178 | A | 7/1997 | Cline |
| 5,651,837 | A | 7/1997 | Ohtsuka et al. |
| 5,660,008 | A | 8/1997 | Bevilacqua |
| 5,664,750 | A | 9/1997 | Cohen |
| 5,667,181 | A | 9/1997 | van Leeuwen et al. |
| D384,574 | S | 10/1997 | Cox |
| 5,681,191 | A | 10/1997 | Robicheau et al. |
| 5,688,131 | A | 11/1997 | Byfield, Jr. |
| D387,064 | S | 12/1997 | Heine |
| D387,443 | S | 12/1997 | Blankenbiller |
| 5,694,721 | A | 12/1997 | Haddock |
| 5,697,197 | A | 12/1997 | Simpson |
| 5,715,633 | A | 2/1998 | Raz |
| 5,715,640 | A | 2/1998 | Haddock |
| 5,732,513 | A | 3/1998 | Alley |
| 5,743,063 | A | 4/1998 | Boozer |
| 5,743,497 | A | 4/1998 | Michael |
| 5,746,029 | A | 5/1998 | Ullman |
| 5,755,824 | A | 5/1998 | Blechschmidt et al. |
| 5,765,310 | A | 6/1998 | Gold |
| 5,765,329 | A | 6/1998 | Huang |
| 5,787,653 | A | 8/1998 | Sakai et al. |
| 5,794,386 | A | 8/1998 | Klein |
| 5,809,703 | A | 9/1998 | Kelly |
| 5,826,379 | A | 10/1998 | Curry |
| 5,826,390 | A | 10/1998 | Sacks |
| 5,828,008 | A | 10/1998 | Lockwood et al. |
| 5,829,723 | A | 11/1998 | Brunner et al. |
| 5,842,318 | A | 12/1998 | Bass et al. |
| 5,853,296 | A | 12/1998 | Gunther et al. |
| 5,857,301 | A | 1/1999 | Fujita |
| 5,885,118 | A | 3/1999 | Billenstein et al. |
| 5,890,340 | A | 4/1999 | Kafarowski |
| 5,897,088 | A | 4/1999 | Kirschner |
| 5,901,507 | A | 5/1999 | Smeja et al. |
| 5,911,663 | A | 6/1999 | Eidson |
| 5,942,046 | A | 8/1999 | Kahlfuss et al. |
| 5,970,586 | A | 10/1999 | Demel et al. |
| 5,983,588 | A | 11/1999 | Haddock |
| 5,987,714 | A | 11/1999 | Smith |
| 5,994,640 | A | 11/1999 | Bansemir et al. |
| 5,997,368 | A | 12/1999 | Mello et al. |
| 6,029,415 | A | 2/2000 | Culpepper et al. |
| D424,410 | S | 5/2000 | Lodi |
| 6,073,410 | A | 6/2000 | Schimpf et al. |
| 6,073,920 | A | 6/2000 | Colley |
| 6,079,678 | A | 6/2000 | Schott et al. |
| 6,083,010 | A | 7/2000 | Daoud |
| 6,088,979 | A | 7/2000 | Neal |
| 6,095,462 | A | 8/2000 | Morgan |
| 6,099,203 | A | 8/2000 | Landes |
| 6,105,317 | A | 8/2000 | Tomiuchi et al. |
| 6,106,310 | A | 8/2000 | Davis et al. |
| 6,111,189 | A | 8/2000 | Garvison et al. |
| 6,119,317 | A | 9/2000 | Pfister |
| 6,132,070 | A | 10/2000 | Vosika et al. |
| 6,158,180 | A | 12/2000 | Edwards |
| 6,164,033 | A | 12/2000 | Haddock |
| 6,182,403 | B1 | 2/2001 | Mimura et al. |
| 6,186,799 | B1 | 2/2001 | Mello |
| 6,206,991 | B1 | 3/2001 | Starr |
| 6,223,477 | B1 | 5/2001 | Alley |
| 6,237,297 | B1 | 5/2001 | Paroly |
| 6,253,496 | B1 | 7/2001 | Gilchrist |
| 6,256,934 | B1 | 7/2001 | Alley |
| 6,269,596 | B1 | 8/2001 | Ohtsuka et al. |
| 6,276,285 | B1 | 8/2001 | Ruch |
| 6,312,283 | B1 | 11/2001 | Hio |
| 6,320,114 | B1 | 11/2001 | Kuechler |
| 6,336,616 | B1 | 1/2002 | Lin |
| 6,354,045 | B1 | 3/2002 | Boone et al. |
| 6,360,491 | B1 | 3/2002 | Ullman |
| 6,364,262 | B1 | 4/2002 | Gibson et al. |
| 6,364,374 | B1 | 4/2002 | Noone et al. |
| 6,370,828 | B1 | 4/2002 | Genschorek |
| 6,382,569 | B1 | 5/2002 | Schattner et al. |
| 6,385,914 | B2 | 5/2002 | Alley |
| 6,393,796 | B1 | 5/2002 | Goettl et al. |
| 6,443,680 | B1 | 9/2002 | Bodin |
| 6,449,814 | B1 | 9/2002 | Dinsmore |
| 6,453,623 | B1 | 9/2002 | Nelson et al. |
| 6,470,629 | B1 | 10/2002 | Haddock |
| 6,497,080 | B1 | 12/2002 | Malcolm |
| 6,499,259 | B1 | 12/2002 | Hockman |
| 6,508,442 | B1 | 1/2003 | Dolez |
| 6,521,821 | B2 | 2/2003 | Makita et al. |
| 6,534,702 | B1 | 3/2003 | Makita et al. |
| 6,536,166 | B1 | 3/2003 | Alley |
| 6,536,729 | B1 | 3/2003 | Haddock |
| 6,576,830 | B2 | 6/2003 | Nagao et al. |
| 6,588,722 | B2 | 7/2003 | Eguchi |
| 6,602,016 | B2 | 8/2003 | Eckart et al. |
| 6,622,441 | B2 | 9/2003 | Miller |
| 6,637,671 | B2 | 10/2003 | Alley |
| 6,647,671 | B1 | 11/2003 | Alley |
| 6,655,633 | B1 | 12/2003 | Chapman, Jr. |
| 6,665,991 | B2 | 12/2003 | Hasan |
| 6,688,047 | B1 | 2/2004 | McNichol |
| D487,595 | S | 3/2004 | Sherman |
| 6,715,256 | B1 | 4/2004 | Fischer |
| 6,718,718 | B2 | 4/2004 | Haddock |
| 6,725,623 | B1 | 4/2004 | Riddell et al. |
| 6,730,841 | B2 | 5/2004 | Heckeroth |
| 6,732,982 | B1 | 5/2004 | Messinger |
| 6,751,919 | B2 | 6/2004 | Calixto |
| D495,595 | S | 9/2004 | Dressler |
| D496,738 | S | 9/2004 | Sherman |
| 6,799,742 | B2 | 10/2004 | Nakamura et al. |
| 6,834,466 | B2 | 12/2004 | Trevorrow et al. |
| 6,848,230 | B2 | 2/2005 | Kopish |
| 6,918,217 | B2 | 7/2005 | Jakob-Bamberg et al. |
| 6,918,727 | B2 | 7/2005 | Huang |
| 6,922,948 | B2 | 8/2005 | Smeja et al. |
| 6,967,278 | B2 | 11/2005 | Hatsukaiwa et al. |
| D513,171 | S | 12/2005 | Richardson |
| 7,012,188 | B2 | 3/2006 | Erling |
| 7,013,612 | B2 | 3/2006 | Haddock |
| 7,063,763 | B2 | 6/2006 | Chapman, Jr. |
| 7,096,638 | B2 | 8/2006 | Osterland |
| 7,100,338 | B2 | 9/2006 | Haddock |
| 7,104,020 | B1 | 9/2006 | Suttle |
| 7,127,852 | B1 | 10/2006 | Dressler |
| D532,291 | S | 11/2006 | Geers |
| 7,191,794 | B2 | 3/2007 | Hodges |
| 7,195,513 | B1 | 3/2007 | Gherardini |
| 7,219,863 | B1 | 5/2007 | Collett, II |
| D547,262 | S | 7/2007 | Ullman |
| 7,240,770 | B2 | 7/2007 | Mullins et al. |
| 7,260,918 | B2 | 8/2007 | Liebendorfer |
| 7,260,919 | B1 | 8/2007 | Spransy |
| 7,281,695 | B2 | 10/2007 | Jordan |
| 7,386,922 | B1 | 6/2008 | Taylor et al. |
| 7,406,924 | B1 | 8/2008 | Impey |
| 7,410,139 | B1 | 8/2008 | Rorich |
| D576,107 | S | 9/2008 | Sayres |
| 7,431,252 | B2 | 10/2008 | Birli et al. |
| 7,435,134 | B2 | 10/2008 | Lenox |
| 7,451,573 | B2 | 11/2008 | Orszulak et al. |
| 7,458,555 | B2 | 12/2008 | Mastropaolo et al. |
| 7,459,196 | B2 | 12/2008 | Sturm |
| 7,469,511 | B2 | 12/2008 | Wobber |
| 7,493,730 | B2 | 2/2009 | Fennell, Jr. |
| D589,337 | S | 3/2009 | Karlsson |
| 7,513,080 | B1 | 4/2009 | Showalter |
| 7,516,580 | B2 | 4/2009 | Fennell, Jr. |
| 7,568,871 | B2 | 8/2009 | Chopp, Jr. et al. |
| 7,574,839 | B1 | 8/2009 | Simpson |
| 7,578,711 | B2 | 8/2009 | Robinson |
| D600,543 | S | 9/2009 | Coles |
| 7,600,349 | B2 | 10/2009 | Liebendorfer |
| 7,621,090 | B2 | 11/2009 | Kelley |

(56) References Cited

U.S. PATENT DOCUMENTS

| | | | |
|---|---|---|---|
| 7,634,875 | B2 | 12/2009 | Genschorek |
| 7,658,356 | B1 | 2/2010 | Nehls |
| 7,686,625 | B1 | 3/2010 | Dyer et al. |
| 7,703,256 | B2 | 4/2010 | Haddock |
| 7,707,800 | B2 | 5/2010 | Kannisto |
| 7,712,278 | B2 | 5/2010 | Lonardi |
| 7,721,492 | B2 | 5/2010 | Plaisted et al. |
| 7,731,138 | B2 | 6/2010 | Wiesner et al. |
| 7,733,667 | B2 | 6/2010 | Qin et al. |
| 7,758,003 | B2 | 7/2010 | Pourtier et al. |
| 7,758,011 | B2 | 7/2010 | Haddock |
| 7,762,027 | B1 | 7/2010 | Wentworth et al. |
| 7,766,292 | B2 | 8/2010 | Liebendorfer |
| 7,780,472 | B2 | 8/2010 | Lenox |
| 7,788,874 | B2 | 9/2010 | Miller |
| 7,788,879 | B2 | 9/2010 | Brandes et al. |
| 7,824,191 | B1 | 11/2010 | Browder |
| 7,827,920 | B2 | 11/2010 | Beck et al. |
| 7,845,127 | B2 | 12/2010 | Brescia |
| 7,847,181 | B2 | 12/2010 | Brescia |
| 7,861,480 | B2 | 1/2011 | Wendelburg et al. |
| 7,861,485 | B1 | 1/2011 | Wentworth et al. |
| 7,874,117 | B1 | 1/2011 | Simpson |
| 7,891,618 | B2 | 2/2011 | Carnevali |
| 7,895,808 | B1 | 3/2011 | Wentworth et al. |
| 7,905,064 | B1 | 3/2011 | Wentworth et al. |
| 7,915,519 | B2 | 3/2011 | Kobayashi |
| 7,926,777 | B2 | 4/2011 | Koesema, Jr. |
| 7,954,287 | B2 | 6/2011 | Bravo et al. |
| 7,976,257 | B2 | 7/2011 | Kufner et al. |
| 7,988,464 | B2 | 8/2011 | Kossak et al. |
| 8,011,153 | B2 | 9/2011 | Orchard |
| 8,066,200 | B2 | 11/2011 | Hepner et al. |
| 8,070,119 | B2 | 12/2011 | Taylor |
| 8,092,129 | B2 | 1/2012 | Wiley et al. |
| 8,096,503 | B2 | 1/2012 | Verweyen |
| 8,099,837 | B2 | 1/2012 | Santlin et al. |
| D653,611 | S | 2/2012 | Lee |
| D653,940 | S | 2/2012 | Yasher |
| 8,109,048 | B2 | 2/2012 | West |
| 8,146,299 | B2 | 4/2012 | Stearns et al. |
| 8,151,522 | B2 | 4/2012 | Stearns et al. |
| 8,153,700 | B2 | 4/2012 | Stearns et al. |
| D658,977 | S | 5/2012 | Riddell et al. |
| 8,181,926 | B2 | 5/2012 | Magno, Jr. et al. |
| 8,226,061 | B2 | 7/2012 | Nehls |
| 8,251,326 | B2 | 8/2012 | McPheeters |
| 8,272,172 | B2 | 9/2012 | Li |
| 8,294,026 | B2 | 10/2012 | Wang et al. |
| D670,160 | S | 11/2012 | Bitarchas |
| 8,312,678 | B1 | 11/2012 | Haddock |
| 8,316,590 | B2 | 11/2012 | Cusson |
| 8,316,621 | B2 | 11/2012 | Safari Kermanshahi et al. |
| D674,513 | S | 1/2013 | Liu |
| 8,344,239 | B2 | 1/2013 | Plaisted |
| 8,347,572 | B2 | 1/2013 | Piedmont |
| 8,375,654 | B1 | 2/2013 | West et al. |
| 8,387,319 | B1 | 3/2013 | Gilles-Gagnon et al. |
| 8,404,963 | B2 | 3/2013 | Kobayashi |
| 8,407,895 | B2 | 4/2013 | Hartelius et al. |
| 8,413,946 | B2 | 4/2013 | Hartelius et al. |
| 8,424,821 | B2 | 4/2013 | Liu |
| 8,430,372 | B2 | 4/2013 | Haddock |
| D681,438 | S | 5/2013 | Chen |
| D681,439 | S | 5/2013 | Chen |
| 8,448,405 | B2 | 5/2013 | Schaefer et al. |
| 8,453,986 | B2 | 6/2013 | Schnitzer |
| 8,458,967 | B2 | 6/2013 | Kalkanoglu et al. |
| 8,495,997 | B1 | 7/2013 | Laubach |
| 8,505,254 | B2 | 8/2013 | Welter et al. |
| 8,528,888 | B2 | 9/2013 | Header |
| 8,567,030 | B2 | 10/2013 | Koch |
| 8,584,424 | B2 | 11/2013 | Smith |
| 8,590,223 | B2 | 11/2013 | Kilgore et al. |
| 8,627,617 | B2 | 1/2014 | Haddock et al. |
| 8,627,632 | B2 | 1/2014 | Werner et al. |
| D699,176 | S | 2/2014 | Salomon et al. |
| 8,640,402 | B1 | 2/2014 | Bilge |
| 8,647,009 | B2 | 2/2014 | Kobayashi |
| 8,656,649 | B2 | 2/2014 | Haddock |
| 8,661,765 | B2 | 3/2014 | Schaefer |
| 8,683,751 | B2 | 4/2014 | Stearns |
| 8,695,290 | B1 | 4/2014 | Kim et al. |
| 8,701,254 | B2 | 4/2014 | Lin |
| 8,701,354 | B2 | 4/2014 | Stearns et al. |
| 8,701,372 | B2 | 4/2014 | Nuernberger et al. |
| 8,713,881 | B2 | 5/2014 | DuPont et al. |
| 8,732,917 | B2 | 5/2014 | Zeilenga et al. |
| 8,733,027 | B1 | 5/2014 | Marston et al. |
| 8,745,935 | B2 | 6/2014 | DuPont et al. |
| 8,752,338 | B2 | 6/2014 | Schaefer et al. |
| 8,756,870 | B2 | 6/2014 | Teller et al. |
| 8,769,911 | B2 | 7/2014 | Montgomery |
| 8,770,885 | B2 | 7/2014 | Myers |
| 8,776,456 | B1 * | 7/2014 | Schrock .................. H02S 20/00 52/173.3 |
| 8,782,983 | B2 | 7/2014 | Stearns |
| 8,791,611 | B2 | 7/2014 | Arnould et al. |
| 8,806,813 | B2 | 8/2014 | Plaisted et al. |
| 8,806,815 | B1 | 8/2014 | Liu et al. |
| 8,813,441 | B2 | 8/2014 | Rizzo |
| 8,826,163 | B1 | 9/2014 | Chanin et al. |
| 8,826,618 | B2 | 9/2014 | Stearns |
| 8,829,330 | B2 | 9/2014 | Meyer et al. |
| 8,833,714 | B2 | 9/2014 | Haddock et al. |
| 8,839,573 | B2 | 9/2014 | Cusson et al. |
| 8,839,575 | B1 | 9/2014 | Liu et al. |
| 8,844,234 | B2 | 9/2014 | Haddock et al. |
| 8,850,754 | B2 | 10/2014 | Rizzo |
| 8,854,829 | B1 | 10/2014 | Bopp et al. |
| 8,888,431 | B2 | 11/2014 | Haney |
| 8,893,441 | B1 | 11/2014 | Hess et al. |
| 8,894,424 | B2 | 11/2014 | DuPont |
| D718,703 | S | 12/2014 | Rizzo |
| D718,704 | S | 12/2014 | Rizzo |
| 8,904,718 | B2 | 12/2014 | Schick et al. |
| 8,910,928 | B2 | 12/2014 | Header |
| 8,919,053 | B2 | 12/2014 | West |
| 8,920,586 | B2 | 12/2014 | Poulakis |
| 8,925,263 | B2 | 1/2015 | Haddock et al. |
| 8,935,893 | B2 | 1/2015 | Liu et al. |
| 8,938,932 | B1 * | 1/2015 | Wentworth ............. F24S 25/61 52/173.3 |
| 8,950,157 | B1 | 2/2015 | Schrock |
| 8,955,259 | B2 | 2/2015 | Hemingway |
| 8,966,833 | B2 | 3/2015 | Ally |
| 8,991,065 | B1 | 3/2015 | Schrock |
| 8,998,660 | B2 | 4/2015 | Bakos |
| 9,003,728 | B2 | 4/2015 | Asci |
| 9,003,733 | B1 | 4/2015 | Simpson et al. |
| 9,010,042 | B2 | 4/2015 | Anderson et al. |
| 9,011,034 | B2 | 4/2015 | Liu |
| 9,052,123 | B2 | 6/2015 | Anderson et al. |
| 9,065,191 | B2 | 6/2015 | Martin et al. |
| 9,068,339 | B2 | 6/2015 | Schaefer et al. |
| 9,076,899 | B2 | 7/2015 | Schrock |
| 9,080,792 | B2 | 7/2015 | Patton |
| 9,085,900 | B2 | 7/2015 | Haddock |
| 9,086,185 | B2 | 7/2015 | Haddock |
| 9,097,443 | B2 | 8/2015 | Liu et al. |
| 9,127,451 | B1 | 9/2015 | Boor |
| 9,134,044 | B2 | 9/2015 | Stearns et al. |
| 9,147,785 | B2 | 9/2015 | Haddock et al. |
| 9,147,986 | B2 | 9/2015 | Redel |
| D740,113 | S | 10/2015 | Olenick |
| 9,166,524 | B2 | 10/2015 | West et al. |
| 9,175,878 | B2 | 11/2015 | Kemmer et al. |
| 9,175,881 | B2 | 11/2015 | Schrock et al. |
| 9,194,130 | B1 | 11/2015 | Stanley |
| 9,194,613 | B2 | 11/2015 | Nuernberger et al. |
| 9,200,456 | B2 | 12/2015 | Murphy |
| 9,222,263 | B2 | 12/2015 | Haddock |
| 9,223,907 | B2 | 12/2015 | Chanin et al. |
| 9,243,817 | B2 | 1/2016 | West |

(56) References Cited

U.S. PATENT DOCUMENTS 9,273,708 B2 3/2016 Urban
9,273,885 B2 3/2016 Rodrigues et al.
9,291,369 B2 3/2016 West et al.
9,299,868 B2 3/2016 Thomas
9,306,490 B2 4/2016 Haddock et al.
9,309,910 B2 4/2016 Anderson et al.
9,331,629 B2 5/2016 Cheung et al.
9,341,285 B2 5/2016 Magno, Jr. et al.
9,376,812 B2 6/2016 Porter
9,416,803 B1 8/2016 McGarity et al.
9,431,953 B2 8/2016 Stearns
9,447,988 B2 9/2016 Stearns et al.
9,473,064 B2 10/2016 Schaefer
9,473,066 B2 10/2016 Stephan et al.
9,479,110 B2 10/2016 Patton et al.
9,496,697 B1 11/2016 Wentworth
9,518,596 B2 12/2016 West et al.
9,528,725 B2 12/2016 McPheeters
9,530,916 B2 12/2016 Haddock et al.
9,531,319 B2 12/2016 Braunstein et al.
9,534,390 B2 1/2017 Pendley et al.
9,587,427 B2 3/2017 Webb
9,599,280 B2 3/2017 West et al.
9,608,559 B2 3/2017 Haddock et al.
9,611,652 B2 4/2017 Haddock et al.
9,647,433 B2 5/2017 Meine
9,647,607 B2 5/2017 Patton et al.
9,660,570 B2 5/2017 Stephan et al.
9,689,411 B2 6/2017 Meine et al.
9,712,106 B2 7/2017 Wentworth et al.
9,714,670 B2 7/2017 Header
9,722,532 B2 8/2017 Almy
9,732,512 B2 8/2017 Haddock
9,742,173 B2 8/2017 Wentworth
9,755,572 B2 9/2017 Wentworth et al.
D800,055 S 10/2017 Rothschild
9,813,012 B2 11/2017 Wentworth et al.
9,813,013 B2 11/2017 McPheeters et al.
9,819,303 B2 11/2017 Ash
9,831,817 B2 11/2017 Rothschild
9,845,584 B1 12/2017 Goldammer
9,845,599 B2 12/2017 Bogh et al.
9,850,661 B2 12/2017 Kovacs
9,853,593 B2 12/2017 Cinnamon et al.
9,853,594 B2 12/2017 Almy
9,863,665 B2 1/2018 West
9,865,938 B2 1/2018 Meine et al.
9,876,463 B2 1/2018 Jasmin
D810,008 S 2/2018 Mollison
9,893,676 B2 2/2018 Anderson et al.
9,893,677 B1 2/2018 Liu
9,920,516 B2 3/2018 Alter
9,920,958 B2 3/2018 Haddock et al.
9,926,706 B2 3/2018 Hockman
9,966,745 B2 5/2018 Wentworth
9,985,361 B2 5/2018 Martin
9,985,575 B2 5/2018 Stearns et al.
9,988,816 B2 6/2018 Zhang et al.
10,021,986 B1 7/2018 Lin
10,036,414 B2 7/2018 Wiley et al.
10,036,576 B1 7/2018 Robinson
D827,160 S 8/2018 Menton
10,053,856 B2 8/2018 Haddock
10,054,336 B2 8/2018 Haddock et al.
D827,873 S 9/2018 Menton
D827,874 S 9/2018 Menton
10,077,562 B2 9/2018 Haddock et al.
10,088,201 B2 10/2018 Stephan
10,090,800 B2 10/2018 McPheeters
10,103,682 B2 10/2018 Haddock et al.
10,103,683 B2 10/2018 Wentworth
10,106,987 B2 10/2018 Haddock et al.
10,141,662 B2 11/2018 Bernard et al.
10,186,791 B2 1/2019 Meine et al.
D841,096 S 2/2019 Boyer
10,202,991 B2 2/2019 Lewis
10,202,995 B2 2/2019 Stickelberger et al.
10,205,418 B2 2/2019 Nayar
10,208,874 B2 2/2019 Geiger et al.
10,211,773 B2 2/2019 Jasmin et al.
10,211,775 B1 2/2019 Wentworth et al.
10,218,305 B1 2/2019 Schrock
10,240,820 B2 3/2019 Ash et al.
D846,978 S 4/2019 Dupont-Madinier
10,256,767 B1 4/2019 Sinai et al.
10,291,176 B2 5/2019 Wentworth et al.
10,302,333 B2 5/2019 McPheeters
10,312,855 B2 6/2019 Lester et al.
10,323,418 B2 6/2019 Karkheck
10,323,861 B2 6/2019 Peng
D853,954 S 7/2019 McPheeters
10,337,764 B2 7/2019 Ash et al.
10,359,069 B2 7/2019 Ash et al.
10,385,573 B2 8/2019 Van Leuven
10,396,704 B2 8/2019 Goodman
10,418,931 B2 9/2019 McPheeters
D863,604 S 10/2019 Sexton
10,432,133 B2 10/2019 Braunstein
10,443,896 B2 10/2019 Haddock et al.
10,454,190 B1 10/2019 Martin
RE47,733 E 11/2019 West
10,472,828 B2 11/2019 Stearns et al.
10,502,457 B2 12/2019 Haddock et al.
10,505,492 B2 12/2019 Hudson et al.
10,511,252 B2 12/2019 Wentworth et al.
10,530,293 B2 1/2020 Legall et al.
10,551,090 B2 2/2020 De Vogel et al.
10,584,447 B2 3/2020 Fenile
10,594,251 B2 3/2020 Stearns et al.
10,622,935 B1 4/2020 Liu
10,634,175 B2 4/2020 Haddock
10,640,980 B2 5/2020 Haddock
10,641,300 B2 5/2020 Header
10,644,643 B2 5/2020 Stearns et al.
D887,963 S 6/2020 Yang
10,673,151 B2 6/2020 Ash et al.
10,676,933 B2 6/2020 Van Leuven
10,686,401 B2 6/2020 Ash et al.
D890,085 S 7/2020 Baird
D890,601 S 7/2020 Gori
D890,602 S 7/2020 Gori
10,731,355 B2 8/2020 Haddock et al.
10,739,039 B2 8/2020 Werner
10,749,459 B1 8/2020 Liu et al.
10,749,466 B2 8/2020 Smeja
10,763,777 B2 9/2020 Stearns et al.
10,797,634 B1 10/2020 Jasmin et al.
10,816,240 B2 10/2020 Robinson
D902,163 S 11/2020 Ice
10,837,476 B2 11/2020 Lewis
D904,861 S 12/2020 McWilliams
10,851,826 B2 12/2020 Ash et al.
10,859,292 B2 12/2020 Haddock et al.
10,868,491 B2 12/2020 Wentworth et al.
10,903,785 B2 1/2021 Haddock et al.
D909,853 S 2/2021 Jasmin
10,931,225 B2 2/2021 Yang et al.
10,948,002 B2 3/2021 Haddock
11,009,262 B2 5/2021 Ash et al.
11,012,023 B2 5/2021 Stearns et al.
D923,203 S 6/2021 Muther
D923,823 S 6/2021 Muther
11,035,126 B2 6/2021 Haddock et al.
11,041,310 B1 6/2021 Haddock et al.
11,085,188 B2 8/2021 Haddock
11,118,353 B2 9/2021 Stearns et al.
11,121,484 B2 9/2021 Ash et al.
11,121,669 B2 9/2021 Stearns et al.
11,139,773 B2 10/2021 Eriksson
11,139,774 B2 10/2021 Wentworth et al.
11,189,941 B2 11/2021 Ash et al.
D939,332 S 12/2021 Kovacs
11,196,187 B2 12/2021 Ash et al.
11,201,581 B2 12/2021 Stearns et al.

(56) References Cited

U.S. PATENT DOCUMENTS

| | | | |
|---|---|---|---|
| 11,296,648 | B1 | 4/2022 | Jasmin et al. |
| 11,333,179 | B2 | 5/2022 | Haddock |
| 11,352,793 | B2 | 6/2022 | Haddock et al. |
| 11,368,005 | B2 | 6/2022 | Meine et al. |
| D962,047 | S | 8/2022 | Muther |
| 11,512,474 | B2 | 11/2022 | Haddock et al. |
| 11,549,724 | B2 | 1/2023 | Zhu |
| 11,552,591 | B2 | 1/2023 | Jasmin et al. |
| 11,573,033 | B2 | 2/2023 | Haddock et al. |
| 11,575,343 | B2 | 2/2023 | Wentworth et al. |
| D982,117 | S | 3/2023 | Liu |
| 11,616,468 | B2 | 3/2023 | Haddock et al. |
| D983,015 | S | 4/2023 | Jasmin et al. |
| D983,016 | S | 4/2023 | Jasmin et al. |
| D983,017 | S | 4/2023 | Jasmin et al. |
| D983,018 | S | 4/2023 | Jasmin et al. |
| D983,019 | S | 4/2023 | Jasmin et al. |
| 11,621,665 | B2 | 4/2023 | Jasmin et al. |
| D984,872 | S | 5/2023 | Jasmin et al. |
| 11,646,692 | B2 | 5/2023 | Wentworth et al. |
| 11,668,332 | B2 | 6/2023 | Haddock |
| 11,739,529 | B2 | 8/2023 | Haddock et al. |
| 11,742,793 | B2 | 8/2023 | Garza et al. |
| 11,750,143 | B1 | 9/2023 | Jasmin et al. |
| 11,757,400 | B1 | 9/2023 | Jasmin et al. |
| 11,770,097 | B1 | 9/2023 | Jasmin et al. |
| 11,774,143 | B2 | 10/2023 | Leitch et al. |
| 11,788,291 | B2 | 10/2023 | Haddock et al. |
| 11,808,043 | B2 | 11/2023 | Haddock |
| 11,815,292 | B2 | 11/2023 | Markiewicz |
| 11,848,638 | B1 | 12/2023 | Jasmin |
| 11,876,482 | B1 | 1/2024 | Jasmin et al. |
| 11,881,808 | B1 | 1/2024 | Jasmin et al. |
| 11,885,139 | B2 | 1/2024 | Haddock et al. |
| 11,949,373 | B1 | 4/2024 | Jasmin et al. |
| 11,965,337 | B2 | 4/2024 | Haddock et al. |
| D1,025,763 | S | 5/2024 | Hu |
| D1,030,453 | S | 6/2024 | Fayfield |
| D1,030,634 | S | 6/2024 | Lin |
| 12,009,774 | B1 | 6/2024 | Jasmin |
| 12,018,861 | B2 | 6/2024 | Haddock |
| D1,035,419 | S | 7/2024 | Johnson |
| 12,044,443 | B2 | 7/2024 | Haddock et al. |
| D1,037,839 | S | 8/2024 | Dunahay |
| 12,057,801 | B1 | 8/2024 | Jasmin et al. |
| D1,055,199 | S | 12/2024 | Zimmer |
| D1,057,910 | S | 1/2025 | Markopoulos |
| D1,058,511 | S | 1/2025 | Lin |
| D1,059,534 | S | 1/2025 | Roberson |
| D1,065,012 | S | 3/2025 | Yamanaka |
| D1,067,363 | S | 3/2025 | Roberson |
| 2002/0026765 | A1 | 3/2002 | Vahey |
| 2002/0088196 | A1 | 7/2002 | Haddock |
| 2002/0160635 | A1 | 10/2002 | Kurrer et al. |
| 2003/0015637 | A1 | 1/2003 | Liebendorfer |
| 2003/0062078 | A1 | 4/2003 | Mimura |
| 2003/0070368 | A1 | 4/2003 | Shingleton |
| 2003/0080267 | A1 | 5/2003 | Eslick |
| 2003/0131551 | A1 | 7/2003 | Mollinger et al. |
| 2003/0146346 | A1 | 8/2003 | Chapman, Jr. |
| 2003/0173460 | A1 | 9/2003 | Chapman, Jr. |
| 2003/0201009 | A1 | 10/2003 | Nakajima et al. |
| 2004/0035065 | A1 | 2/2004 | Orszulak et al. |
| 2004/0055233 | A1 | 3/2004 | Showalter |
| 2004/0164208 | A1 | 8/2004 | Nielson et al. |
| 2004/0231949 | A1 | 11/2004 | Le et al. |
| 2004/0237465 | A1 | 12/2004 | Refond |
| 2005/0095062 | A1 | 5/2005 | Iverson |
| 2005/0102958 | A1 | 5/2005 | Anderson |
| 2005/0115176 | A1 | 6/2005 | Russell |
| 2005/0117997 | A1 | 6/2005 | Pinzl |
| 2005/0210769 | A1 | 9/2005 | Harvey |
| 2005/0257434 | A1 | 11/2005 | Hockman |
| 2006/0065805 | A1 | 3/2006 | Barton et al. |
| 2006/0075691 | A1 | 4/2006 | Verkamlp |
| 2006/0096061 | A1 | 5/2006 | Weiland et al. |
| 2006/0118163 | A1 | 6/2006 | Plaisted et al. |
| 2006/0174571 | A1 | 8/2006 | Panasik et al. |
| 2006/0174931 | A1 | 8/2006 | Mapes et al. |
| 2006/0230587 | A1 | 10/2006 | Okada |
| 2006/0254192 | A1 | 11/2006 | Fennell, Jr. |
| 2007/0075198 | A1 | 4/2007 | Foser |
| 2007/0131273 | A1 | 6/2007 | Kobayashi |
| 2007/0194191 | A1 | 8/2007 | Persson |
| 2007/0199590 | A1 | 8/2007 | Tanaka et al. |
| 2007/0241238 | A1 | 10/2007 | Neace |
| 2007/0246039 | A1 | 10/2007 | Brazier et al. |
| 2007/0248434 | A1 | 10/2007 | Wiley et al. |
| 2007/0289229 | A1 | 12/2007 | Aldo |
| 2007/0289233 | A1 | 12/2007 | Haddock |
| 2008/0035140 | A1 | 2/2008 | Placer et al. |
| 2008/0041011 | A1 | 2/2008 | Kannisto |
| 2008/0095591 | A1 | 4/2008 | Wu |
| 2008/0184639 | A1 | 8/2008 | Cotter |
| 2008/0190047 | A1 | 8/2008 | Allen |
| 2008/0236520 | A1 | 10/2008 | Maehara et al. |
| 2008/0265232 | A1 | 10/2008 | Terrels et al. |
| 2008/0292424 | A1 | 11/2008 | Kufner |
| 2008/0302407 | A1 | 12/2008 | Kobayashi |
| 2009/0000220 | A1 | 1/2009 | Lenox |
| 2009/0007520 | A1 | 1/2009 | Navon |
| 2009/0194098 | A1 | 8/2009 | Placer |
| 2009/0223741 | A1 | 9/2009 | Picard, Jr. |
| 2009/0229213 | A1 | 9/2009 | Mistelski |
| 2009/0230205 | A1 | 9/2009 | Hepner et al. |
| 2009/0320826 | A1 | 12/2009 | Kufner |
| 2010/0012805 | A1 | 1/2010 | Taylor |
| 2010/0058701 | A1 | 3/2010 | Yao et al. |
| 2010/0133040 | A1 | 6/2010 | London |
| 2010/0154784 | A1 | 6/2010 | King et al. |
| 2010/0162641 | A1 | 7/2010 | Reyal et al. |
| 2010/0171016 | A1 | 7/2010 | Haddock |
| 2010/0175738 | A1 | 7/2010 | Huss et al. |
| 2010/0192334 | A1 | 8/2010 | Reichle et al. |
| 2010/0192505 | A1 | 8/2010 | Schaefer et al. |
| 2010/0193651 | A1 | 8/2010 | Railsback et al. |
| 2010/0206303 | A1 | 8/2010 | Thorne |
| 2010/0212720 | A1 | 8/2010 | Meyer et al. |
| 2010/0276558 | A1 | 11/2010 | Faust et al. |
| 2010/0281784 | A1 | 11/2010 | Leo |
| 2010/0282290 | A1 | 11/2010 | Schwarze |
| 2010/0288337 | A1 | 11/2010 | Rizzo |
| 2010/0293874 | A1 | 11/2010 | Liebendorfer |
| 2010/0314517 | A1 | 12/2010 | Patzer |
| 2011/0000151 | A1 | 1/2011 | Hochreiter |
| 2011/0039458 | A1 | 2/2011 | Byrne |
| 2011/0078892 | A1 | 4/2011 | Hartelius et al. |
| 2011/0088340 | A1 | 4/2011 | Stobbe |
| 2011/0120047 | A1 | 5/2011 | Stearns et al. |
| 2011/0138585 | A1 | 6/2011 | Kmita et al. |
| 2011/0154750 | A1 | 6/2011 | Welter et al. |
| 2011/0162299 | A1 | 7/2011 | Azzolini |
| 2011/0174360 | A1 | 7/2011 | Plaisted et al. |
| 2011/0179606 | A1 | 7/2011 | Magno, Jr. et al. |
| 2011/0209745 | A1 | 9/2011 | Korman |
| 2011/0214365 | A1 | 9/2011 | Aftanas |
| 2011/0214388 | A1 | 9/2011 | London |
| 2011/0232212 | A1 | 9/2011 | Pierson et al. |
| 2011/0239546 | A1 | 10/2011 | Tsuzuki et al. |
| 2011/0247292 | A1 | 10/2011 | Li |
| 2011/0260027 | A1 | 10/2011 | Farnham, Jr. |
| 2011/0271611 | A1 | 11/2011 | Maracci et al. |
| 2011/0272545 | A1 | 11/2011 | Liu |
| 2011/0277296 | A1 | 11/2011 | Ramos |
| 2011/0314752 | A1 | 12/2011 | Meier |
| 2012/0001046 | A1 | 1/2012 | Schmotz |
| 2012/0073630 | A1 | 3/2012 | Wu |
| 2012/0079781 | A1 | 4/2012 | Koller |
| 2012/0085041 | A1 | 4/2012 | Place |
| 2012/0099943 | A1 | 4/2012 | Chiu |
| 2012/0102853 | A1 | 5/2012 | Rizzo |
| 2012/0153108 | A1 | 6/2012 | Schneider |
| 2012/0167364 | A1 | 7/2012 | Koch et al. |
| 2012/0175322 | A1 | 7/2012 | Park et al. |

(56) References Cited

U.S. PATENT DOCUMENTS

2012/0192519 A1 8/2012 Ray
2012/0193310 A1 8/2012 Fluhrer et al.
2012/0201601 A1 8/2012 Rizzo
2012/0223033 A1 9/2012 Molek
2012/0244729 A1 9/2012 Rivera et al.
2012/0248271 A1 10/2012 Zeilenga
2012/0298188 A1 11/2012 West et al.
2012/0299233 A1 11/2012 Header
2012/0325761 A1 12/2012 Kubsch et al.
2013/0011187 A1 1/2013 Schuit et al.
2013/0014809 A1 1/2013 Sagayama
2013/0048056 A1 2/2013 Kilgore et al.
2013/0074428 A1 3/2013 Allen
2013/0089388 A1 4/2013 Liu et al.
2013/0091692 A1 4/2013 Stanley
2013/0117973 A1 5/2013 Murasaki
2013/0118545 A1 5/2013 Bosler et al.
2013/0149030 A1 6/2013 Merhar et al.
2013/0167470 A1 7/2013 Montgomery et al.
2013/0168525 A1 7/2013 Haddock
2013/0220403 A1 8/2013 Rizzo
2013/0227833 A1 9/2013 Rizzo
2013/0263917 A1 10/2013 Hamamura
2013/0313043 A1 11/2013 Lallier
2013/0334151 A1 12/2013 Kanczuzewski et al.
2013/0340358 A1 12/2013 Danning
2014/0000681 A1 1/2014 Zhao et al.
2014/0003861 A1 1/2014 Cheung
2014/0041202 A1 2/2014 Schnitzer et al.
2014/0042286 A1 2/2014 Jaffari
2014/0048498 A1* 2/2014 Kuan .................... F24S 25/60
211/41.1
2014/0069048 A1 3/2014 Ally
2014/0096462 A1 4/2014 Haddock
2014/0096463 A1 4/2014 Prentice
2014/0179133 A1 6/2014 Redel
2014/0220834 A1 8/2014 Rizzo
2014/0231605 A1 8/2014 Sharpe et al.
2014/0260068 A1 9/2014 Pendley et al.
2014/0283467 A1 9/2014 Chabas et al.
2014/0290718 A1 10/2014 Jackson, Jr.
2014/0338273 A1 11/2014 Stapleton
2014/0341645 A1 11/2014 Liu et al.
2015/0052834 A1 2/2015 Gies et al.
2015/0060620 A1 3/2015 Smeja
2015/0107168 A1 4/2015 Kobayashi
2015/0129517 A1 5/2015 Wildes
2015/0171787 A1 6/2015 Genschorek
2015/0200620 A1 7/2015 Haddock et al.
2015/0214884 A1 7/2015 Rizzo
2015/0249423 A1 9/2015 Braunstein et al.
2015/0316086 A1 11/2015 Urban
2016/0025262 A1 1/2016 Stearns et al.
2016/0043686 A1 2/2016 Hsueh
2016/0049901 A1 2/2016 Muther et al.
2016/0060869 A1 3/2016 Smeja
2016/0079909 A1 3/2016 Franklin
2016/0087576 A1 3/2016 Johansen et al.
2016/0111835 A1 4/2016 Nayar
2016/0111997 A1 4/2016 Ganshaw et al.
2016/0111998 A1 4/2016 Schmid
2016/0130815 A1 5/2016 Menegoli
2016/0160492 A1 6/2016 Gower
2016/0160524 A1 6/2016 Malins
2016/0176105 A1 6/2016 Stanley
2016/0177984 A1 6/2016 Kovacs et al.
2016/0233820 A1 8/2016 Redel
2016/0268958 A1* 9/2016 Wildes .................... H02S 20/23
2016/0308487 A1 10/2016 Molina
2017/0040928 A1 2/2017 Schuit et al.
2017/0040931 A1 2/2017 Schuit
2017/0067258 A1 3/2017 Stearns et al.
2017/0073974 A1 3/2017 Kovacs
2017/0107723 A1 4/2017 Stearns et al.
2017/0237386 A1 8/2017 Stephan et al.
2017/0301265 A1 10/2017 Kyle et al.
2017/0302220 A1 10/2017 Martin
2017/0302221 A1 10/2017 Jasmin
2017/0336021 A1 11/2017 Anderson
2018/0013382 A1 1/2018 Smeja
2018/0045363 A1 2/2018 Mitrovic
2018/0062570 A1 3/2018 Murakami
2018/0109014 A1 4/2018 Martin
2018/0119425 A1 5/2018 Kovacs
2018/0123505 A1 5/2018 Prat et al.
2018/0167026 A1 6/2018 Xie
2018/0323744 A1 11/2018 Hudson
2019/0013772 A1 1/2019 Bamat et al.
2019/0049151 A1 2/2019 Harris et al.
2019/0068114 A1 2/2019 Lu
2019/0106885 A1 4/2019 Stearns et al.
2019/0123460 A1 4/2019 Ash et al.
2019/0165717 A1 5/2019 Haddock et al.
2019/0178274 A1 6/2019 Katz
2019/0195252 A1 6/2019 Pryor et al.
2019/0221696 A1 7/2019 Kubo et al.
2019/0226214 A1 7/2019 Van Leuven
2019/0273460 A1 9/2019 Kovacs
2019/0285224 A1 9/2019 McKechnie et al.
2019/0326847 A1 10/2019 Zuritis
2019/0330853 A1 10/2019 Van Leuven
2019/0343085 A1 11/2019 Donado
2019/0345719 A1 11/2019 Header
2019/0363667 A1 11/2019 Braunstein et al.
2019/0372501 A1 12/2019 Wada et al.
2020/0144959 A1 5/2020 Stearns et al.
2020/0208463 A1 7/2020 Mascarenhas et al.
2020/0208658 A1 7/2020 Roman
2020/0252023 A1 8/2020 Stearns et al.
2020/0278077 A1 9/2020 Xie
2020/0313603 A1 10/2020 Uppu
2020/0313604 A1 10/2020 Harris et al.
2020/0313611 A1 10/2020 Ash et al.
2020/0318349 A1 10/2020 Stearns et al.
2020/0321763 A1 10/2020 Joshi et al.
2020/0362632 A1 11/2020 Fort
2021/0005115 A1 1/2021 Johnson
2021/0028741 A1 1/2021 Stearns et al.
2021/0067085 A1 3/2021 Stearns et al.
2021/0079947 A1 3/2021 Ash et al.
2021/0104973 A1 4/2021 Stearns et al.
2021/0111546 A1 4/2021 Varale
2021/0159843 A1 5/2021 Stearns et al.
2021/0167720 A1 6/2021 Stearns et al.
2021/0184626 A1 6/2021 Yang et al.
2021/0194157 A1 6/2021 Ash et al.
2021/0265940 A1 8/2021 Stearns et al.
2021/0376781 A1 12/2021 Stearns et al.
2021/0376782 A1 12/2021 Stearns et al.
2021/0388618 A1 12/2021 Stearns et al.
2022/0010823 A1 1/2022 Moss et al.
2022/0140771 A1 5/2022 Stearns et al.
2022/0145634 A1 5/2022 Stearns et al.
2022/0149545 A1 5/2022 Ash et al.
2022/0178586 A1 6/2022 Ash et al.
2022/0278516 A1 9/2022 Meine et al.
2023/0036926 A1 2/2023 Jovanovic et al.
2023/0151834 A1 5/2023 Kovacs
2023/0170840 A1 6/2023 Stearns et al.
2023/0198460 A1 6/2023 Jasmin et al.
2023/0223895 A1 7/2023 Haddock et al.
2023/0261606 A1 8/2023 Stearns et al.
2023/0279883 A1 9/2023 Haddock et al.
2023/0336108 A1 10/2023 Morano
2023/0396208 A1 12/2023 Pedlar et al.
2023/0399850 A1 12/2023 Haddock et al.
2023/0402958 A1 12/2023 Jasmin
2024/0014770 A1 1/2024 Moss et al.
2024/0022207 A1 1/2024 Jasmin et al.
2024/0027103 A1 1/2024 Leitch et al.
2024/0068237 A1 2/2024 Haddock
2024/0097415 A1 3/2024 Ash et al.
2024/0167730 A1 5/2024 Jasmin et al.
2024/0171115 A1 5/2024 Jasmin et al.

(56) References Cited

U.S. PATENT DOCUMENTS

| | | | |
|---|---|---|---|
| 2024/0195347 A1 | 6/2024 | Jasmin |
| 2024/0227688 A1 | 7/2024 | Morano |
| 2024/0377105 A1 | 11/2024 | Haddock et al. |
| 2025/0015580 A1 | 1/2025 | Meine |
| 2025/0055412 A1 | 2/2025 | Moss |
| 2025/0080036 A1 | 3/2025 | Moss et al. |
| 2025/0146294 A1 | 5/2025 | Haddock et al. |
| 2025/0154971 A1 | 5/2025 | Haddock |
| 2025/0155164 A1 | 5/2025 | Leitch et al. |

FOREIGN PATENT DOCUMENTS

| | | |
|---|---|---|
| AT | 298762 | 5/1972 |
| AT | 509330 | 8/2011 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CA | 2751963 | 3/2013 |
| CH | 204783 | 5/1939 |
| CH | 388590 | 2/1965 |
| CH | 469159 | 2/1969 |
| CH | 583400 | 12/1976 |
| CH | 671063 | 7/1989 |
| CN | 201635272 | 11/2010 |
| CN | 202025767 | 11/2011 |
| CN | 202577780 | 12/2012 |
| CN | 103774795 | 5/2014 |
| CN | 203951411 | 11/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108086790 | 5/2018 |
| CN | 108105222 | 6/2018 |
| CN | 108331266 | 7/2018 |
| CN | 208986874 | 6/2019 |
| CN | 305195428 | 6/2019 |
| CN | 305231426 | 6/2019 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 2846451 | 5/1980 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 19529351 | 2/1997 |
| DE | 10056177 | 5/2002 |
| DE | 10062697 | 7/2002 |
| DE | 10152354 | 5/2003 |
| DE | 10224437 | 12/2003 |
| DE | 10344202 | 4/2004 |
| DE | 202005006951 | 8/2005 |
| DE | 102005002828 | 8/2006 |
| DE | 202006015336 | 12/2006 |
| DE | 102005039495 | 3/2007 |
| DE | 202007002252 | 4/2007 |
| DE | 202007002232 | 5/2007 |
| DE | 102007023177 | 3/2008 |
| DE | 202007018367 | 7/2008 |
| DE | 102007036206 | 2/2009 |
| DE | 202009010984 | 12/2009 |
| DE | 102008032985 | 1/2010 |
| DE | 102009018362 | 11/2010 |
| DE | 102009035996 | 11/2010 |
| DE | 102009040671 | 3/2011 |
| DE | 202011001761 | 5/2011 |
| DE | 202010007234 | 10/2011 |
| DE | 102010035804 | 3/2012 |
| DE | 102011100484 | 11/2012 |
| DE | 102011050856 | 12/2012 |
| DE | 202012103417 | 12/2012 |
| DE | 102011113289 | 3/2013 |
| DE | 202013002857 | 5/2013 |
| DE | 102013204954 | 9/2014 |
| DE | 202014102469 | 9/2014 |
| DE | 202015102936 | 9/2016 |
| DE | 202012013476 | 2/2017 |
| DE | 102017128371 | 6/2019 |
| EP | 0481905 | 4/1992 |
| EP | 0722023 | 7/1996 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2520877 | 11/2012 |
| EP | 2568231 | 3/2013 |
| EP | 2746695 | 6/2014 |
| EP | 2666925 | 4/2015 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| EP | 4329192 | 2/2024 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2958953 | 10/2011 |
| FR | 2971577 | 8/2012 |
| FR | 2983890 | 6/2013 |
| FR | 2997169 | 4/2014 |
| FR | 3074369 | 12/2019 |
| GB | 2149829 | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-182238 | 7/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 3475781 | 12/2003 |
| JP | 2004-060358 | 2/2004 |
| JP | 2004-068270 | 3/2004 |
| JP | 2004-092134 | 3/2004 |
| JP | 2004-116658 | 4/2004 |
| JP | 2004-124583 | 4/2004 |

(56) References Cited

FOREIGN PATENT DOCUMENTS

| | | |
|---|---|---|
| JP | 2004-156326 | 6/2004 |
| JP | 2004-264009 | 9/2004 |
| JP | 2004-278145 | 10/2004 |
| JP | 2005-171623 | 6/2005 |
| JP | 2005322821 | 11/2005 |
| JP | 2006-057357 | 3/2006 |
| JP | 2006-097291 | 4/2006 |
| JP | 2006-144268 | 6/2006 |
| JP | 2006-052278 | 3/2009 |
| JP | 2006-179955 | 8/2009 |
| JP | 2006-185599 | 8/2009 |
| JP | 4381634 | 12/2009 |
| JP | 2010-196422 | 9/2010 |
| JP | 2011-069130 | 4/2011 |
| JP | 2011-185014 | 9/2011 |
| JP | 2011-236611 | 11/2011 |
| JP | 2012-144903 | 8/2012 |
| JP | 2013-083044 | 5/2013 |
| JP | 2013-136892 | 7/2013 |
| JP | 2014-034872 | 2/2014 |
| JP | 2014-047460 | 3/2014 |
| JP | 6033922 | 11/2016 |
| JP | 2018-091009 | 6/2018 |
| JP | 2018-131729 | 8/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PL | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2008/152748 | 12/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/082730 | 7/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2013/092428 | 6/2013 |
| WO | WO 2014/194576 | 12/2014 |
| WO | WO 2015/061113 | 4/2015 |
| WO | WO 2016/198305 | 12/2016 |
| WO | WO 2016/204941 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |
| WO | WO 2023/177662 | 9/2023 |
| WO | WO 2023/192199 | 10/2023 |

OTHER PUBLICATIONS

"Ace Clamp Cut Sheet | 5031 Z1-2," Ace Clamp, Nov. 2018, 1 page.

"ADJ Heavy Duty Lighting C-clamp," Sweetwater, 2011, 3 pages [retrieved online from: http://web.archive.org/web/20111112045516/http://www.sweetwater.com/store/detail/CClamp/].

"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].

"Aerocompact® Compactmetal TR," Aerocompact, Sep. 2, 2021, PB TR ENG EU V1, 3 pages [retrieved online from: cdn.intelligencebank.com/eu/share/8MnR/qMBXP/VYrWa/original/AEROCOMPACT_Leaflet_TR_ENG_V1_WEB].

"Aluminum," Wikipedia, Jul. 3, 2016, 21 pages [retrieved Oct. 3, 2017 from: en.wikipedia.org/w1ki/Aluminium].

"ClampFit-H Product Sheet," Schletter GmbH, Kirchdorf, Germany, Nov. 2015, 2 pages.

"Code: The SR-EC-010," Lockseam Ltd., Received Nov. 9, 2022, Datasheet SR-EC-010 Version 2.0, 6 pages.

"CompactMETAL TR59 | TR74 Assembly Instructions," Aerocompact, Sep. 2021, 27 pages.

"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].

"EZ Grip Metal Deck Mount," SunModo Corp., 2019, 1 page.

"EZ Grip Metal Deck Mount," SunModo Corp., 2019, Product page, 3 pages [retrieved online May 30, 2019 from: sunmodo.com/product/ez-grip-metal-deck-mount/#].

"Fix2000 check list," Schletter GmbH, last updated Jul. 2010, 1 page.

"Grounding Clip for Electrical Protection," ARaymond, 2016, 2 pages.

"Installation Instructions for Rayvolt®—Grounding clip for Framed PV Modules," ARaymond, Feb. 2016, Version 2.2, 1 page.

"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].

"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].

"LM-KS-700," Lumax Energy, 2018, 1 page.

"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].

"Metal Roof Deck Mount Kit," SunModo Corp., Oct. 16, 2018, Product Drawing, 1 page.

"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].

"MLPE Mount," Unirac, Dec. 2016, 1 page.

"New 'Alzone 360 system'", Arrid, 2008, 34 pages [retrieved online from: https://web.archive.org/web/20120317120735/www.arrid.com.au/?act=racking_parts].

"Non-Penetrative Clamps with Roofs," Clenergy, Dec. 2021, Datasheet, 5 pages.

"Oil Canning—Solutions," Pac-Clad, 2001, 2 pages [retrieved online from: pac-clad.com/aiapresentation/sld021.htm].

"Oil Canning," Metal Construction Association, 2003, Technical Bulletin #95-1060, 2 pages.

"ProteaBracket™ Brochure," Metal Roof Innovations, Ltd., 2019, 2 pages.

"ProteaBracket™ Install Instructions," Metal Roof Innovations, Ltd., 2022, 2 pages.

"PV-ezRack Klip-lok Interface," Clenergy, 2020, 1 page.

"PV-ezRack SolarRoof-Black Anodized," Clenergy, 2020, 4 pages.

"Rail System," Pegasus Solar, 2021, 2 pages.

"REES-Snow Retention Systems," Weerbewind, 2010, 3 pages [retrieved online from: https://web.archive.org/web/20100310075027/www.rees-oberstdorf.de/en/products/snow-retention-system.html].

(56) References Cited

OTHER PUBLICATIONS

"Renusol 420082 Mid Clamp (G)," TradeSparky, 2024, 6 pages [retrieved online Mar. 27, 24 from: www.tradesparky.com/solarsparky/mounting/reusol/mids/renusol-420082-mid-clamp-g].
"S-5! WindClamp™ Install," Metal Roof Innovations, Ltd., 2014, 1 page.
"Slot definition," Merriam-Webster Dictionary, 2022, 1 page [retrieved online Aug. 24, 2022 from www.merriam-webster.com/dictionary/slot].
"Solar mount. System," Schletter GmbH, 2012, 1 page [retrieved online from: https://web.archive.org/web/20120316154604/www.schletter.de/152-1-Solar-mounting-systems.html].
"Standing Seam Metal Roof Solar Clamps," Mibet Energy, 2021, 13 pages [retrieved online Mar. 27, 2024 from: www.mbt-energy.com/products/roof-pv/list-1.html].
"Standing Seam Rail Free One Sheet," SunModo, Corp., 2020, 2 pages.
"Standing Seam RiverClack Clamp," Shanghai Woqin New Energy Technology Co., Ltd., 2018, 4 pages [retrieved online on Mar. 23, 2022 from: www.wochnmount.com/Details.html?product_id=36].
"SunDock Standing Seam PV Mounting System Installation Manual," SunModo, 2019, Doc. No. D10160-V006, 14 pages.
"SunDock™ Standing Seam Rail-Free Attachment System," SunModo Corp., 2018, 1 page.
"Universal Clamps Brochure for Web," Universal Clamps, 2020, 2 pages.
"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.
"Wiley Grounding & Bonding Solutions, " Hubbell, 2020, 2 pages [retrieved online from: www.hubbell.com/wiley/en/grounding-and-bonding].
"Wind Clamp Double LOK," Metal Roof Innovations, Ltd., Mar. 7, 2011, Drawing No. WC15-A-0-A_CCD, 1 page.
"Wind Clamp Ultra DEK," Metal Roof Innovations, Ltd., Mar. 7, 2011, Drawing No. WC14-A-0-A_CCD, 1 page.
"Wind Clamps for Metal Roofs," Metal Roof Innovations, Ltd., 2017, Version 081717, 2 pages.
"QRail® System, Installation Manual," Quick Mount PV, Jul. 2019, Rev. 4.2, 48 pages.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
IDEEMATEC Tracking & Mounting Systems [online], Apr. 2008, [retrieved Mar. 6, 2012], Retrieved from http://www.ideematec.de.
International Search Report and Written Opinion for International (PCT) Patent Application No. PCT/US2/43045, dated Dec. 20, 2022 18 pages.
International Preliminary Report on Patentability for International (PCT) Patent Application No. PCT/US2022/043045, dated Mar. 21, 2024 11 pages.
"Aluminium Alloy Roof Mounting Clamp Bracket," Amazon.com, posted Jan. 5, 2020, 3 pages [retrieved online Apr. 11, 25 from: www.amazon.com/Aexit-Aluminium-Diamond-Mounting-Bracket/dp/B07MLF4BWJ].
Aluminum Roof Mount clamp down with Fastening Rail, DH Gate, 2025, 5 pages [retrieved online from: www.dhgate.com/product/solar-panel-module-aluminum-bracket-rail/963547197.html?skuld=1239162678779494408].
"Mini C Clamps," Amazon.com, posted Dec. 1, 2021, 12 pages [retrieved online Apr. 11, 2025 from: www.amazon.com/Stainless-0-83-Inch-Mounting-Universal/dp/B09MTHNCDW?ref_=ast_sto_dp&th=1].
Solar System Panel Mounting Structure Roof Brackets, Hina, 2025, 5 pages [retrieved online from: www.hainafastener.com/Stainless-Steel-Metal-Adjustable-Mount-Bracket-PV-Bracket-Solar-System-Panel-Mounting-Structure-Roof-Brackets-Aluminum-Bracket-Tile-Roof-Bracket-Solar-Brackets-pd40964455.html].
Sustainable 8 Panel Solar Mounting Kit, Sustainable.co.za, 2025, 7 pages [retrieved online from: www.sustainable.co.za/products/sustainable-8-panel-solar-mounting-kit].
U.S. Appl. No. 14/257,747, filed Apr. 21, 2014 now U.S. Pat. No. 9,085,900.
U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 16/539,960, filed Aug. 13, 2019 now U.S. Pat. No. 10,859,292.
U.S. Appl. No. 17/110,621, filed Dec. 3, 2020 now U.S. Pat. No. 11,573,033.
U.S. Appl. No. 18/106,104, filed Feb. 6, 2023 now U.S. Pat. No. 12,044,443.
U.S. Appl. No. 15/798,023, filed Oct. 30, 2017 now U.S. Pat. No. 10,640,980.
U.S. Appl. No. 16/866,080, filed May 4, 2020 now U.S. Pat. No. 11,085,188.
U.S. Appl. No. 17/398,146, filed Aug. 10, 2021 now U.S. Pat. No. 11,808,043.
U.S. Appl. No. 18/503,001, filed Nov. 6, 2023.
U.S. Appl. No. 16/360,923, filed Mar. 21, 2019 now U.S. Pat. No. 10,903,785.
U.S. Appl. No. 29/845,330, filed Jul. 6, 2022.
U.S. Appl. No. 18/347,812, filed Jul. 6, 2023.
U.S. Appl. No. 29/877,872, filed Jun. 13, 2023.
U.S. Appl. No. 29/877,876, filed Jun. 13, 2023.
U.S. Appl. No. 17/156,469, filed Jan. 22, 2021 now U.S. Pat. No. 11,616,468.
U.S. Appl. No. 18/125,006, filed Mar. 22, 2023.
U.S. Appl. No. 16/714,060, filed Dec. 13, 2019 now U.S. Pat. No. 10,948,002.
U.S. Appl. No. 17/199,947, filed Mar. 12, 2021 now U.S. Pat. No. 11,668,332.
U.S. Appl. No. 18/195,273, filed May 9, 2023.
U.S. Appl. No. 13/720,461, filed Dec. 19, 2012.
U.S. Appl. No. 15/628,927, filed Jun. 21, 2017 now U.S. Pat. No. 10,634,175.
U.S. Appl. No. 16/824,651, filed Mar. 19, 2020 now U.S. Pat. No. 11,333,179.
U.S. Appl. No. 17/745,528, filed May 16, 2022 now U.S. Pat. No. 12,018,861.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000.

(56) References Cited

OTHER PUBLICATIONS

U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019 now U.S. Pat. No. 11,035,126.
U.S. Appl. No. 17/347,291, filed Jun. 14, 2021 now U.S. Pat. No. 11,885,139.
U.S. Appl. No. 18/425,712, filed Jan. 29, 2024.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020 now U.S. Pat. No. 11,774,143.
U.S. Appl. No. 18/479,610, filed Oct. 2, 2023.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020 now U.S. Pat. No. 11,041,310.
U.S. Appl. No. 17/353,483, filed Jun. 21, 2021 now U.S. Pat. No. 11,788,291.
U.S. Appl. No. 17/203,481, filed Mar. 16, 2021 now U.S. Pat. No. 11,352,793.
U.S. Appl. No. 17/833,252, filed Jun. 6, 2022 now U.S. Pat. No. 11,739,529.
U.S. Appl. No. 18/457,101, filed Aug. 28, 2023.
U.S. Appl. No. 17/203,483, filed Mar. 16, 2021 now U.S. Pat. No. 11,512,474.
U.S. Appl. No. 18/070,135, filed Nov. 28, 2022 now U.S. Pat. No. 11,965,337.
U.S. Appl. No. 18/642,276, filed Apr. 22, 2024.
U.S. Appl. No. 17/371,888, filed Jul. 9, 2021.
U.S. Appl. No. 29/812,325, filed Oct. 20, 2021.
U.S. Appl. No. 29/874,164, filed Apr. 14, 2023.
U.S. Appl. No. 18/634,432, filed Apr. 12, 2024.
U.S. Appl. No. 29/911,242, filed Aug. 30, 2023.
U.S. Appl. No. 29/924,678, filed Jan. 19, 2024.
U.S. Appl. No. 29/909,779, filed Aug. 10, 2023.
U.S. Appl. No. 29/911,713, filed Sep. 7, 2023.

* cited by examiner

TORQUE ACTUATED RAIL ASSEMBLY

CROSS-REFERENCE TO RELATED APPLICATIONS

This application is a national stage application under 35 U.S.C. 371 and claims the benefit of PCT Application No. PCT/US2022/043045, having an international filing date of Sep. 9, 2022, which designated the United States, which PCT application claimed the benefit of priority under 35 U.S.C. § 119 (e) to U.S. Provisional Application No. 63/242,326, filed on Sep. 9, 2021, and entitled "TORQUE ACTUATED RAIL ASSEMBLY", the entirety of each of which are hereby incorporated by reference.

FIELD

The present disclosure generally relates to installing structures on a building surface. More specifically, the present disclosure relates to a torque actuated rail assembly for installing structures and accessories on a metal panel defining a building surface.

BACKGROUND

Metal panels are being increasingly used to define building surfaces such as roofs and sidewalls. One type of metal panel is a trapezoidal rib panel. The trapezoidal rib panel may include one or more trapezoidal ribs. Each trapezoidal rib may include an upper wall that is typically a flat or planar surface. A pair of sidewalls extend from the upper wall to base sections on either side of the rib.

It is often desirable to install various types of structures and accessories on building surfaces, such as snow guards or stops, signs, banners, light fixtures, piping, antennas, roof walkways, lightning protection systems, condensate lines, stack/flue bracing, fascia's, equipment screens, electrical conduit and cabling, heating, air conditioning, and ventilation equipment, with mounting assemblies. Photovoltaic or solar modules are also frequently installed on various building surfaces with mounting assemblies. A photovoltaic module typically includes a photovoltaic cell incorporated into a perimeter frame of an appropriate material (e.g., aluminum). Multiple photovoltaic modules may be installed in one or more rows (e.g., a string) on a building surface to define an array.

Known mounting assemblies are complex, including multiple interlocking components configured to prevent the movement of the installations (e.g., the photovoltaic modules). The known mounting assemblies may couple to the building surface in such a way as to puncture or otherwise damage the building surface. Installing structures on building surfaces defined by trapezoidal rib panels in a manner that punctures the building surface at one or more locations is undesirable in a number of respects. For one, it is simply desirable to avoid puncturing what is a relatively expensive building surface. In addition, puncturing a metal panel building surface can present leakage and corrosion issues. Further, puncturing a metal panel building surface may breach the warranty of the terms of the installation contract under which the metal panel building surface was installed.

SUMMARY

Accordingly, there is a need for a mounting assembly with a simplified, extruded design. The mounting assembly should couple a structure, such as a photovoltaic module or an accessory, to a building surface while preventing damage caused by installing additional screws in the building surface and without creating new penetrations through the building surface. Moreover, the mounting assembly should secure the photovoltaic module to the building surface without damaging or otherwise interfering with the operation of the photovoltaic module or accessory.

In one aspect of the present disclosure, a torque actuated rail assembly for installing structures to a metal panel defining a building surface is disclosed according to one or more embodiments. The rail assembly as described throughout the disclosure may be capable of coupling to a building surface while preventing damage caused by installing additional screws in the building surface and without creating new penetrations through the building surface. The rail assembly as described throughout the disclosure may be capable of securing an accessory (such as a photovoltaic module) to the building surface without damaging or otherwise interfering with the operation of the photovoltaic module.

In some embodiments, the rail assembly includes a rail and a lag clip or lag foot. In some embodiments, the rail assembly further includes a grab assembly. In some embodiments, the rail assembly is configured to receive a building fastener and couple to a building surface. In some embodiments, the grab assembly and the rail are configured to receive a portion of a photovoltaic module, and the rail assembly is configured to secure the photovoltaic module to the building surface. For example, the building surface may include, but is not limited to, a trapezoidal rib panel including trapezoidal ribs.

In some embodiments, the rail includes one or more rail hooks, and the lag clip or lag foot includes one or more lag catches configured to couple to the one or more rail hooks. In some embodiments, the one or more rail hooks are configured to engage the one or more lag catches following a rail nut of the grab assembly engaging sloped rail surfaces of rail arms of the rail. For example, the grab assembly may include a grab and a grab fastener, where the grab fastener connects the rail nut with the grab. For instance, the tightening of the grab fastener may cause the rail nut to engage the sloped rail surfaces, pushing the rail arms outward with respect to a central reference plane. The rail arms moving outward may cause the one or more rail hooks to push inward (toward the reference plane) and onto the one or more lag catches. The transition between the outward-pushed rail arms and the inward-pushing one or more rail hooks may be accomplished via a bendable portion or living hinge of a rail base of the rail.

In some embodiments, the rail arms of the rail, the rail legs of the rail, and/or the lag clip member of the lag clip may be longitudinally spaced apart relative to the reference plane. In some embodiments, the rail arms of the rail, the rail legs of the rail, and/or the lag clip member of the lag clip may be co-planar. In some embodiments, the rail arms of the rail, the rail legs of the rail, and/or the lag clip member of the lag clip may be generally co-planar. In some embodiments, the rail arms of the rail, the rail legs of the rail, and/or the lag clip member of the lag clip may include one or more bent or curved portions.

One aspect is a torque actuated rail assembly selectively securable to a building surface. The rail assembly includes a rail and a lag clip. The rail includes a rail base which is bendable. The rail also includes two rail arms extending in a first latitudinal direction from the rail base. Each rail arm includes a sloped rail surface proximate to a rail protrusion. The sloped rail surfaces face inwardly toward a first reference plane that bisects the rail base. The first reference plane is approximately perpendicular to the rail base and is defined by a latitudinal axis and an extrusion axis. Each rail protrusion includes an exterior rail surface. The exterior rail surfaces define a second reference plane that is orthogonal to the first reference plane. The two rail arms are operable to transition from a first configuration to a second configuration following an application of a force to the sloped rail surfaces causing the bendable section of the rail to bend. In this manner, each of the sloped rail surfaces moves away from the first reference plane when the rails arms are in the second configuration.

The rail further includes two rail legs extending in a second latitudinal direction from the rail base. Each rail leg includes a rail hook. Each rail hook extends inwardly toward the first reference plane.

The lag clip includes an endwall. A first lag clip member and a second lag clip member extend in the first latitudinal direction from the endwall. Each lag clip member includes a lag catch. Each lag catch extends outwardly and faces away from the first reference plane. The rail hooks are configured to couple to the lag catches. The rail is disengageable from the lag clip when the two rail arms are in the first configuration. The rail is engaged (or locked or secured) to the lag clip when the two rail arms are in the second configuration which causes the rail hooks to move inwardly toward the first reference plane and press into the lag catches.

In some embodiments, the exterior rail surfaces of the rail protrusions define an uppermost portion of the rail.

Additionally, or alternatively, the rail and the lag clip may be fabricated from extruded aluminum.

The rail assembly may include one or more of the previous embodiments, and optionally, the two rail arms are approximately parallel to the first reference plane in the first configuration. In some embodiments, the two rail arms are set at an acute angle to the reference plane in the second configuration due to bending or alteration of the shape of the rail base.

Optionally, the two rail legs are spaced farther apart in a longitudinal direction than the two rail arms.

The rail arms are separated by a first width measured in the longitudinal direction. The first and second lag clip members are separated by a second width measured in the longitudinal direction. In some embodiments, the first and second widths are approximately equal. In other embodiments, the first width is greater than the second width.

The rail assembly may include one or more of the previous embodiments, and may optionally further comprise a rail nut positionable within a rail cavity defined by the rail base and the two rail arms. The rail nut includes a rail nut aperture. In some embodiments the rail nut aperture is threaded.

The rail cavity has a maximum width measured in the longitudinal dimension at a point between the rail base and beginnings of the sloped rail surfaces. The sloped rail surfaces decrease the width of the rail cavity. Accordingly, the rail cavity has a second width measured between innermost portions of the sloped rail surfaces. The second width is less than the maximum width.

In at least one embodiment, the innermost portions of the sloped rail surfaces intersect the rail protrusions. In this manner, the rail protrusions define stops to prevent the rail nut from being drawing off of the sloped rail surfaces and out of the rail cavity.

In some embodiments, the rail assembly further comprises a grab positionable a select latitudinal distance from the exterior rail surface of each rail protrusion, the grab including a grab aperture. In some embodiments, the grab aperture is not threaded.

The grab includes a grab fastener extendable through the grab aperture and through the rail nut aperture to selectively couple the rail nut to the grab. In at least one embodiment, the grab fastener has a threaded shaft.

An application of torque to the grab fastener draws the rail nut from a first latitudinal position within the rail cavity in the first configuration to a second latitudinal position within the rail cavity in the second configuration, the second latitudinal position being closer to the rail protrusions than the first latitudinal position. In this manner, the force is applied by the rail nut to the sloped rail surfaces when the rail nut is in the second latitudinal position, the force causing at least a portion of the rail base to bend in the longitudinal direction.

The rail assembly many include any one or more of the previous embodiments, and the grab optionally further comprises: (a) a grab body; (b) a first sidewall and a second sidewall extending in a latitudinal direction from the grab body, the first sidewall having a first exterior surface and the second sidewall having a second exterior surface, the grab aperture being positioned between the first and second sidewalls; (c) a first grab protrusion extending from the grab body and away from the first exterior surface, the first grab protrusion having a first grab surface, the first grab surface and the first exterior surface defining a first cavity to engage a first building accessory; (d) a second grab protrusion extending from the grab body and away from the second exterior surface, the second grab protrusion having a second grab surface, the second grab surface and the second exterior surface defining a second cavity for a second building accessory. Optionally, the first and second building accessories are photovoltaic modules.

In some embodiments, the grab is fabricated from stainless steel and configured to operate as a ground for a photovoltaic module. Optionally, at least one of the first exterior surface of the first sidewall, the second exterior surface of the second sidewall, the first grab surface, and the second grab surface includes a spike configured to engage a frame of the photovoltaic module.

The rail assembly optionally further comprises a second lag clip and a second grab assembly, the second lag clip and the second grab assembly being spaced on the rail a select distance from the lag clip and the grab assembly.

The rail assembly may include one or more of the previous embodiments and the lag clip may further comprise a lag clip aperture extending through the endwall. The lag clip aperture is configured to receive a building fastener to secure the lag clip to the building surface when the building fastener extends into an aperture in building surface. In some embodiments, the building surface comprises a rib with an endwall that includes an existing aperture for the building fastener. In at least one embodiment, the lag clip aperture is not threaded.

In some embodiments, the rail assembly further comprising a gasket selectively positionable between an exterior surface of the endwall of the lag clip and the building surface when the lag clip is coupled to the building surface via the building fastener.

Optionally, the exterior surface of the lag clip endwall comprises two gasket protrusions configured to confine the gasket in a select position proximate to the lag clip aperture.

The rail assembly may include any one or more of the previous embodiments, and optionally, in the first configuration, the rail protrusions of the two rail arms are separated by a first distance measured in the longitudinal direction orthogonal to the first reference plane. A rail extrusion slot is defined between ends of the rail protrusions. In the second configuration, the rail protrusions are separated by a second distance that is greater than the first distance. The second distance is measured in the longitudinal direction.

In some embodiments, in the first configuration, the rail hooks of the two rail legs are separated by a third distance. In the second configuration, the rail hooks are separated by a fourth distance that is less than the third distance. The third and fourth distances are measured in the longitudinal direction.

The rail assembly may include one or more of the previous embodiments, and optionally the lag catches of the first and second lag clip members are separated by a fifth distance in the first configuration. In the second configuration, the lag catches are pressed inwardly toward the first reference plane by the rail hooks such that the lag catches are separated by a sixth distance that is less than the fifth distance. The fifth and sixth distances are measured in the longitudinal direction.

In some embodiments, the rail base comprises a scalloped area that defines a bendable section of the rail base. The scalloped area may be described as a hinge or area of weakness.

Additionally, or alternatively, the two rail arms extend away from a first surface of the rail base, and the scalloped area extends into a second surface of the rail base.

The rail assembly may include any one or more of the previous embodiments, and optionally the scalloped area is concave and includes an opening facing in the second latitudinal direction. In some embodiments, the scalloped area is positioned between the rail legs.

The rail assembly may include any one or more of the previous embodiments, and optionally the rail base has a first shape when the two rail arms are in the first configuration. In some embodiments, the first shape of the rail base is generally linear. Optionally, the first surface of the base from which the two rail arms extend is generally planar when the rail arms are in the first configuration. Additionally, or alternatively, the second surface of the base opposite to the first surface may be generally planar when the rail arms are in the first configuration.

In the second configuration, the rail base has a second shape that is different from the first shape. In some embodiments, the second shape of the rail base is not linear in the longitudinal direction orthogonal to the first reference plane. Optionally, the first surface of the base from which the two rail arms extend is convex in the longitudinal direction when the rail arms are in the second configuration. Additionally, or alternatively, the second surface of the base opposite to the first surface may be concave in the longitudinal direction when the rail arms are in the second configuration.

Another aspect of the present disclosure is a system to couple a photovoltaic module to a rib of a building surface. The system comprises a rail, a lag clip, and a grab assembly. The rail comprises a rail hook. The lag clip has an aperture and a lag catch configured to couple to the rail hook. The lag clip is configured to couple to the rib of the building surface when a building fastener is extended through the aperture and into a fastener aperture in the rib. The grab assembly is configured to cause the rail hook to engage with the lag catch following application of a force. The grab assembly and the rail are configured to position the photovoltaic module a select latitudinal distance above the building fastener.

In some embodiments, the rail comprises: (a) a rail base configured to bend; (b) an arm extending in a first latitudinal direction away from a first surface of the rail base, the arm including a sloped rail surface proximate to a rail protrusion, the protrusion including an exterior rail surface; and (c) a leg extending in a second latitudinal direction away from a second surface of the rail base, the leg including the rail hook. The rail hook extends toward the second surface of the rail base.

The sloped rail surface of the arm faces a first reference plane defined by a latitudinal axis and an extrusion axis. The rail hook also faces the first reference plane. The first reference plane bisects and is oriented perpendicular to the rail base.

Optionally, the lag clip comprises (a) an endwall with an exterior surface that defines a second reference plane orthogonal to the first reference plane; and (b) a lag clip member extending from the endwall and including the lag catch, the lag catch extending away from an outer surface of the lag clip member and toward the second reference plane. The lag catch faces away from the first reference plane.

The rail is removable from the lag clip when the arm is in a first configuration. When the arm is in a second configuration, the rail is engaged to the lag clip. The arm is configured to transition between the first configuration and the second configuration following the application of the force by the grab assembly to the sloped rail surface which causes the rail base to bend.

The system may include one or more of the previous embodiments, and optionally the grab assembly comprises: (a) a rail nut selectively positioned within a rail cavity of the rail, the rail nut including a rail nut aperture; (b) a grab of the grab assembly selectively spaced a select distance from the exterior rail surface of the rail protrusion, the grab including a grab aperture; and (c) a grab fastener extendable through the grab aperture to threadably engage the rail nut aperture to selectively couple the grab to the rail nut. An application of torque to the grab fastener draws the rail nut from a first position within the rail cavity in the first configuration to a second position within the rail cavity in the second configuration and causes the rail nut to engage the sloped rail surface and to apply the force to the sloped rail surface.

Another aspect of the disclosure is to provide a torque actuated rail assembly selectively securable to a surface of a building. The rail assembly comprises a rail and a lag foot. The rail includes a rail base. In some embodiments, the rail base has a bendable section or is configured to bend. The rail includes two rail arms extending in a first latitudinal direction from the rail base. Each rail arm includes a sloped rail surface proximate to a rail protrusion. Each rail protrusion includes an exterior rail surface.

Each of the sloped rail surfaces faces a first reference plane defined by a latitudinal axis and an extrusion axis. The first reference plane bisects and is oriented perpendicular to the rail base.

The two rail arms are configured to transition from a first configuration to a second configuration following an application of a force to the sloped rail surfaces causing the rail base to bend or fold.

The rail includes two rail legs extending in a second latitudinal direction from the rail base. Each rail leg includes a rail hook. Each rail hook extends inwardly toward the first reference plane.

The lag foot includes a lag plate and a lag body extending from the lag plate. The lag plate comprises a first surface with a first lag catch facing in a first longitudinal direction away from the first reference plane and a second surface with a second lag catch facing in a second longitudinal direction away from the first reference plane. The second longitudinal direction is opposite to the first longitudinal direction.

The rail hooks are configured and operable to couple to the lag catches. The rail is disengageable from the lag foot when the two rail arms are in a first configuration and the rail hooks disengage from the lag catches. The rail is engaged or secured to the lag foot when the two rail arms are in the second configuration and the rail hooks move inwardly toward the first reference plane and press into the first and second lag catches.

The first lag catch extends from the first surface in the first longitudinal direction. The second lag catch extends from the second surface in the second longitudinal direction.

In some embodiments the first surface is approximately parallel to the first reference plane. Additionally, or alternatively, the second surface is orientated at an oblique angle to the first reference plane. Optionally, a bottom end of the second surface proximate to the lag plate is a first distance from the first reference plane measured in the longitudinal direction. An upper end of the second surface spaced from the lag plate is a second distance from the first reference plane, the first distance being greater than the second distance.

In some embodiments, the exterior rail surfaces of the rail protrusions define an uppermost portion of the rail.

The rail assembly may include one or more of the previous embodiments, and optionally, the two rail arms are approximately parallel to the first reference plane in the first configuration. In some embodiments, the two rail arms are set at an acute angle to the first reference plane in the second configuration.

The rail assembly may include one or more of the previous embodiments, and may optionally further comprise a rail nut positionable within a rail cavity defined by the rail base and the two rail arms. The rail nut includes a rail nut aperture. In some embodiments, the rail nut aperture is threaded.

In some embodiments, the rail assembly further comprises a grab positionable a select latitudinal distance from the exterior rail surface of each rail protrusion, the grab including a grab aperture. The grab includes a grab fastener with a shaft extendable through the grab aperture and through the rail nut aperture to selectively couple the rail nut to the grab. The shaft of the grab fastener may be threaded.

An application of torque to the grab fastener draws the rail nut from a first latitudinal position within the rail cavity in the first configuration to a second latitudinal position within the rail cavity in the second configuration, the second latitudinal position being closer to the rail protrusions than the first latitudinal position. In this manner, the force is applied by the rail nut to the sloped rail surfaces when the rail nut is in the second latitudinal position which causes at least a portion of the rail base to bend.

The lag plate extends in a longitudinal direction away from the first reference plane. In some embodiments, the lag plate is oriented approximately perpendicular to the first reference plane.

The lag plate optionally includes an aperture extending through upper and lower surfaces of the lag plate. In some embodiments the aperture is not threaded. The lag plate aperture is configured to receive a fastener to secure the lag plate to the building surface or to a clamp secured to the building surface. In some embodiments, the building surface comprises a rib with an endwall that includes an existing aperture for the building fastener.

In some embodiments the lag plate aperture is extended to define a slot. The slot optionally extends approximately parallel to the first reference plane. Additionally, or alternatively, the slot may extend approximately perpendicular to the first reference plane. In at least one embodiment, the slot extends to an edge or an end of the lag plate.

The rail assembly may include any one or more of the previous embodiments, and optionally, in the first configuration, the rail protrusions of the two rail arms are separated by a first distance measured in the longitudinal direction orthogonal to the first reference plane. A rail extrusion slot is defined between ends of the rail protrusions. In the second configuration, the rail protrusions are separated by a second distance that is greater than the first distance. The second distance is measured in the longitudinal direction.

In some embodiments, in the first configuration, the rail hooks of the two rail legs are separated by a third distance. In the second configuration, and the rail hooks are separated by a fourth distance that is less than the third distance. The third and fourth distances are measured in the longitudinal direction.

In some embodiments, the rail base comprises a scalloped area that defines a bendable section of the rail base. The scalloped area may be described as a hinge or area of weakness. The scalloped area is configured to facilitate bending of the rail base when the rail nut engages the sloped rail surfaces.

Additionally, or alternatively, the two rail arms extend away from a first surface of the rail base, and the scalloped area extends into a second surface of the rail base. The rail assembly may include any one or more of the previous embodiments, and optionally the scalloped area is concave and includes an opening facing in the second latitudinal direction. In some embodiments, the scalloped area is positioned between the rail legs.

Another aspect of the present disclosure is a method of coupling a mounting system to a metal panel of a building surface. The method generally comprises: (1) withdrawing a building fastener from a hole in the metal panel; (2) providing a lag clip of the mounting system, the lag clip comprising: (a) an endwall with a first endwall surface and a second endwall surface opposite to the first endwall surface; (b) an aperture extending through the endwall; (c) a lag clip member extending from the endwall and away from the first endwall surface; and (d) a lag catch extending away from an outer surface of the lag clip member; (3) positioning the lag clip on the metal panel such that the aperture is aligned with the hole in the metal panel and with the lag clip member extending away from the metal panel; (4) extending the building fastener through the aperture and into the hole, wherein the endwall of the lag clip is clamped between a head of the building fastener and the metal panel; (5) positioning a rail of the mounting system on the lag clip, the rail comprising: (a) a rail base with a first surface and an opposite second surface facing the lag clip; (b) an arm extending in a first latitudinal direction away from the first surface, the arm including a free end, a rail protrusion proximate to the free end and including an exterior rail surface that defines an uppermost portion of the rail, and a sloped rail surface between the rail base and the rail protrusion, the arm having a first configuration and a second configuration; (c) a rail cavity defined in part by the first surface and the arm; and (d) a leg extending in a second latitudinal direction away from the second surface, the leg including a rail hook selectively engageable with the lag catch; (6) positioning a rail nut within the rail cavity, the rail nut including a rail nut aperture; (7) positioning a grab of the mounting system proximate to the rail protrusion of the arm, the grab comprising a grab aperture; and (8) extending a threaded shaft of a grab fastener through the grab aperture and into threaded engagement with the rail nut aperture. An application of torque to the grab fastener draws the rail nut from a first position within the rail cavity into a second position in engagement with the sloped rail surface such that the arm transitions from the first configuration to the second configuration and the rail hook engages the lag catch to couple the mounting system to the rib. In this manner, the mounting system may be coupled to the rib without forming a new hole through the metal panel and without damaging the metal panel.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated. Unless otherwise indicated, the term "substantially" indicates a different of from 0% to 5% of the stated value is acceptable. All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

Unless otherwise stated, any embodiment described throughout the present disclosure should be understood as being individually implementable and/or combinable with any other embodiment or embodiments described throughout the present disclosure.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 1I is a perspective view of a lag clip of the torque actuated rail assembly in FIG. 1A, in accordance with one or more embodiments of the present disclosure;

Figure 1A:
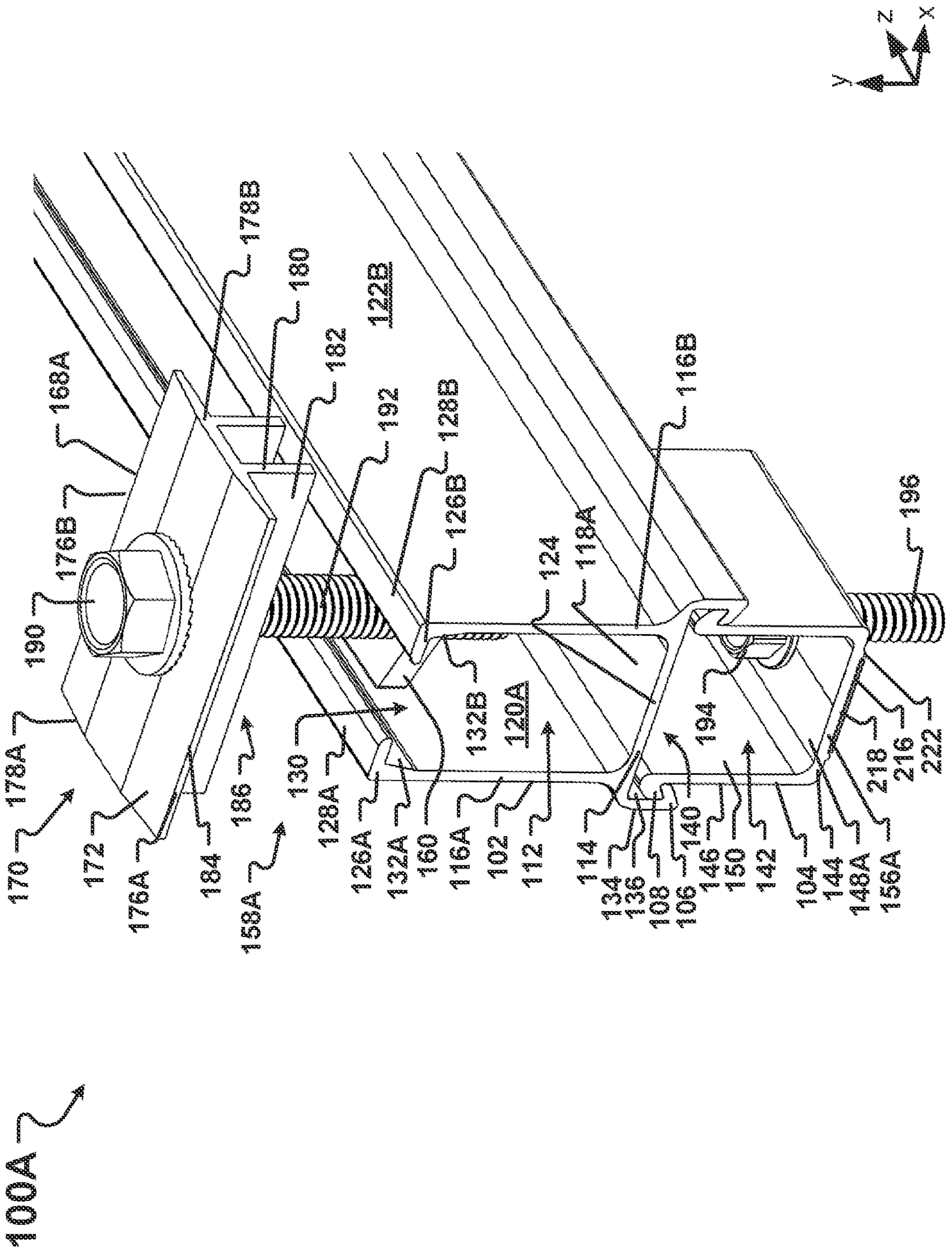
FIG. 1A is a perspective view of a rail and lag clip of a torque actuated rail assembly and a grab assembly for interconnecting structures, such as photovoltaic modules, to a metal panel defining a building surface, in accordance with one or more embodiments of the present disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 100 | Rail assembly |
| 102 | Rail |
| 104 | Lag clip |
| 106 | Rail hook |
| 108 | Lag catch |
| 110 | Reference plane |
| 112 | Rail cavity |
| 114 | Rail base |
| 116A, 116B | Rail arm |
| 118A, 118B | Rail base surface |
| 120A, 120B | Interior surface |
| 122A, 122B | Exterior surface |
| 124 | Bendable portion |
| 126A, 126B | Rail protrusion |
| 128A, 128B | Exterior surface |
| 130 | Rail Extrusion Slot |
| 132A, 132B | Sloped surface |
| 134 | Rail leg |
| 136 | Interior surface |
| 138 | Exterior surface |
| 140 | Rail leg pocket |
| 142 | Chamber |
| 144 | Endwall |
| 146 | Member |
| 148A | First surface |
| 148B | Second surface |
| 150A, 150B | Interior surface |
| 152A, 152B | Exterior surface |
| 154A, 154B, 154C | Aperture |
| 156A, 156B | End |
| 158A, 158B | Grab assembly |
| 160 | Rail nut |
| 162A, 162B | Surface |
| 164 | Corner |
| 166 | Aperture |
| 168A, 168B | Grab |
| 170 | Grab body |
| 172 | Upper surface |
| 174 | Lower surface |
| 176A, 176B | Edge |
| 178A, 178B | End |
| 180 | Sidewall |
| 182 | Exterior surface |
| 184 | Grab protrusion |
| 186 | Gap |
| 188 | Grab aperture |
| 190 | Grab fastener |
| 192 | Threaded shaft |
| 194 | Building fastener |
| 196 | Threaded shaft |
| 198 | Building surface |
| 200 | Trapezoidal rib |
| 202 | Panel |
| 204 | Base section |
| 206 | Minor rib |
| 208A, 208B | Edge portion |
| 210 | Upper surface |
| 212A, 212B | Rib sides |
| 214 | Rib hollow |
| 216 | Gasket |
| 218 | Exterior surface |
| 220 | Gasket aperture |
| 222 | Gasket protrusion |
| 224 | Photovoltaic module |
| 226 | Frame |

-continued

| Number | Component |
|---|---|
| 228 | Photovoltaic system |
| 230A, 230B | Member portion |
| 232 | Lag foot |
| 234 | Lag body |
| 236 | Surface |
| 238 | Lag plate |
| 240A, 240B | Surface |
| 242A, 242B | Edge |
| 244A, 244B | End |
| 246A, 246B, 246C | Aperture |
| 248A, 248B, 248C | Rail arm portion |
| 250 | Rail tab |
| 252A, 252B | Surface |
| 254 | Slot |
| 256A, 256B | Cavity portion |
| 258 | Grab protrusion |
| x-direction | Width or longitudinal direction |
| y-direction | Height or latitudinal direction |
| z-direction | Length or extrusion direction |

DETAILED DESCRIPTION

The present disclosure generally relates to a torque actuated rail assembly for installing structures, such as photovoltaic modules, to a metal panel defining a building surface, according to one or more embodiments. The rail assembly as described throughout the disclosure may be capable of coupling to a building surface while preventing damage caused by installing additional screws in the building surface and without creating new penetrations through the building surface. The rail assembly as described throughout the disclosure may be capable of securing the photovoltaic module to the building surface without damaging or otherwise interfering with the operation of the photovoltaic module.

Embodiments of the present disclosure are directed to a torque actuated rail assembly. Embodiments of the present disclosure are also directed to a rail and lag clip or lag foot of the rail assembly. Embodiments of the present disclosure are also directed to a grab assembly of the rail assembly. Embodiments of the present disclosure are also directed to the grab assembly and the rail being configured to receive a portion of a photovoltaic module, the lag clip being configured to receive a building fastener, and the rail assembly being configured to secure the photovoltaic module to a building surface including trapezoidal ribs. Embodiments of the present disclosure are also directed to one or more rail hooks of the rail being configured to couple to one or more lag catches of the lag rail or lag foot. Embodiments of the present disclosure are also directed to the one or more rail hooks of the rail being configured to engage the one or more lag catches of the lag rail or lag foot through an application of force to the grab assembly and the transfer of that force to sloped rail surfaces of the rail, where engaging the sloped rail surfaces causes the one or more rail hooks to press against the one or more lag catches.

Figure 1B:
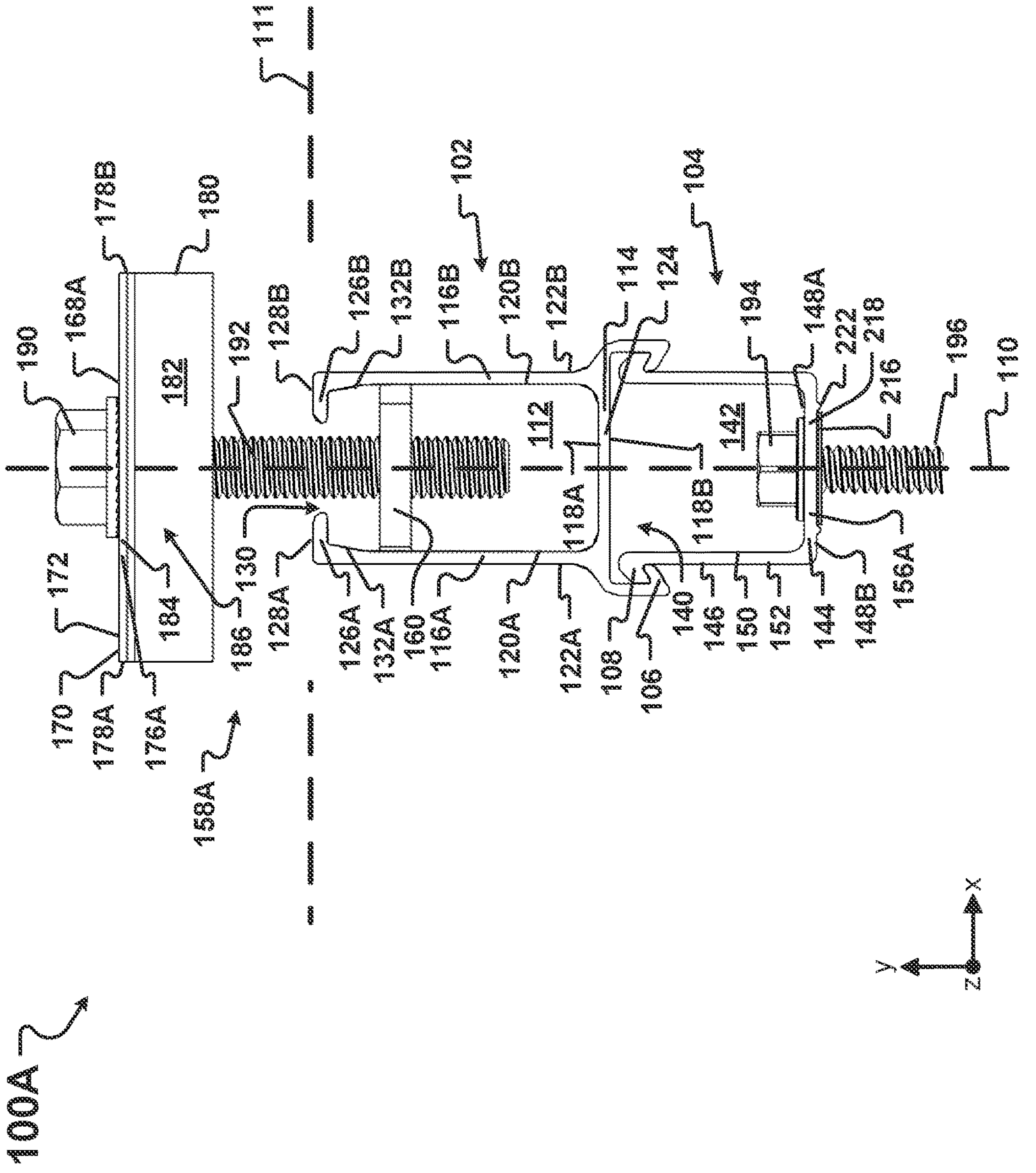
FIG. 1B is a front elevation view of the torque actuated rail assembly and the grab assembly in FIG. 1A in a disengaged configuration, in accordance with one or more embodiments of the present disclosure.
Figure 1C:
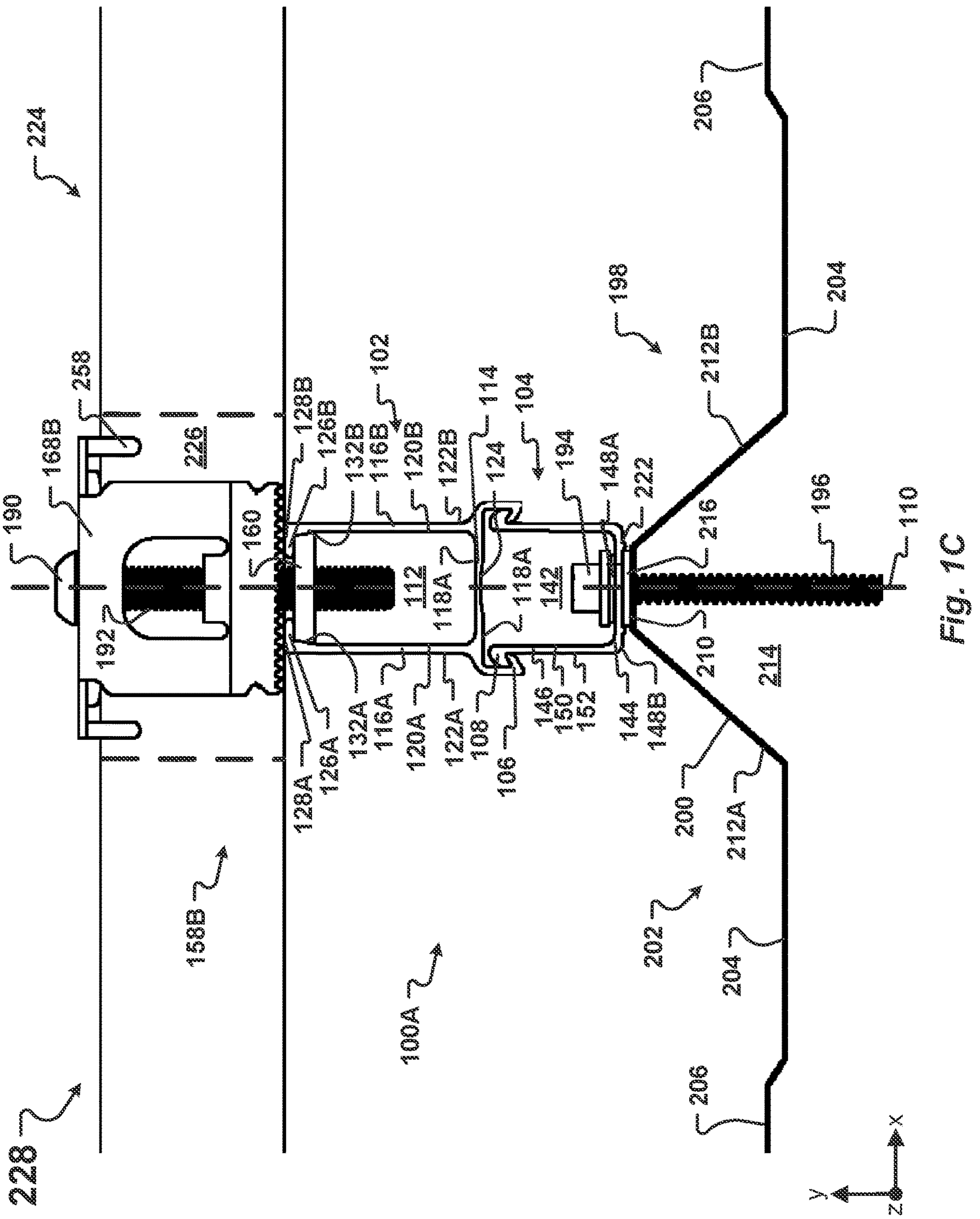
FIG. 1C is a front elevation view of a rail and lag clip of the torque actuated rail assembly in FIG. 1A in an engaged configuration and an alternate grab assembly, in accordance with one or more embodiments of the present disclosure.
Figure 1D:
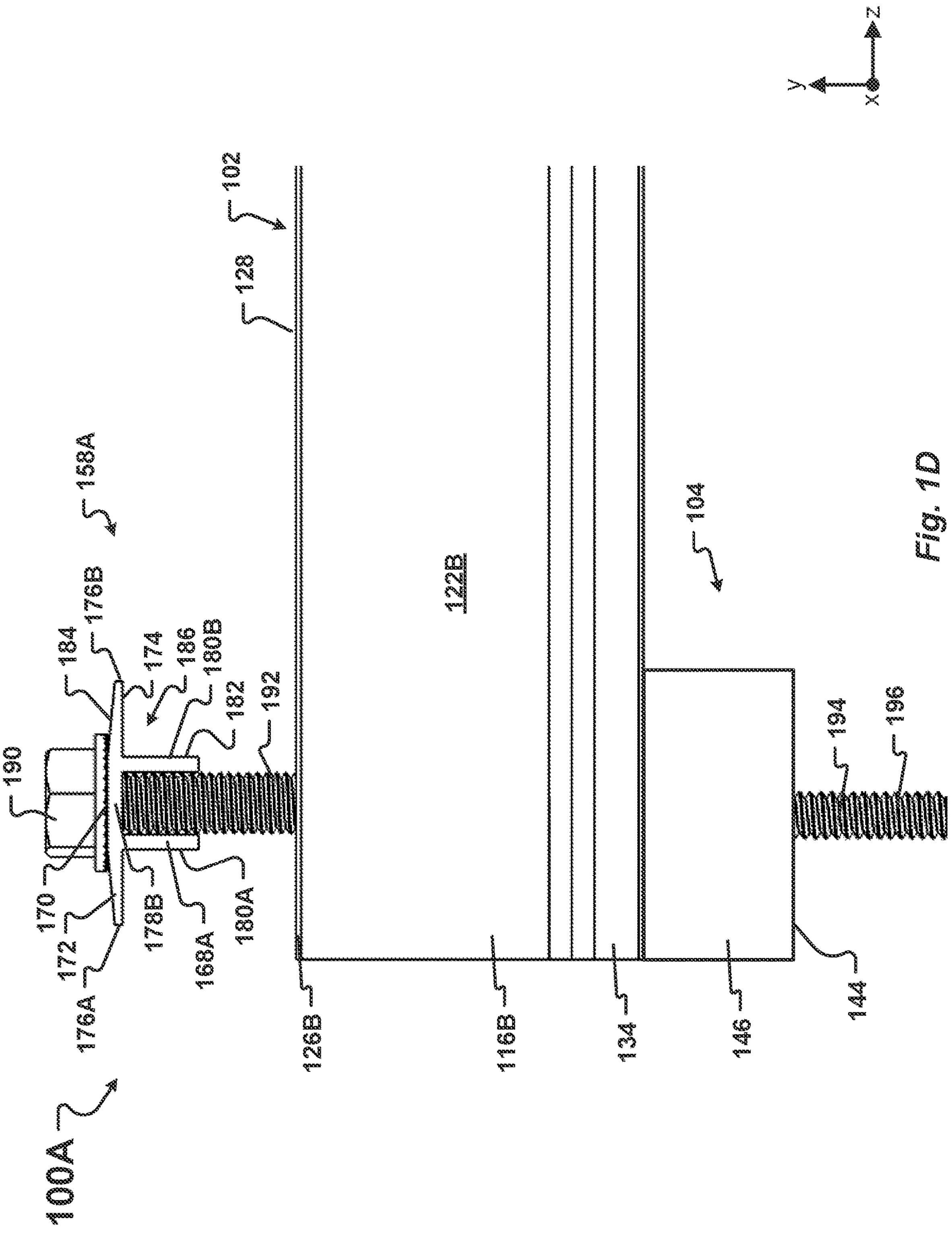
FIG. 1D is a side elevation view of the torque actuated rail assembly in FIG. 1A, in accordance with one or more embodiments of the present disclosure.
Figure 1F:
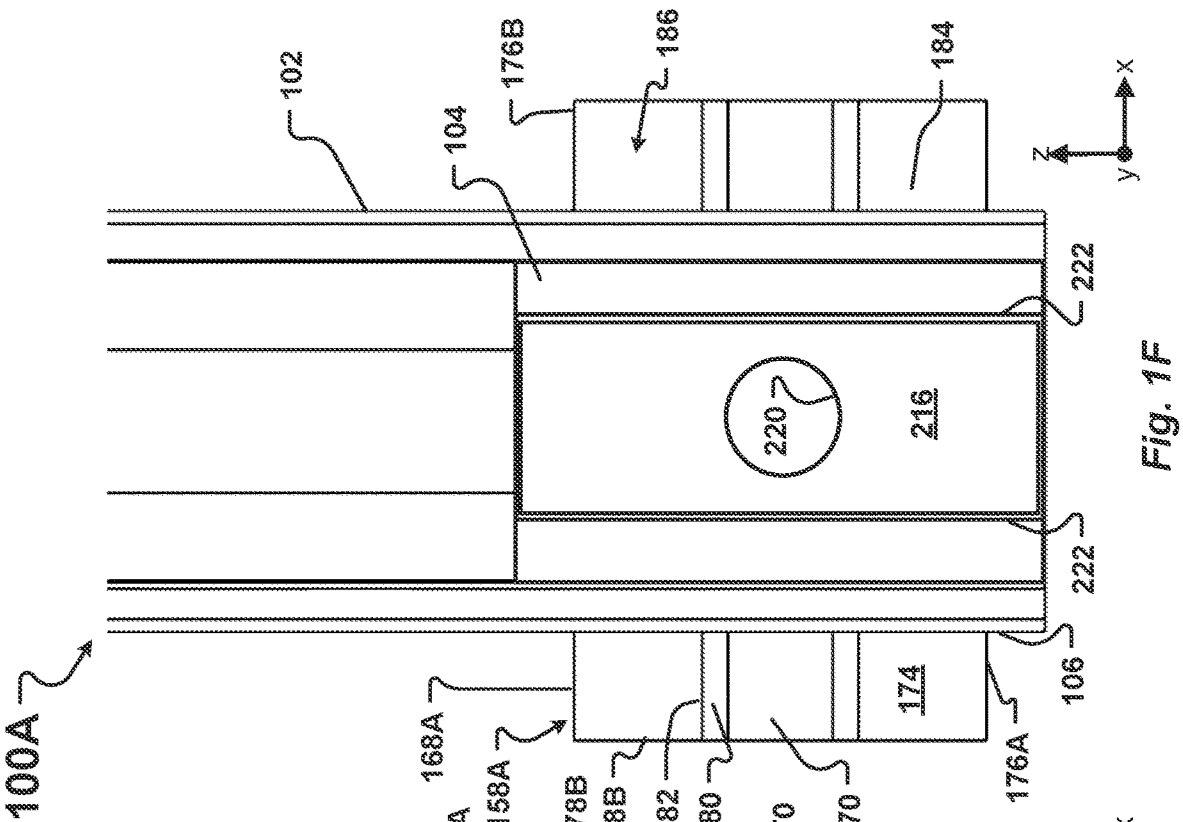
FIG. 1F is a bottom plan view of the torque actuated rail assembly in FIG. 1A, in accordance with one or more embodiments of the present disclosure.
Figure 1E:
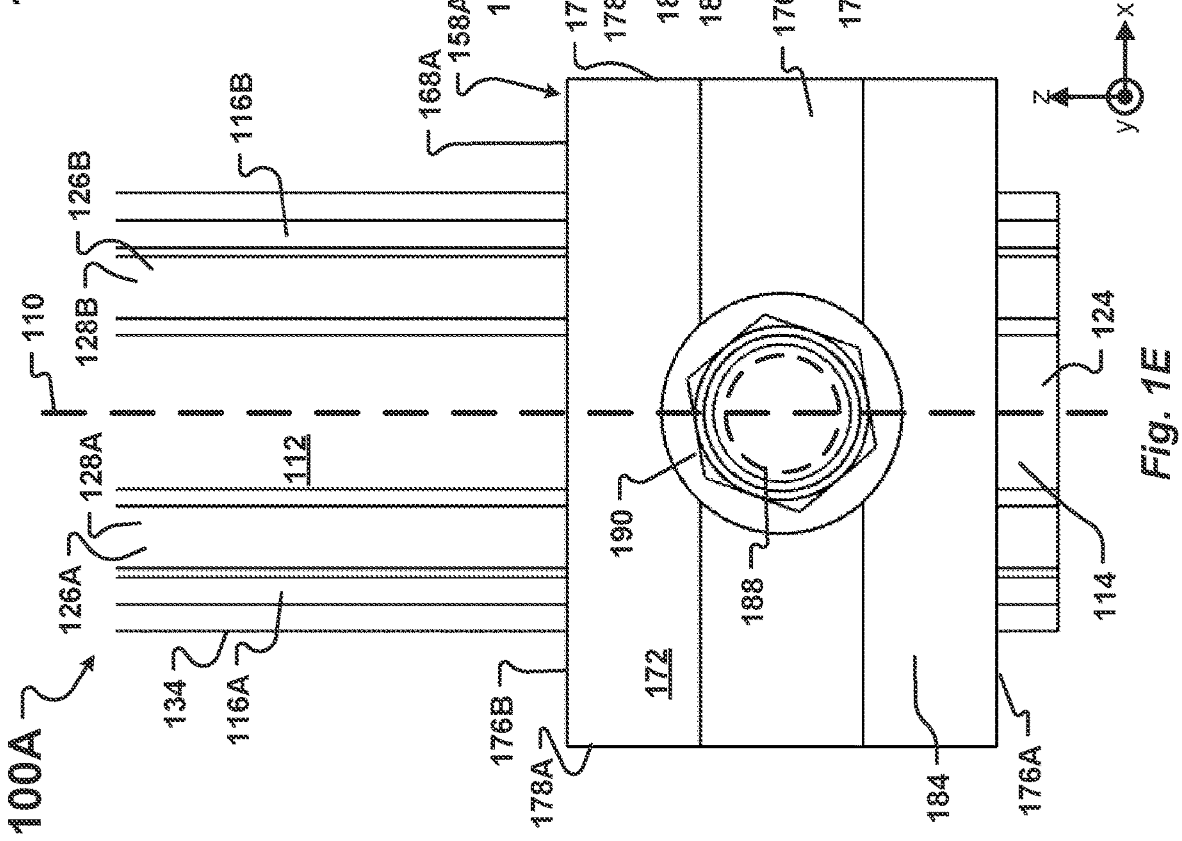
FIG. 1E is a top plan view of the torque actuated rail assembly in FIG. 1A, in accordance with one or more embodiments of the present disclosure.
Figure 1G:
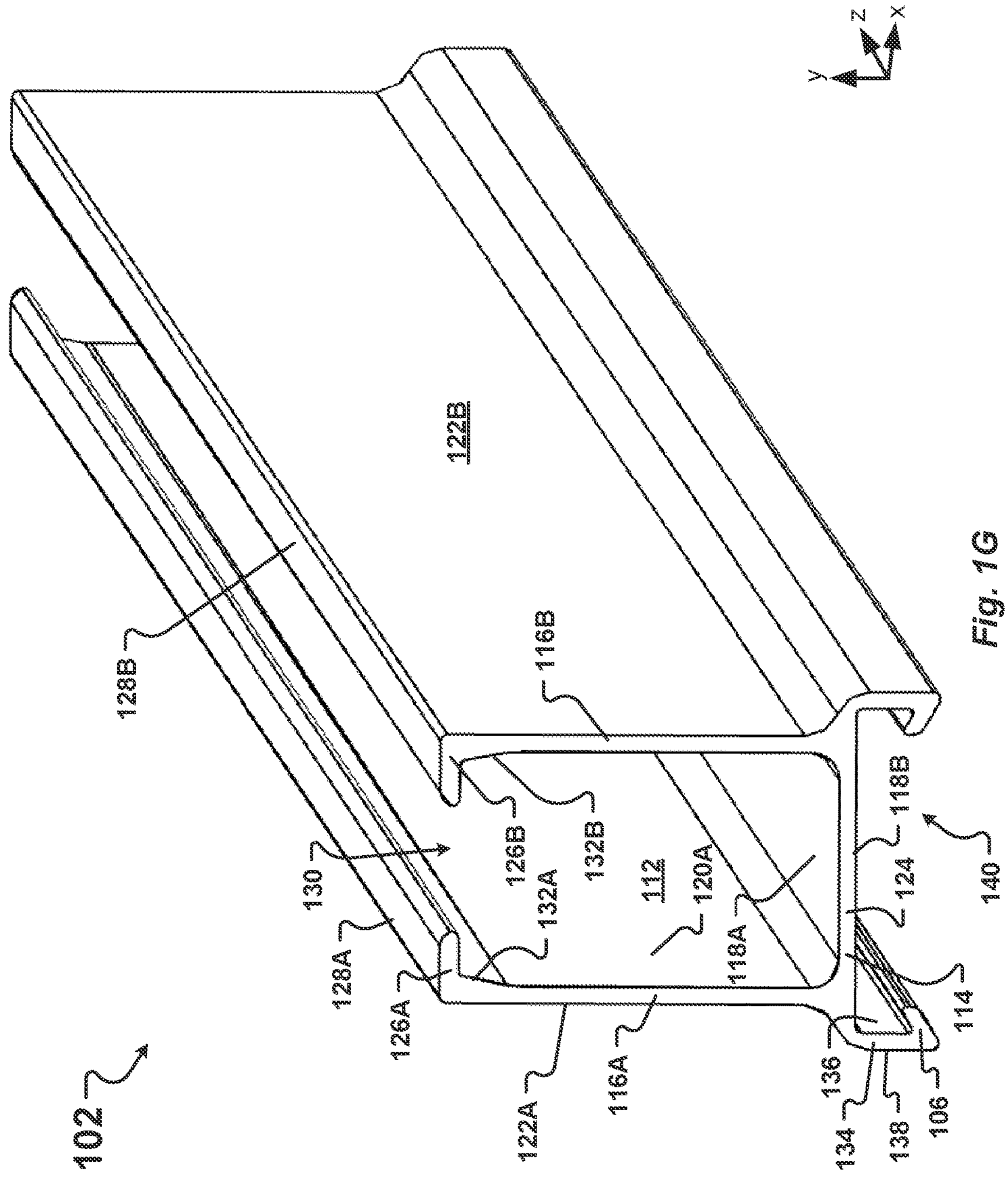
FIG. 1G is a perspective view of a rail of the torque actuated rail assembly in FIG. 1A, in accordance with one or more embodiments of the present disclosure.
Figure 1H:
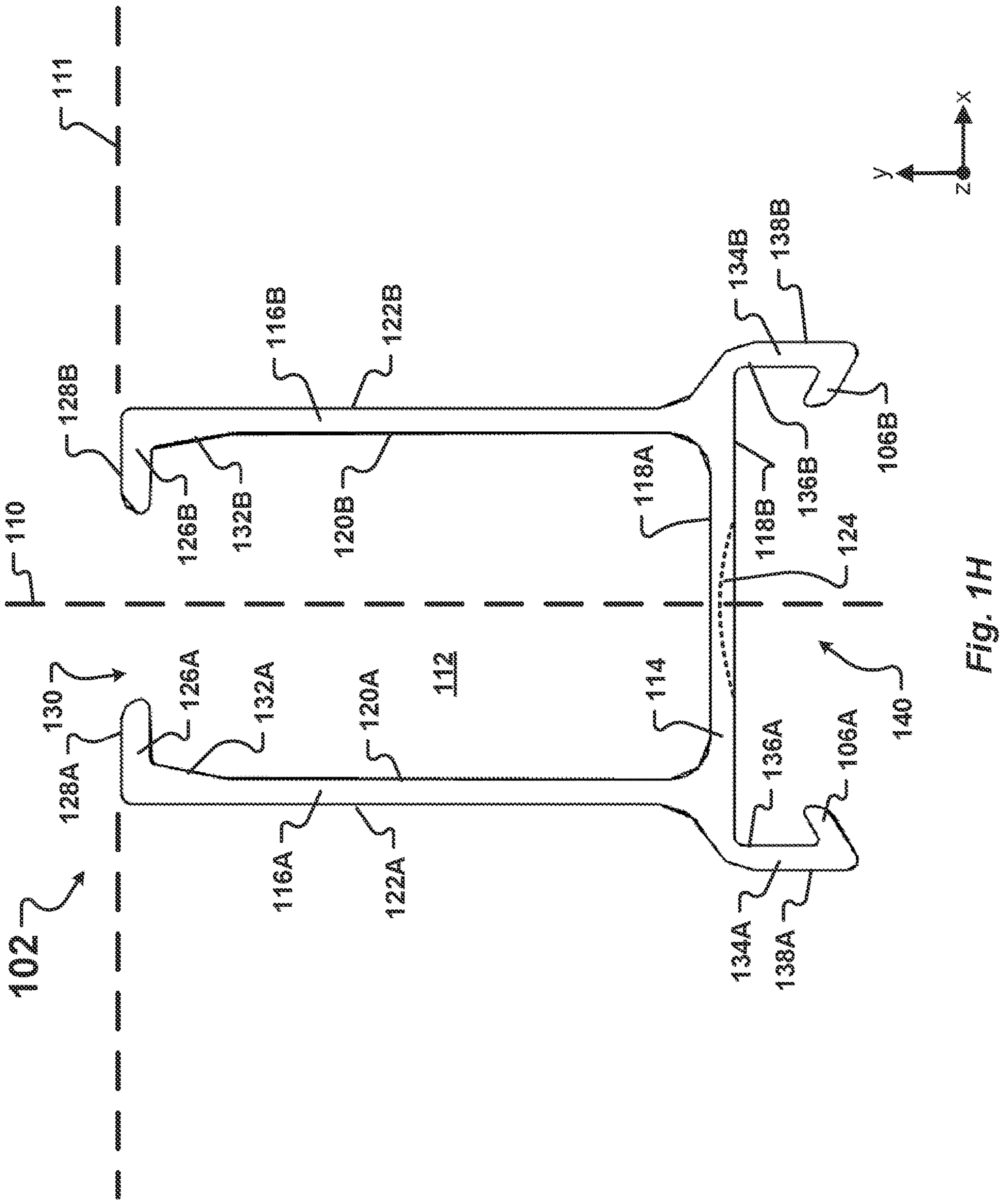
FIG. 1H is a front elevation view of the rail in FIG. 1G, in accordance with one or more embodiments of the present disclosure.
Figure 11:
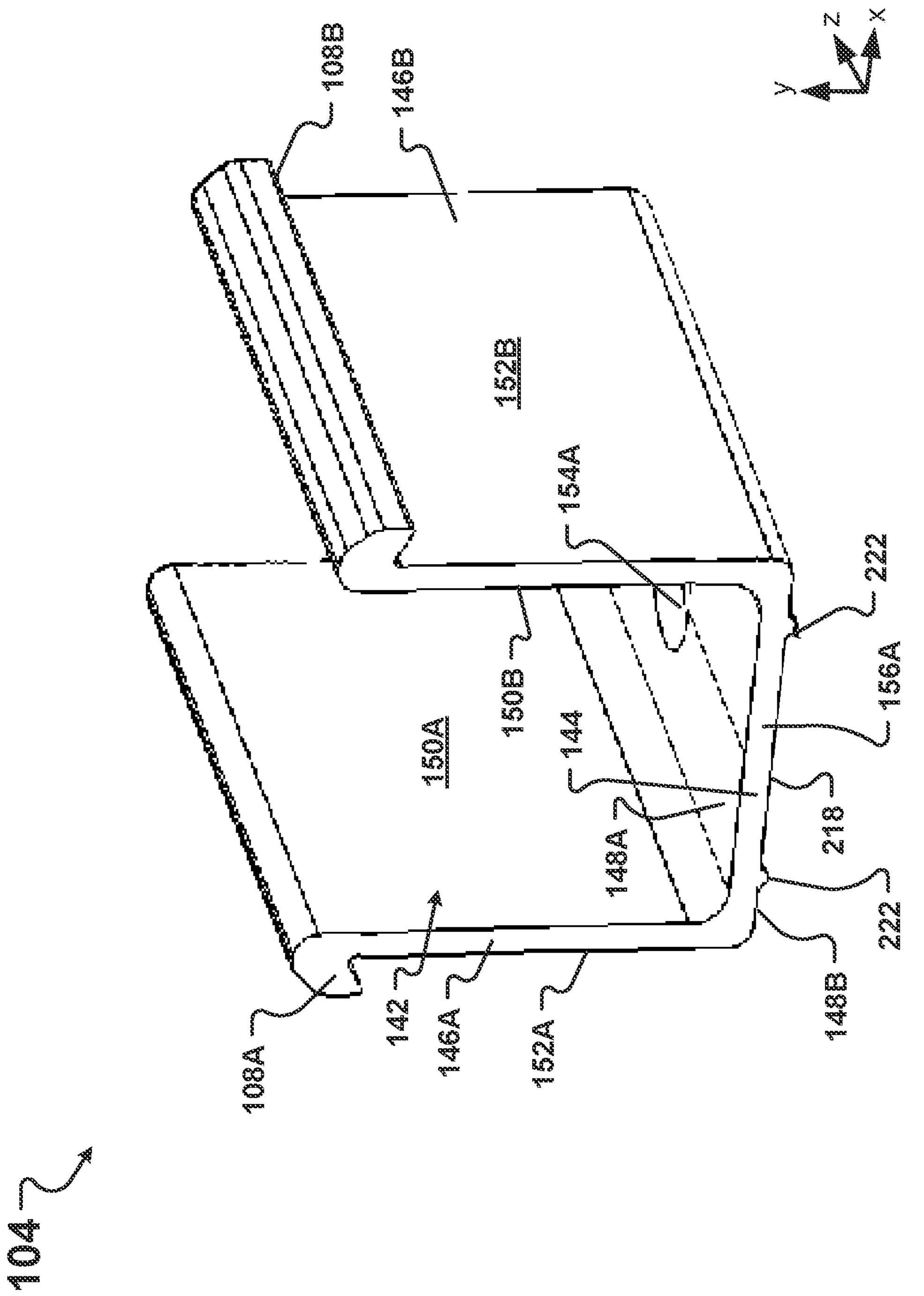
Figure 1K:
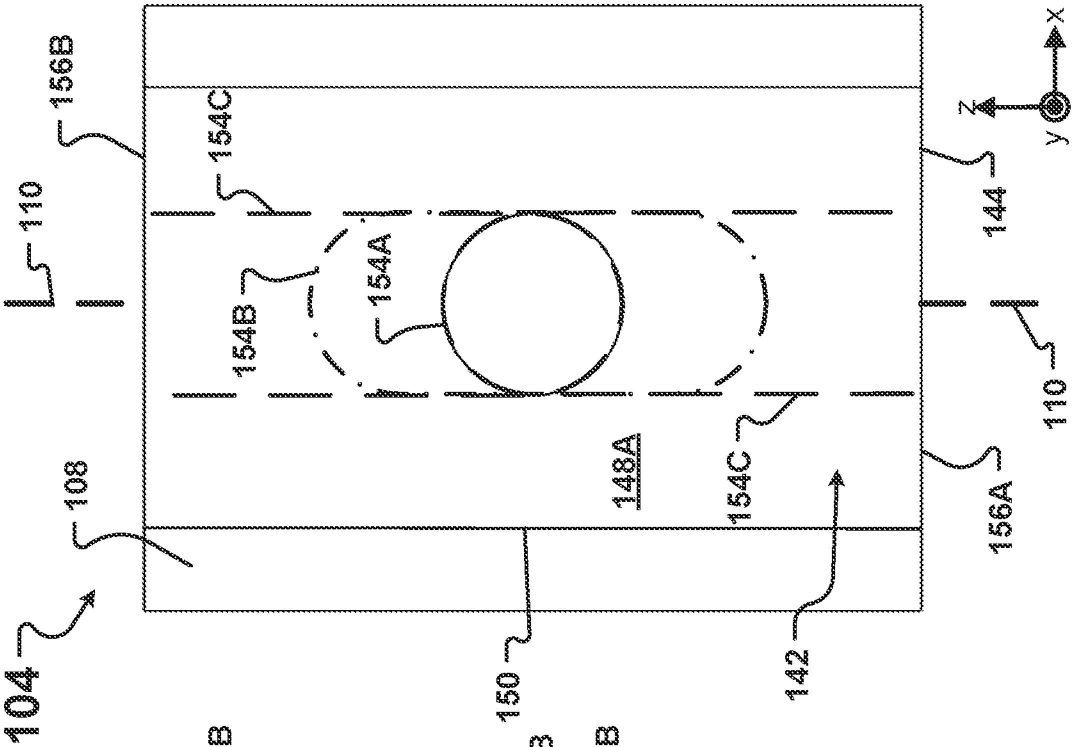
FIG. 1K is a bottom plan view of the lag clip in FIG. 1I, in accordance with one or more embodiments of the present disclosure.
Figure 1J:
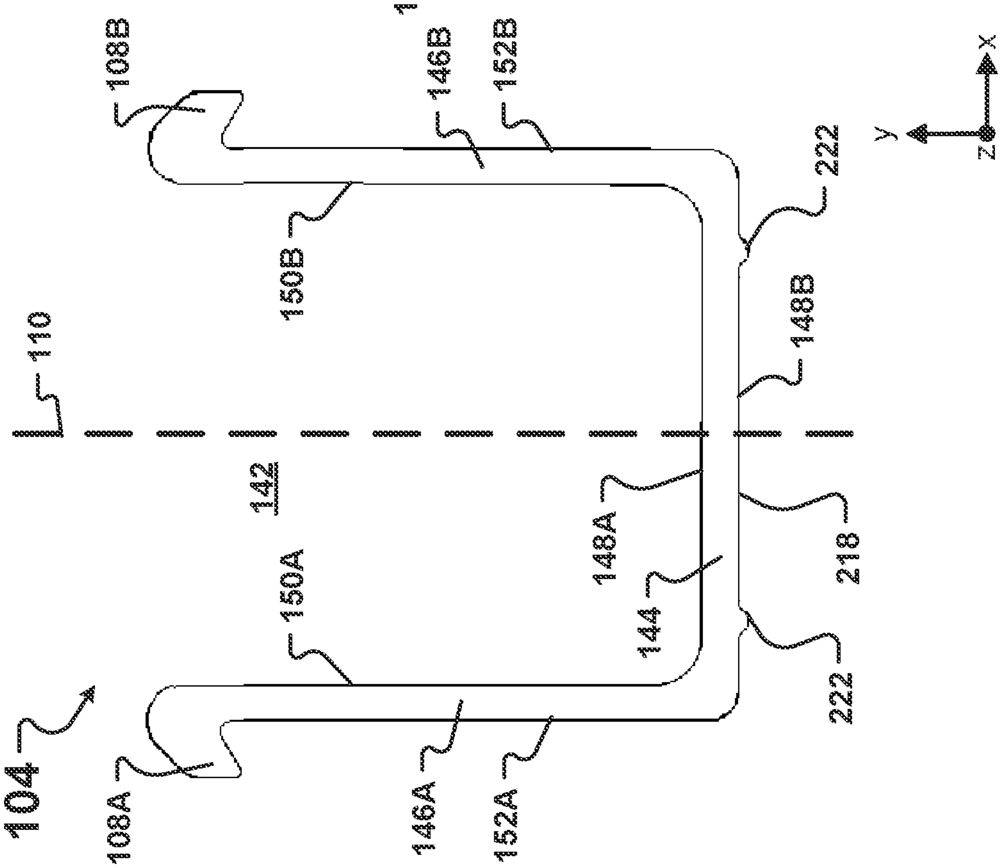
FIG. 1J is a front elevation view of the lag clip in FIG. 1I, in accordance with one or more embodiments of the present disclosure.
Figures 1L, 1M, 1N:
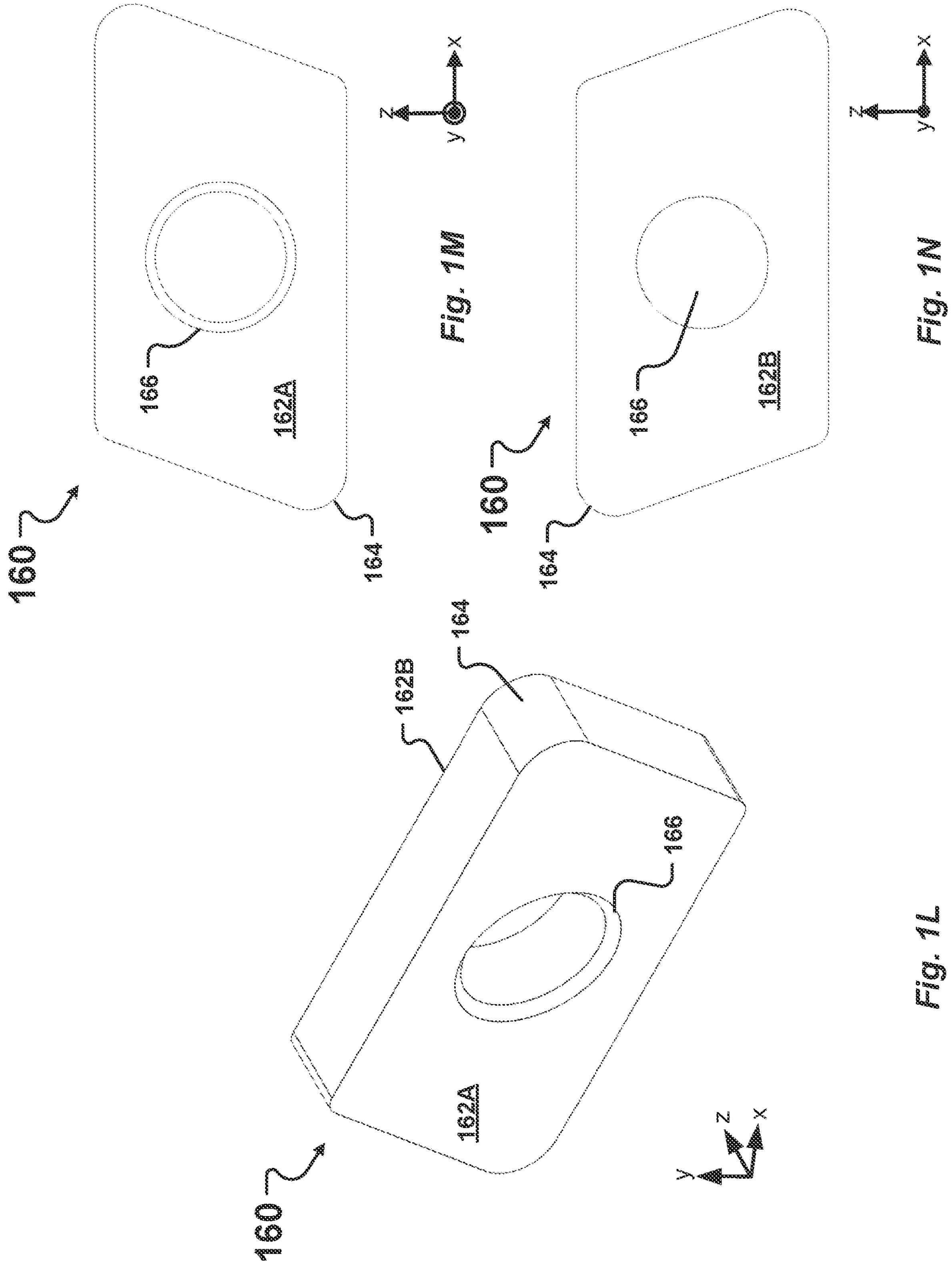
FIG. 1L is a perspective view of a rail nut of the torque actuated rail assembly in FIG. 1A, in accordance with one or more embodiments of the present disclosure.
FIG. 1M is a top plan view of the rail nut in FIG. 1L, in accordance with one or more embodiments of the present disclosure.
FIG. 1N is a bottom plan view of the rail nut in FIG. 1L, in accordance with one or more embodiments of the present disclosure.

Referring in general to FIGS. 1A-1N, in one embodiment a torque actuated rail assembly 100A (or "rail assembly 100A", or "assembly 100A", for purposes of the present disclosure) includes a rail 102 and a lag clip 104. In one embodiment, the rail 102 and/or the lag clip 104 are each formed as a one piece or integrated device by being extruded in one direction. For example, the rail 102 and/or the lag clip 104 may be fabricated from extruded aluminum. As such, as depicted in FIGS. 1A-IN the rail assembly 100A and its components may be defined with respect to a coordinate system where the x-direction represents a "width" or longitudinal direction, the y-direction represents a "height" or latitudinal direction, and the z-direction represents a "length" or an extrusion direction. As used herein, the x-direction, the y-direction, and the z-direction are each orthogonal to one another.

It is noted the extrusion of the components of the rail assembly 100A during fabrication results in a design that is improved upon known mounting assemblies which may be fabricated using other manufacturing processes (e.g., casting, stamping, bending, or the like). In addition, it is noted the extrusion of the components of the rail assembly 100A during fabrication results in a more consistent and cost-effective construction than if the rail assembly 100A included only components fabricated using other manufacturing processes.

In another embodiment, the rail 102 is configured to couple to the lag clip 104. For example, the rail 102 may include one or more rail hooks 106 and the lag clip 104 may include one or more lag catches 108, where a lag catch 108 is configured to engage a corresponding rail hook 106. For instance, a rail hook 106 may be pointed inward as defined with respect to a reference plane 110 extending in the latitudinal direction Y and the extrusion direction Z, and approximately bisecting the rail assembly 100A. In addition, the lag catch 108 may be pointed outward away from the reference plane 110. It is noted the rail hook 106 and the lag catch 108 may collectively be referred to as an interlocking assembly of the rail assembly 100A, for purposes of the present disclosure. In some embodiments, the rail hooks 106 may snap into engagement with the lag catches 108.

Referring now to FIGS. 1G and 1H, a rail 102 is generally illustrated according to one or more embodiments of the rail assembly 100A. The rail 102 has a predetermined length measured in the extrusion direction Z. In some embodiments, the rail length is between 1 m and 4 meters, or from approximately 2 meters to approximately 3 meters. Other dimensions are contemplated.

The rail 102 includes a rail cavity 112 defined at least in part by a rail base 114, a first rail arm 116A, and a second rail arm 116B. The rail base 114 extends in the longitudinal direction X and has a first surface 118A and a second surface 118B. The first and second rail arms 116A, 116B extend in the latitudinal direction Y from the first surface 118A of the rail base 114. The rail arms 116 have a predetermined height measured in the latitudinal direction.

Each rail arm 116A, 116B has a respective interior surface 120A, 120B facing the rail cavity 112 (and the reference plane 110) and a respective exterior surface 122A, 122B opposite to the interior surface 120A, 120B. The first rail arm 116A and the second rail arm 116B are oppositely disposed relative to the reference plane 110 and spaced from one another to form the rail cavity 112 along with the rail base 114.

In some embodiments, the first rail arm 116A and the second rail arm 116B may be generally straight (e.g., without bends or curves). Optionally, at least a portion of the exterior surfaces 122A, 122B of the rail arms 116A, 116B are generally planar. Additionally, or alternatively, at least a portion of the interior surfaces 120A, 120B of the rail arms 116A, 116B are generally planar. For instance, the rail arms 116A, 116B may be described as extending approximately parallel to the reference plane 110. In addition, the rail arms 116A, 116B may be described as oriented approximately perpendicular to the rail base 114.

In some embodiments, the rail 102 may include fillets or chamfers between the first rail arm 116A and/or the second rail arm 116B and the first surface 118A of the rail base 114. Optionally, fillets or chamfers are positioned between the interior surfaces 120A, 120B of the rail arms 116A, 116B and the first surface 118A of the rail base.

The rail arms 116 do not deform in response to the force created when the rail nut 160 engages the sloped surfaces 132 as described herein. Instead, the rail arms 116 transfer the force to the rail base 114. If the rail arms were to deform due to the force of the rail nut engaging the sloped surfaces, the rail hooks 106 may not move inwardly as intended to engage the lag catches 108.

In contrast to the rail arms 116, the rail base 114 is operable to bend or flex in the longitudinal direction in response to a force when a rail nut 160 engages sloped surfaces 132 of the rail arms 116. Accordingly, the rail base 114 has a shape that is altered in response to the force created when the rail nut engages the sloped surfaces. This is beneficial because as the rail base 114 bends or flexes, the rail hooks 106 move inwardly toward the reference plane 110 to engage the lag catches 108 of the lag clip 104.

In some embodiments, the rail arms 116 are configured to resist deformation in response to the rail nut engaging the sloped surfaces 132. For example, the rail arms may have a thickness sufficient to resist or prevent unintended bending or deformation due to the force created by the rail nut engaging the sloped surfaces 132. Additionally, or alternatively, the rail arms 116 may have a shape selected to provide stiffness and to resist unintended bending or deformation.

In addition, the rail arms 116 may have a height measured in the latitudinal dimension that is selected to resist or prevent unintended bending. More specifically, the rail arms 116 may be formed with a minimum height necessary to permit the grab fastener 190 to engage the rail nut 160 and move the rail nut onto the sloped surface 132. Forming the rail arms 116 with a minimum height is also beneficial because it reduces the amount of material used in the lag rail 102 saving material costs and transportation expenses.

In at least one embodiment, the rail base has a first thickness and the arms have a second thickness that is greater than the first thickness. In some embodiments, at least part of the rail base 114 is contoured and/or reduced in thickness to form a hinge or a bendable portion 124. For example, the rail base 114 may be contoured with an arch or scalloped area extending into the second surface 118B to define the bendable portion 124 (e.g., in the second surface 118B opposite the first surface 118A from which the first rail arm 116A and the second rail arm 116B extend in the latitudinal direction Y). For instance, the contouring may be such that the reduction of thickness is only on one side of the rail base 114 (e.g., on the second surface 118B side) such as generally illustrated in FIG. 1H. Alternatively, the contouring may be such that the reduction of thickness is on both opposite sides of the rail base 114 (e.g., both the first surface 118A side and the second surface 118B side).

Optionally, each rail arm 116A, 116B includes a rail protrusion 126A, 126B extending inwardly toward the reference plane 110. The rail protrusions 126 may extend longitudinally relative to the exterior surfaces 122A, 122B of the respective first rail arm 116A and the second rail arm 116B. In some embodiments, the rail protrusions 126 are oriented approximately perpendicular to the rail arms 116 and/or to the reference plane 110. The rail protrusions 126 define an uppermost portion of the rail cavity. The rail protrusions form a stop to prevent a rail nut 160 from moving in the latitudinal direction Y out of the rail cavity.

The rail protrusions 126 have respective exterior surfaces 128A, 128B. The surfaces 128 define an uppermost portion of the rail 102. In some embodiments, the exterior surfaces 128A, 128B are generally planar to define a support for a frame 226 of a photovoltaic module 224. Further, the first exterior surface 128A is optionally coplanar with the second exterior surface 128B. Accordingly, the exterior surfaces 128A, 128B can be described as defining a second reference plane 111 that is orthogonal to the reference plane 110. In some embodiments, no portion of the rail 102 extends above the exterior surfaces 128 and the second reference plane.

A rail extrusion slot 130 is defined between the rail protrusions 126 and extends in the extrusion dimension Z. The rail extrusion slot 130 has an interior width measured in the longitudinal dimension X that is less than a width of the rail cavity 112.

In another embodiment, at least a portion of the respective interior surfaces 120A, 120B of the first rail arm 116A and the second rail arm 116B are angled into the rail cavity 112 and toward the reference plane 110. The angled portions form sloped rail surfaces 132A, 132B. For example, the portion of the first rail arm 116A and the second rail arm 116B proximate to corresponding rail protrusions 126 may be angled into the rail cavity 112 to form the sloped rail surfaces 132A, 132B. The sloped rail surfaces 132A, 132B define "ramps" which may be engaged by a rail nut 160 of the rail assembly 100 to connect the rail 102 to a lag clip 104, as described further herein.

The sloped rail surfaces 132A, 132B slope inwardly from the respective interior surfaces 120A, 120B toward the reference plane 110. Accordingly, the sloped rail surfaces decrease the interior width of the rail cavity 112. For example, the rail cavity 112 has a maximum width measured in the longitudinal direction at latitudinal position between the rail base 114 and the beginning of the sloped rail surfaces 132A, 132B. At an end of the sloped rail surfaces 132A, 132B at a latitudinal position proximate to the rail protrusions 126A, 126B, the rail cavity has a second width that is less than the maximum width. In some embodiments, the second width is the minimum width of the rail cavity 112. The rail extrusion slot 130 positioned between the rail protrusions 126A, 126B has a third width which is less than the second width.

In another embodiment, one or more rail legs 134 extend from the rail base 114. The one or more rail legs 134 extend in a latitudinal direction Y from the second surface 118B of the rail base 114. For example, the one or more rail legs 134 may extend in the latitudinal direction Y from the rail base 114 opposite the direction that the first rail arm 116A and the second rail arm 116B extend from the rail base 114. In this example, the first rail arm 116A and the second rail arm 116B are positioned on a first side of the rail base 114 (e.g., the first surface 118A side) while the one or more rail legs 134 are positioned on a second, opposite side of the rail base 114 (e.g., the second surface 118B side). The one or more rail legs 134 each have an interior surface 136 facing the reference plane 110. The one or more rail legs 134 each have an exterior surface 138 opposite the interior surface 136.

In some embodiments, the one or more rail legs 134 may be generally straight (e.g., without bends or curves). Optionally, at least a portion of the exterior surfaces 138 of the one or more rail legs 134 are generally planar. Additionally, or alternatively, at least a portion of the interior surfaces 136 of the one or more rail legs 134 are generally planar. For instance, the one or more rail legs 134 may be described as extending approximately parallel to the reference plane 110.

In addition, the one or more rail legs 134 may be described as oriented approximately perpendicular to the rail base 114.

In some embodiments, the rail 102 may include fillets or chamfers between the one or more rail legs 134 and the second surface 118B of the rail base 114. Optionally, fillets or chamfers are positioned between the interior surfaces 136 of the rail legs 134A, 134B and the second surface 118B of the rail base.

In some embodiments, two rail legs 134A, 134B are disposed on opposite sides of the reference plane 110. The rail legs 134A, 134B have a respective interior surface 136 (e.g., interior surfaces 136A, 136B) and a respective exterior surface 138 (e.g., exterior surfaces 138A, 138B). In these embodiments, the rail legs 134A, 134B are spaced from one another to form a rail leg pocket 140 along with the rail base 114.

The rail legs 134A, 134B may optionally be spaced farther apart in the longitudinal direction X from the reference plane 110 than the first rail arm 116A and the second rail arm 116B are spaced in the longitudinal direction X from the reference plane 110. For example, the exterior surfaces 122A and 122B of the rail arms 116 are a first distance from the reference plane 110 measured in the longitudinal direction X. The interior surfaces 136A, 136B of the rail legs 134 are a second distance from the reference plane 110 measured in the longitudinal direction X. In at least one embodiment, the second distance is greater than the first distance. Additionally, or alternatively, the first rail arm 116A does not intersect a plane extending in the latitudinal direction Y and the extrusion direction Z which is defined by the interior surface 136A of the first rail leg 134A.

In some embodiments, the transition between the respective rail arms 116A, 116B and the rail legs 134A, 134B may be a sloped surface. Alternatively, the transition between the respective rail arms 116A, 116B and the rail legs 134A, 134B may be an approximately flat surface.

In another embodiment, the one or more rail hooks 106 extend in a latitudinal direction Y from a corresponding rail leg 134. For example, in some embodiments each rail leg 134A, 134B includes a rail hook 106A, 106B respectively. Each rail hook 106 extends away from the exterior rail leg surface 138A, 138B of its associated rail leg 134A, 134B. In some embodiments, the rail hooks 106A, 106B extend inwardly and away from exterior surfaces 138A, 138B of the rail legs 134A, 134B. The rail hooks 106 may extend at an angle upward in both the longitudinal direction X and the latitudinal direction Y from the rail legs 134 and inward toward the reference plane 110. In this example, the angle between the one or more rail hooks 106 and the exterior rail leg surface 138 of the rail legs 134 may be defined as less than ninety degrees.

Referring now to FIGS. 1I-1K, a lag clip 104 is generally illustrated according to one or more embodiments of the rail assembly 100A. The lag clip 104 includes a chamber 142 defined at least in part by an endwall 144, a first member 146A, and a second member 146B. The endwall 144 extends in the longitudinal direction X and has a first surface 148A and a second surface 148B.

The first member 146A and the second member 146B extend in the latitudinal direction Y away from the first surface 148A of the endwall 144. Each member 146A, 146B has a respective interior surface 150A, 150B facing the chamber 142 and a respective exterior surface 152A, 152B opposite to the interior surface 150A, 150B.

The first member 146A and the second member 146B are oppositely disposed relative to the reference plane 110 and spaced from one another to form the chamber 142 along with the endwall 144. In some embodiments, the one or more members 146 may be approximately co-planar in the latitudinal direction Y and the extrusion direction Z with the one or more rail arms 116A, 116B when the rail assembly 100 is assembled but in the disengaged configuration as generally illustrated in FIG. 1B. For example, the exterior surfaces 152A, 152B of the members 146 are a third distance from the reference plane 110 measured in the longitudinal direction X. In at least one embodiment, the third distance is approximately equal to the first distance that the exterior surfaces 122A and 122B of the rail arms 116 are from the reference plane 110.

In some embodiments, the first member 146A and the second member 146B may be generally straight (e.g., without bends or curves). Optionally, at least a portion of the exterior surfaces 152A, 152B of the first member 146A and the second member 146B are generally planar. Additionally, or alternatively, at least a portion of the interior surfaces 150A, 150B of the first member 146A and the second member 146B are generally planar. For instance, the first member 146A and the second member 146B may be described as extending approximately parallel to the reference plane 110. In addition, the first member 146A and the second member 146B may be described as oriented approximately perpendicular to the endwall 144. In some embodiments, the lag clip 104 may include fillets or chamfers between the first member 146A and/or the second member 146B and the endwall 144. Optionally, fillets or chamfers are positioned between the interior surfaces 150A, 150B of the first member 146A and/or the second member 146B and the endwall 144 and the first surface 148A of the endwall 144.

In another embodiment, one or more lag catches 108 are formed at ends of the members 146. For example, in some embodiments, each member 146A, 146B includes a lag catch 108A, 108B respectively. Each lag catch 108 extends away in the longitudinal direction X from an outer surface 152A, 152B of its associated member 146A, 146B. For example, in some embodiments, the lag catches 108 extend outwardly from outer surfaces 152A, 152B of the members 146A, 146B. The lag catches 108 may extend at an angle downward and outwardly in the longitudinal direction X from the members 146. In this example, the angle between the one or more lag catches 108 and the outer surfaces 152 of the members 134 may be defined as less than ninety degrees.

In another embodiment, the lag clip 104 includes an aperture 154 which passes through the endwall 144. It is noted the aperture 154 as described herein may be formed with a manufacturing process performed following the extrusion process to form the endwall 144, the one or more lag clip members 146, and the one or more lag catches 108.

In some embodiments, the aperture 154A may be round. For instance, the round lag clip aperture 154A may be fully contained within a perimeter defined by the endwall 144, such that the round lag clip aperture 154A is accessible only from within the chamber 142. In this embodiment, the aperture 154A does not extend to either a first end 156A or a second end 156B of the endwall 144. Optionally, the aperture 154A is not threaded.

In other embodiments, the lag clip aperture 154B may be elongated to define a slot. In some embodiments, the aperture 154B extends in the extrusion dimension Z. Optionally, the aperture 154B does not intersect either end 156A, 156B of the endwall 144. For instance, an elongated lag clip aperture 154B may be fully contained within a perimeter defined by the endwall 144, such that the elongated lag clip aperture 154B is accessible only from within the chamber 142.

In some embodiments, the lag clip 104 includes both a round aperture 154A and an elongated slot aperture 154B that extends from the round aperture. In this embodiment, the round aperture 154A has a first diameter that is greater than a width of the slot aperture 154B. For example, the first diameter of the round aperture 154A may be greater than a second diameter of a head of a building fastener 194 (such as that illustrated in FIG. 1C). The width of the slot aperture 154B is greater than the shaft 196 of the building fastener 194. However, the width of the slot aperture 154B is less than the second diameter. In this manner, to join or fix the lag clip 104 to a trapezoidal rib panel 202, a building fastener 194 may be partially retracted from a trapezoidal rib 200, a head of the building fastener can then be extended through the round aperture 154A with the threaded shaft 196 extending below the lag clip. The lag clip 104 may then be moved in the extrusion direction Z such that the threaded shaft 196 is within the slot aperture 154B. The building fastener 194 may then be driven back into the trapezoidal rib panel 202 such that the head of the building fastener presses against the first endwall surface 148A to clamp the lag clip endwall 144 to an upper surface 210 of the trapezoidal rib 200.

In other embodiments, the lag clip 104 may have an elongated aperture 154C that exceeds the perimeter defined by the endwall 144. For example, the elongated aperture 154C may exceed the perimeter defined by the endwall 144 in an extrusion direction Z and pass through an end 156A or 156B of the endwall 144, such that the elongated lag clip aperture 154C is accessible from outside the chamber 142.

It is noted the lag clip 104 is illustrated in FIGS. 1B, IF with a gasket 216 proximate to a lag clip exterior bottom surface 218. In some embodiments, the gasket 216 is positioned between gasket protrusions 222, as described in detail herein.

Referring now to FIGS. 1A-1F, 1L-1N, and 2A-2B, a grab assembly 158 is generally illustrated according to one or more embodiments of the rail assembly 100A. The grab assembly 158 may be configured to receive at least a portion of one or more photovoltaic modules 224, described in detail herein. The combination of the grab assembly 158, the rail 102, and the lag clip 104 may be configured to hold the one or more photovoltaic modules 224 in position (e.g., proximate to a building surface 198, as described in detail herein). It is noted FIGS. 1A-1B, 1D-1F, and 2A-2B illustrate a grab assembly 158A with grab 168A. In addition, it is noted FIG. 1C illustrates a grab assembly 158B with grab 168B. Unless otherwise noted, the grab assembly 158B includes features that are the same as or similar to the features of the grab assembly 158A and operates in the same or similar manner. In addition, unless otherwise noted, the grab 168B includes features that are the same as or similar to the features of the grab 168A and operates in the same or similar manner.

Referring now to FIGS. 1L-IN, a rail nut 160 of the grab assembly 158 is generally illustrated according to one or more embodiments of the rail assembly 100A. The rail nut 160 may be insertable into the rail cavity 112 of the rail 102. Opposite first and second surfaces 162A, 162B of the rail nut 160 corresponding to a reference plane defined in the longitudinal direction X and the extrusion direction Z may be shaped like any two-dimensional (2D) shape. For example, the opposite first and second surfaces 162A, 162B may be a parallelogram, a rectangle, or other 2D shape. By way of another example, the opposite first and second surfaces 162A, 162B may include rounded corners 164, to prevent damage to the rail 102 and to allow the rail nut 160 to be rotated into position after being inserted into the rail cavity 112. For instance, the rail nut 160 may optionally be inserted into the rail cavity 112 through the rail extrusion slot 130, and then rotated 90 degrees before engaging the sloped rail surfaces 132A, 132B when a force is applied to the grab fastener 190. In some embodiments, select round corners may have different radii. For instance, opposite corners may have approximately the same radii, and adjacent corners may have different radii. In other embodiments, the round corners may all have approximately the same radii. It is noted the 2D shape may be selected based on a determination of the forces required to keep the rail nut 160 within the rail cavity 112 when the grab assembly 158 is holding the one or more photovoltaic modules 224.

In another embodiment, the rail nut 160 includes a rail nut aperture 166 passing through the opposite first and second surfaces 162A, 162B of the rail nut 160. In some embodiments, the rail nut aperture 166 is threaded. For example, the rail nut aperture 166 may be countersunk into at least one surface 162A, 162B of the rail nut 160.

Referring now to FIGS. 1A-IF, in one embodiment, a grab 168 of the grab assembly 158 is generally illustrated according to one or more embodiments of the rail assembly 100A. The grab 168 generally includes a body 170 with an upper surface 172, a lower surface 174, a first edge 176A, an opposite second edge 176B, a first end 178A, and an opposite second end 178B.

In some embodiments, one or more sidewalls 180 extend in the latitudinal direction Y from the lower surface 174 of the grab body 170. In some embodiments, two sidewalls 180A, 180B may extend in the latitudinal direction Y from the lower surface 174 of the grab body 170. Each sidewall 180 generally includes an exterior surface 182. In some embodiments, the sidewalls 180 are spaced inwardly from the respective first and second edges 176A, 176B.

In another embodiment, the grab 168 includes one or more grab protrusions 184. For example, the one or more grab protrusions 184 may extend in an extrusion direction Z from the grab body 170 (and from the exterior surfaces 182) a select height or latitudinal distance from the exterior surface 128A, 128B when the grab assembly 158 is coupled to the rail 102, such that the one or more grab protrusions 184 are set at an angle to the one or more sidewalls 180. In some embodiments, the grab protrusions 184 may be approximately perpendicular to the sidewalls 180. The one or more grab protrusions 184 and the grab body 170 may form the upper surface 172. The one or more grab protrusions 184 may include the lower surface 174 of the grab body 170. It is noted that where there are multiple grab protrusions 184, the one or more grab protrusions 184 may be oppositely disposed in the latitudinal direction Y from the grab body 170.

In another embodiment, a photovoltaic module gap 186 is formed as a space proximate to the one or more grab protrusions 184 and the one or more sidewalls 180. For example, the photovoltaic module gap 186 may be formed at least in part by the lower surface 174 and the exterior surface 182. Where the grab assembly 158 is engaged to the rail 102 to clamp a photovoltaic module 224 to the rail 102, the grab 168 may run in the longitudinal direction X while the rail 102 may run in the extrusion direction Z.

In another embodiment, the grab 168 includes a grab aperture 188 configured to pass through the upper surface 172 (as generally illustrated in FIG. 1E). In some embodiments the grab aperture 188 is not threaded. Alternatively, the grab aperture 188 may be threaded. For example, where there are multiple sidewalls 180A, 180B, the grab aperture 188 may optionally exit through the lower grab body surface 174 between the sidewalls 180A, 180B.

The rail nut 160 is couplable to the grab 168 via a grab fastener 190 extendable through the rail nut aperture 166 and the grab aperture 188. In some embodiments, the grab fastener 190 may include a threaded shaft 192. It is noted that the interior width of the rail extrusion slot 130 of the rail 102 is greater than a diameter of the threaded shaft 192.

In another embodiment, the rail nut 160 is configured to engage with the sloped rail surfaces 132A, 132B within the rail cavity 112 as the rail nut 160 is drawn upward in the latitudinal direction Y when the grab fastener 190 is tightened. The rail nut 160 engaging the sloped rail surfaces 132A, 132B may cause the rail 102 to fold about the bendable portion 124, such that the bendable portion 124 operates as a living hinge.

In general, in one or more embodiments of the present disclosure an "engaged configuration" of the various rail assemblies 100 is where the positioning of the rail nut 160 within the rail cavity 112 causes the rail hook 106 to engage the lag clip 104 and prevent the installation, movement, or the removal of the rail hook 106 relative to the lag clip 104. As described throughout the present disclosure, the positioning of the rail nut 160 when in the engaged configuration causes the rail arms 116, the rail legs 134, and/or the members 146 to be set a first angle relative to the reference plane 110. In addition, in one or more embodiments of the present disclosure a "disengaged configuration" of the various rail assemblies 100 is where the positioning of the rail nut 160 within the cavity 112 causes the rail hook 106 to disengage the lag clip 104 and facilitate the installation, movement, or the removal of the rail hook 106 relative to the lag clip 104. As described throughout the present disclosure, the positioning of the rail nut 160 when in the disengaged configuration causes the rail arms 116, the rail legs 134, and/or the members 146 to be set a second angle relative to the reference plane 110. In some embodiments, the second angle of the engaged configuration is different from the first angle of the disengaged configuration.

In one illustrative configuration as depicted in FIG. 1B where the rail assembly 100 is in the disengaged configuration, the rail nut 160 is at a first latitudinal position spaced from the exterior surfaces 128A, 128B by a first distance and has not engaged the sloped rail surfaces 132A, 132B. The non-engagement of the sloped rail surfaces 132A, 132B by the rail nut 160 causes the protrusion 126A to be separated from the protrusion 126B a first longitudinal distance. The bendable portion 124 is unfolded, and the first rail arm 116A and the second rail arm 116B are at their original-fabricated angles relative to the reference plane 110. For example, the first rail arm 116A and the second rail arm 116B may initially be approximately parallel to the reference plane 110. The one or more rail hooks 106 are coupled to the one or more corresponding lag catches 108, but the rail 102 is not engaging the lag clip 104 and as such is not secured to the lag clip 104.

In the disengaged configuration, the rail 102 may be moved in the extrusion direction Z relative to the lag clip 104. For example, although the rail hooks 106 may be in contact with the lag catches 108, the rail hooks 106 may slide or move in the extrusion direction relative to the lag catches 108.

In a second illustrative configuration as depicted in FIG. 1C where the rail assembly 100 is in the engaged configuration, the rail nut 160 is at a second latitudinal position spaced from the exterior rail protrusion surfaces 128A, 128B by a second distance that is less than the first distance. The movement of the rail nut 160 closer to the surfaces 128A, 128B, caused by an application of torque to the grab fastener 190, causes the rail nut 160 to engage the sloped rail surfaces 132A, 132B. The rail nut 160 engaging the sloped rail surfaces 132A, 132B may apply a force which causes the first rail arm 116A and the second rail arm 116B to bow outward away from the reference plane 110. The engagement of the sloped rail surfaces 132A, 132B by the rail nut 160 causes the protrusion 126A to be separated from the protrusion 126B a second longitudinal distance, where the second longitudinal distance is greater than the first longitudinal distance when the rail assembly 100 is the disengaged configuration. The outward movements of the arms 116 causes the one or more rail legs 134 to bow inward toward the reference plane 110 by rotating about the bendable portion 124 with the folding at the bendable portion 124. For example, the first rail arm 116A and the second rail arm 116B may be set at an acute angle relative to one another following the folding of the bendable portion 124. For instance, engagement of the sloped rail surfaces 132A, 132B by the rail nut 160 when the force is applied to the grab fastener 190 which draws the rail nut 160 upward may optionally cause the rail arms 116A, 116B and corresponding rail legs 134 to bend at least approximately 0.051 centimeters (cm) (0.02 inches (in)). The movement of the rail arms and rails legs in turn causes the rail hooks 106 on the rail legs 134 to engage the corresponding lag catches 108 on the lag clip 104. In some embodiments, the rail legs bend approximately 0.076 cm (0.03 in) when the rail nut 160 is drawn up against the sloped rail surfaces 132A, 132B.

The rail 102 folding at the bendable portion 124 may cause the one or more rail hooks 106 to engage by pressing against the corresponding one or more lag catches 108, securing the rail 102 to the lag clip 104. In this regard, the rail assembly 100A may be considered torque-actuated, as the increasing force applied on the sloped rail surfaces 132A, 132B by the rail nut 160 when drawn upward causes the one or more rail hooks 106 to engage the corresponding one or more lag catches 108.

In the engaged configuration, the rail 102 is fixed in the extrusion direction Z relative to the lag clip 104. For example, the rail hooks 106 cannot inadvertently or unintentional slide or move in the extrusion direction relative to the lag catches 108.

It is noted the bendable portion 124 may be configured such that it folds prior to the rail arms 116A, 116B folding or deforming, thus allowing the rail 102 to maintain a defined angle between the rail arms 116A, 116B and the rail base 114 when the rail nut 160 engages the sloped rail surfaces 132A, 132B. In addition, it is noted the bendable portion 124 may be configured such that it folds prior to the one or more rail legs 134 folding, thus allowing the rail 102 to maintain a defined angle between the one or more rail legs 134 and the rail base 114 when the rail nut 160 engages the sloped rail surfaces 132A, 132B.

In some embodiments, the bending of the bendable portion 124 of the rail is elastic. Accordingly, the rail 102 and the lag clip 104 substantially return to their original, unbended shapes (e.g., their shapes as created by one or more fabrication processes including, but not limited to, one or more extrusion processes) when the rail assembly 100 transitions from the engaged configuration to the disengaged configuration and actuation of the grab fastener 190 causes the rail nut 160 to disengage from the sloped rail surfaces 132A, 132B.

Alternatively, in other embodiments, the bending of the bendable portion 124 of the rail is non-elastic (or plastic). Accordingly, the rail 102 and the lag clip 104 are plastically deformed when the rail assembly 100 is transitions from the disengaged configuration to the engaged configuration and actuation of the grab fastener 190 causes the rail nut 160 to engage the sloped rail surfaces 132A, 132B. In addition, the rail 102 and the lag clip 104 remain in their deformed shapes or states when the rail assembly 100 subsequently transitions from the engaged configuration to the disengaged configuration and actuation of the grab fastener 190 causes the rail nut 160 to disengage from the sloped rail surfaces 132A, 132B.

Figure 2A:
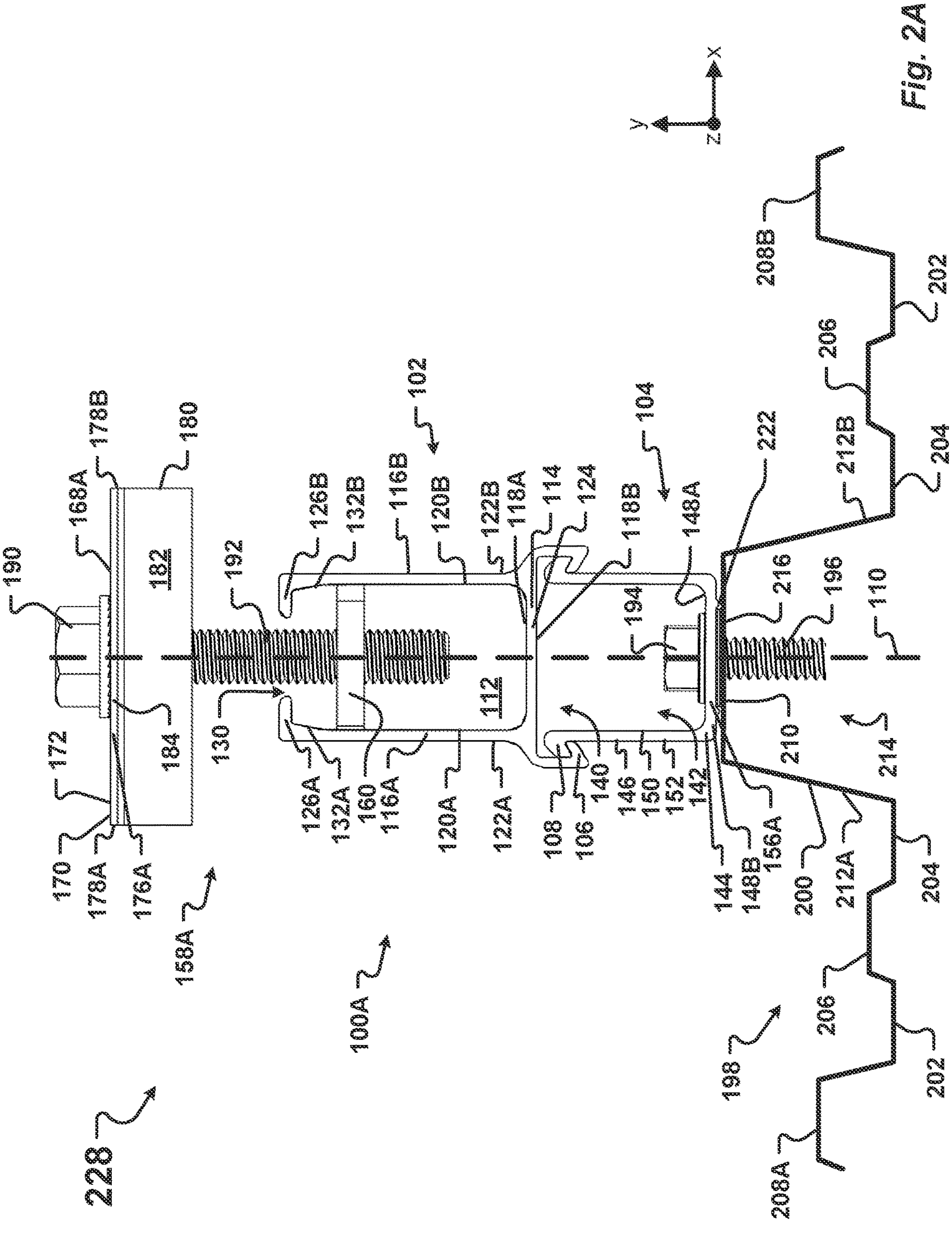
FIG. 2A is a front elevation view of the torque actuated rail assembly in FIG. 1A coupled to a trapezoidal rib of a trapezoidal rib panel defining a building surface, in accordance with one or more embodiments of the present disclosure.

Referring now to FIG. 2A, in some embodiments the lag clip 104 is configured to receive a building fastener 194. In some embodiments, the building fastener 194 may include a threaded shaft 196. In some embodiments, the building fastener 194 may be installed in a building surface 198 prior to use with the rail assembly 100A. For example, the building fastener 194 may be fully backed out of an aperture in the building surface and then passed through the lag clip aperture 154 when installing the rail assembly 100A. By way of another example, where the lag clip aperture 154 is an elongated slot 154C, the building fastener 194 may be fully or only partially backed out. Where the building fastener 194 is only partially backed out, the lag clip 104 may then be slid into place with the elongated lag clip aperture 154C surrounding the building fastener 194. The building fastener 194 may then be retightened, with the head of the building fastener 194 against the surface 148A of the lag clip 104. It is noted the building fastener 194 and the grab fastener 190 may be positioned approximately coaxial when the rail assembly is assembled.

In another embodiment, the building surface 198 includes a trapezoidal rib 200 formed by or as part of a trapezoidal rib panel 202. The trapezoidal rib panel 202 may run in the extrusion direction Z similar to the rail 102. One or more trapezoidal rib panels 202 may be assembled to define a building surface or a trapezoidal rib panel surface. A trapezoidal rib panel 202 may include one or more trapezoidal ribs 200 with a panel base section 204 positioned on each side. A trapezoidal rib panel 202 may include one or more minor ribs 206, although it is contemplated the trapezoidal rib panels 202 may not use any minor ribs 206 without departing from the intent of the present disclosure. A panel edge portion 208A of one trapezoidal rib panel 202 may be nested with a panel edge portion 208B of an adjacent trapezoidal rib panel 202 to collectively define a trapezoidal rib 200.

Each trapezoidal rib 200 may include an upper rib surface 210 in the form of a flat or planar surface, and rib sides 212A, 212B positioning the upper rib surface 210 a select height about the panel base section 204. The rib sides 212A, 212B may be spaced from each other and are disposed in non-parallel relation. The rib sides 212A, 212B of a trapezoidal rib 200 may be the mirror image of each other in relation to their respective orientations, but may be non-mirrored or asymmetrical without departing from the intent of the present disclosure. The upper rib surface 210 and the two rib sides 212A, 212B collectively define a rib hollow 214 for the trapezoidal rib 200.

Although embodiments of the present disclosure illustrate the lag clip 104 coupling to a building surface 198 including a trapezoidal rib 200 via the building fastener 194, it is noted the lag clip 104 may couple to an intermediate mounting device. For example, the intermediate mounting device may be configured to couple to the building surface 198, where the building surface 198 has standing ribs or folded metal standing seams to which the intermediate mounting device may be coupled. Examples of intermediate mounting devices that the lag clip 104 may couple to are described in U.S. Pat. Nos. 9,085,900, 9,611,652, 10,443,896, 10,634,175 and 10,948,002 which are each incorporated herein by reference. In this regard, the rail assembly 100 has increased uses beyond being directly mounted to a building surface 198 including trapezoidal ribs 200.

In another embodiment, the rail assembly 100 includes a gasket 216. For example, the gasket 216 is positioned between the building surface 198 and an exterior bottom surface 218 of the lag clip 104. The gasket 216 may be configured with a gasket aperture 220 aligned with the lag clip aperture 154 and configured to allow the building fastener 194 to pass through from the lag clip aperture 154. Alternatively, the building fastener 194 may be driven through the gasket 216 during installation of the rail assembly 100 to a trapezoidal rib 200 to fabricate the gasket aperture 220. The gasket 216 may be fabricated from any type of appropriate material used for building projects including, but not limited to, an ethylene propylene diene monomer (EPDM) rubber gasket. In some embodiments, the combined height in the latitudinal direction Y may optionally be approximately 6.6 cm or 66 millimeters (mm). In other embodiments, the combined height is between approximately 5 cm (1.97 in) and approximately 7 cm (2.76 in).

In another embodiment, the lower grab body surface 174 of the lag clip 104 includes one or more lag clip gasket protrusions 222 proximate to the lag clip aperture 154 and configured to receive and confine the gasket 216, such that the gasket 216 is prevented from rotating (e.g., when the rail assembly 100A is being mounted to the building surface 198). For example, the one or more lag clip gasket protrusions 222 may be up to approximately 0.058 cm (0.023 in) in height. It is noted where the one or more lag clip gasket protrusions 222 forms a continuous or nearly continuous boundary surrounding the lag clip aperture 154, the one or more lag clip gasket protrusions 222 may be considered to define a gasket pocket or receptacle there-between.

It is noted the gasket 216 may be inserted between the lag clip 104 and the building surface 198 (e.g., including, but not limited to, within the boundary defined by the one or more lag clip gasket protrusions 222) prior to the lag clip 104 being installed on the building surface 198 via the building fastener 194. Any appropriate way of maintaining a gasket 216 within the boundaries defined by the one or more lag clip gasket protrusions 222 may be utilized (e.g., by being press fit within the one or more lag clip gasket protrusions 222, adhering a gasket 216 to the exterior bottom surface 218, or the like). When the lag clip 104 is secured to the building surface 198, the gasket 216 may compress. In some embodiments, the gasket 216 may be of an equal or greater thickness than a height (e.g., in a latitudinal direction Y) of the one or more lag clip gasket protrusions 222. For example, the increased thickness may reduce the possibility of the gasket 216 being "over compressed" while securing the lag clip 104 to the building surface 198. In some embodiments, the building fastener 194 may be tightened to where the one or more lag clip gasket protrusions 222 come into contact with the building surface 198. In this regard, the gasket 216 may be protected from ultraviolet (UV) rays.

Figure 2B:
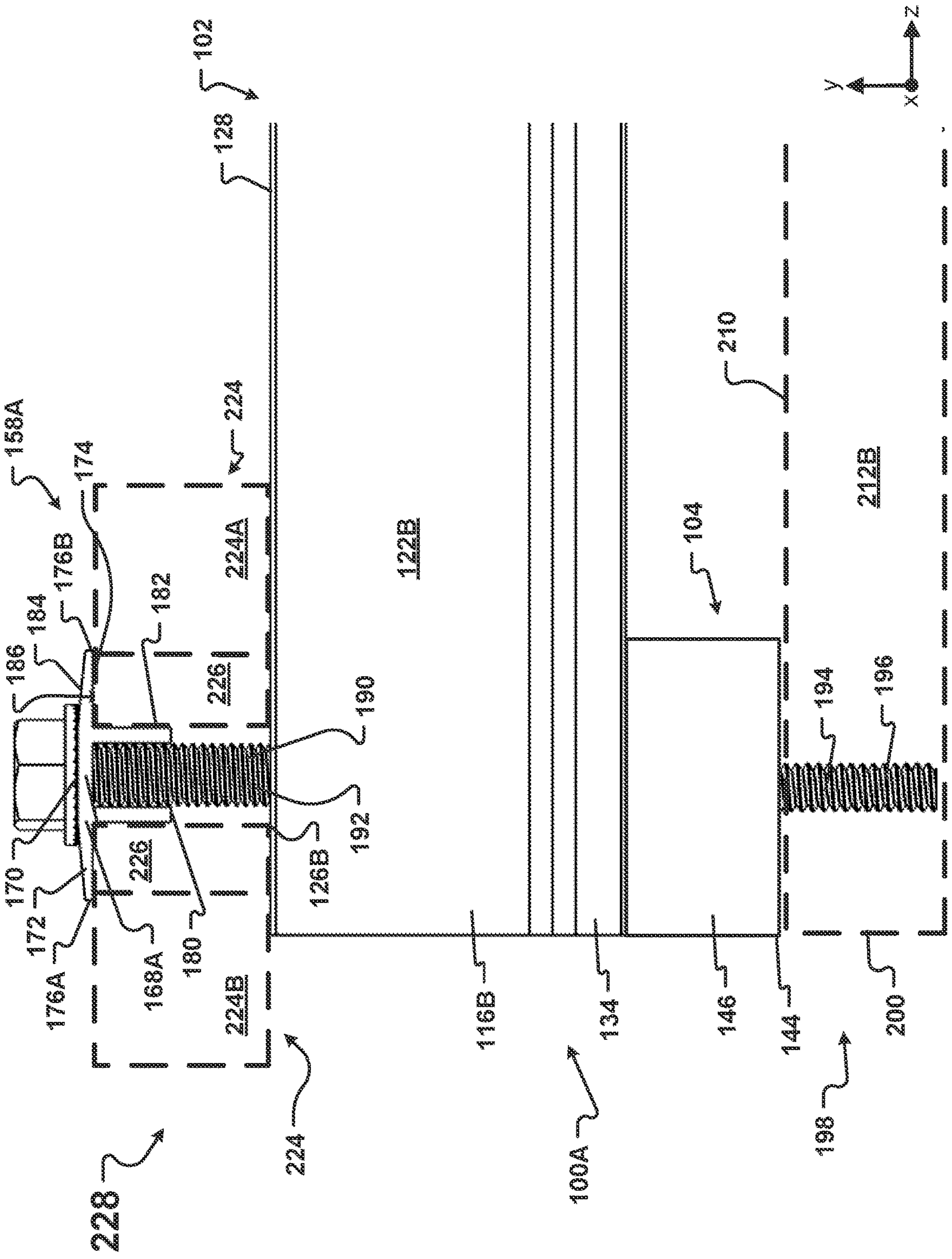
FIG. 2B is a perspective view of an array of photovoltaic modules installed on a building surface via the torque actuated rail assembly in FIG. 2A, in accordance with one or more embodiments of the present disclosure.

Referring now to FIGS. 1C and 2B, in one embodiment one or more photovoltaic modules 224 may fit within the photovoltaic module gaps 186 while held in place by the grab protrusion 184 clamping onto a frame 226 of the photovoltaic module 224. For example, the one or more photovoltaic modules 224 may run in the longitudinal direction X, while the rail 102, the lag clip 104 (and the trapezoidal rib 200 and/or trapezoidal rib panels 202) may run in the extrusion direction Z. By way of another example, the frame 226 may sit on the exterior rail surface 128 and be in contact with the exterior lower grab protrusion surface 174. By way of another example, the frame 226 of each photovoltaic module 224 may abut against or be spaced a select longitudinal distance from the exterior sidewall surface 182.

Where the photovoltaic modules 224 are positioned in an array, the rail assemblies 100A may be spaced a select distance apart in the extrusion direction Z and in the longitudinal direction X. For example, multiple lag clips 104 and grab assemblies 158 may be positioned along a single rail 102, and adjacent sets of lag clips 104 and grab assemblies 158 are spaced apart between approximately 1.6 and 2.0 meters along a length of the rail. In this regard, a rail assembly 100A may be considered as having a rail 102 and at least one set of components including the lag clip 104, the grab assembly 158, and the gasket 216 configured to couple to a corresponding building fastener 194.

It is noted the rail assembly 100A may be configured for use as a grounding conduit between a frame 226 of a photovoltaic module 224 and the building surface 198. For example, the grab 168 may be fabricated from stainless steel and configured to operate as a grounding device for the photovoltaic module 224 via the frame 226. For instance, the grab 168B may be stainless-steel device with optional protrusions or spikes 258 in the exterior lower grab protrusion surface 174 and/or the exterior sidewall surface 182 which are configured to press against the frame 226 of the photovoltaic module 224 (e.g., as illustrated in FIG. 1C). In addition, it is noted the rail assembly 100A, the trapezoidal ribs 200 (and/or the building surface 198 with the seams in general), and the photovoltaic modules 224 may be considered a photovoltaic system 228, for purposes of the present disclosure.

Figure 3A:
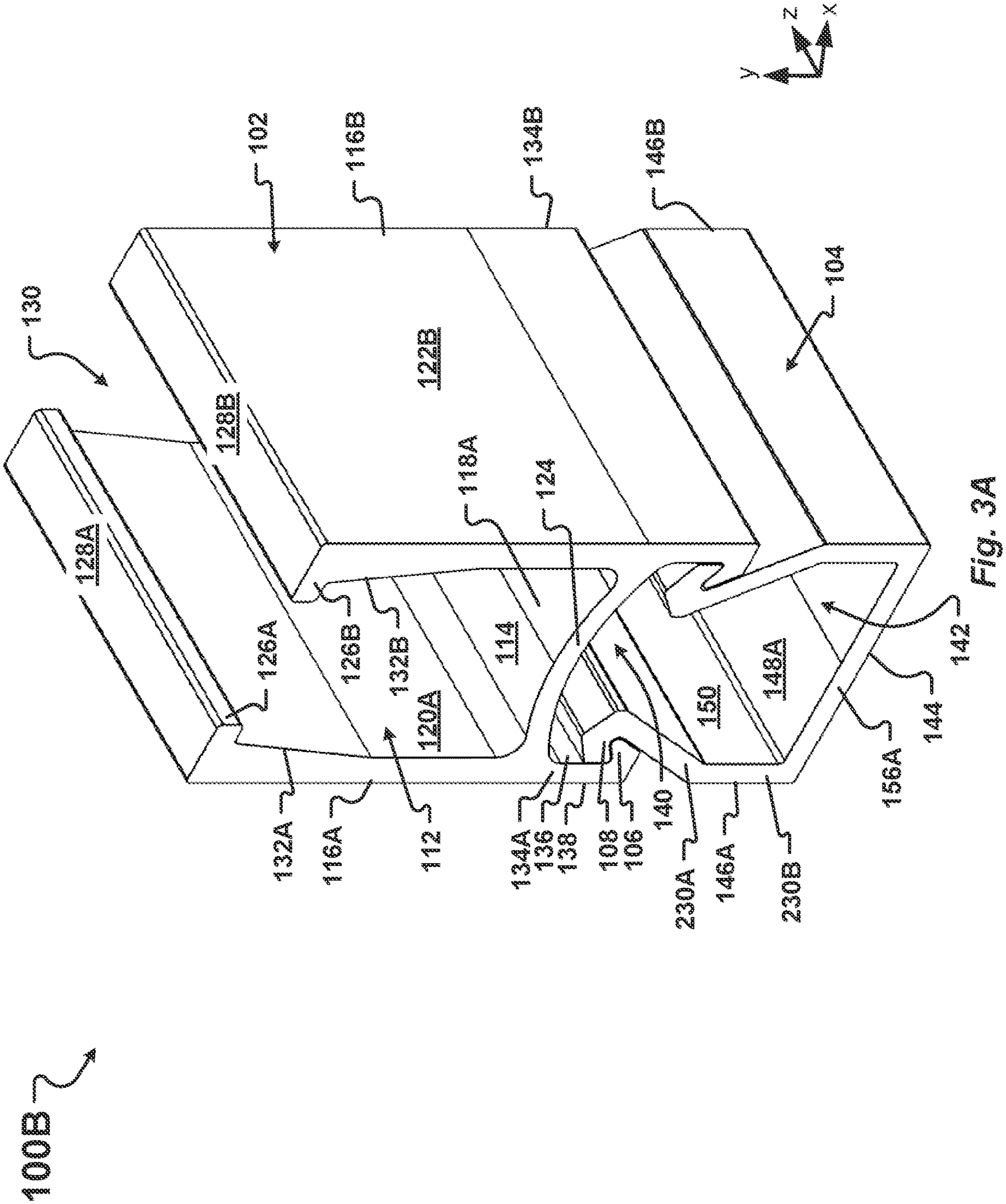
FIG. 3A is a perspective view of a torque actuated rail assembly for interconnecting structures, such as photovoltaic modules, to a metal panel defining a building surface, in accordance with one or more embodiments of the present disclosure.
Figure 3B:
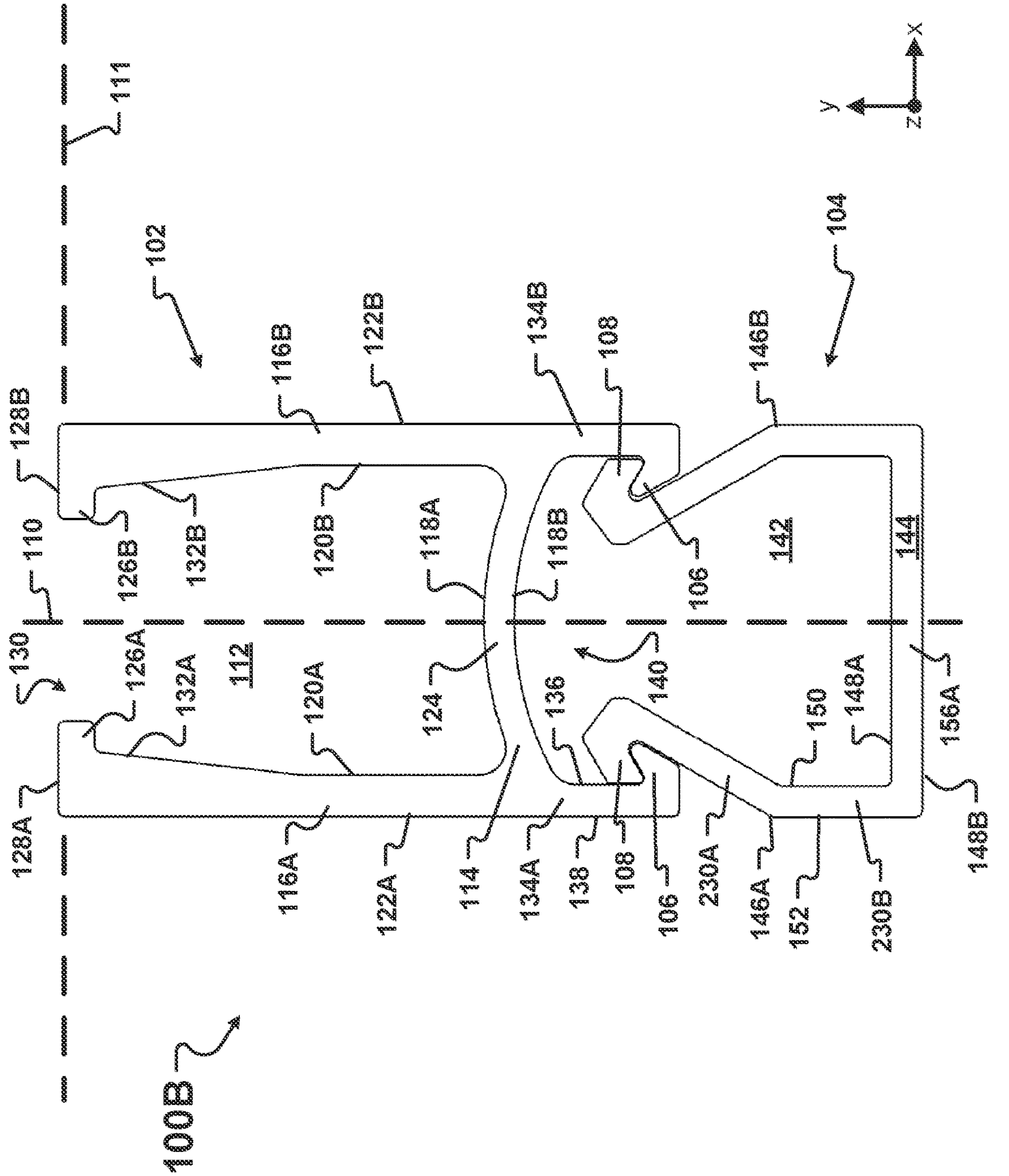
FIG. 3B is a front elevation view of the torque actuated rail assembly in FIG. 3A in a disengaged configuration, in accordance with one or more embodiments of the present disclosure.

Referring now to FIGS. 3A and 3B, another embodiment of a rail assembly 100B is generally illustrated. The rail assembly 100B has many features that are the same as, or similar to the rail assembly 100A. Moreover, the rail assembly 100B operates in the same or similar manner as rail assembly 100BA. As depicted in FIGS. 3A and 3B, the rail assembly 100B includes the rail 102, the lag clip 104, and is operable with the grab assembly 158 and the rail nut 160. The rail assembly 100B is configured to receive the building fastener 194 via the lag clip 104.

The rail 102 includes the rail cavity 112 formed by the rail base 114 with bendable portion 124 and the rail arms 116A, 116B, the rail protrusions 126A, 126B with exterior surfaces 128A, 128B, the sloped rail surfaces 132A, 132B, and the one or more rail hooks 106 at the end of the one or more rail legs 134.

The lag clip 104 includes the chamber 142 formed by the endwall 144 and the one or more lag clip members 146, and the one or more lag catches 108 at the end of the one or more lag clip members 146. The one or more lag catches 108 are configured to couple to and engage the one or more rail hooks 106.

The grab assembly 158 includes the rail nut 160 insertable into the rail cavity 112, and the grab 168 coupled to the rail nut 160 via a grab fastener 190. The rail nut 160 is configured to engage the sloped rail surfaces 132A, 132B when the grab fastener 190 is tightened. The grab 168 includes one or more sidewalls 180 and one or more grab protrusions 184 configured to secure a photovoltaic cell 224 against the exterior surfaces 128A, 128B of the rail protrusions 126A, 126B when the grab fastener 190 is tightened.

In general, it is noted that any embodiment directed to a rail assembly 100 and/or the components of the rail assembly 100 as described throughout the disclosure should be understood as reading upon the embodiment provided in FIGS. 3A and 3B, to the extent the described embodiments do not directly conflict.

Notably, in one embodiment the rail base 114 is contoured with an arch or scalloped area extending into the second surface 118B to define the bendable portion 124 (e.g., in the second surface 118B opposite the first surface 118A from which the first rail arm 116A and the second rail arm 116B extend in the latitudinal direction Y). For example, the contouring may be such that there is no loss of thickness in the latitudinal direction Y along the width of the arch in the longitudinal direction X (e.g., the arch extends above an approximately horizontal plane defined in the longitudinal direction X and the extrusion direction Z of the rail base 114). For instance, the contouring of the first surface 118A and the contouring of the second surface 118B may include respective concentric arcs sharing a common reference center.

Where there are multiple rail legs 134A, 134B, in some embodiments the rail legs 134A, 134B are equally spaced in the longitudinal direction X from the reference plane 110 as the first rail arm 116A and the second rail arm 116B are spaced in the longitudinal direction X from the reference plane 110. Further, the rail legs 134 extend from the rail base approximately opposite to the rail arms 116. Accordingly, in one embodiment, the exterior surfaces 128 are approximately coplanar with the exterior surfaces 138.

The first lag clip member 146A and the second lag member 146B include at least one bend or curve inward toward the reference plane 110 between the endwall 144 and the one or more lag catches 108. For example, the first lag clip member 146A and the second lag member 146B may each include a first portion 230A set at an oblique angle to a second portion 230B. For instance, the oblique angle may be greater than ninety degrees. The first portions 230A are positioned between the lag catches and the second portions 230B. The second portions 230B are positioned between the first portions 230A and the lag clip endwall 144.

By way of another example, the first lag clip member 146A and the second lag member 146B may each be a curve set along a defined radius. In some embodiments, the second portion 230B of the one or more members 146 may be co-planar in the latitudinal direction Y and the extrusion direction Z with the one or more rail arms 116A, 116B and the one or more rail legs 134.

Figure 4A:
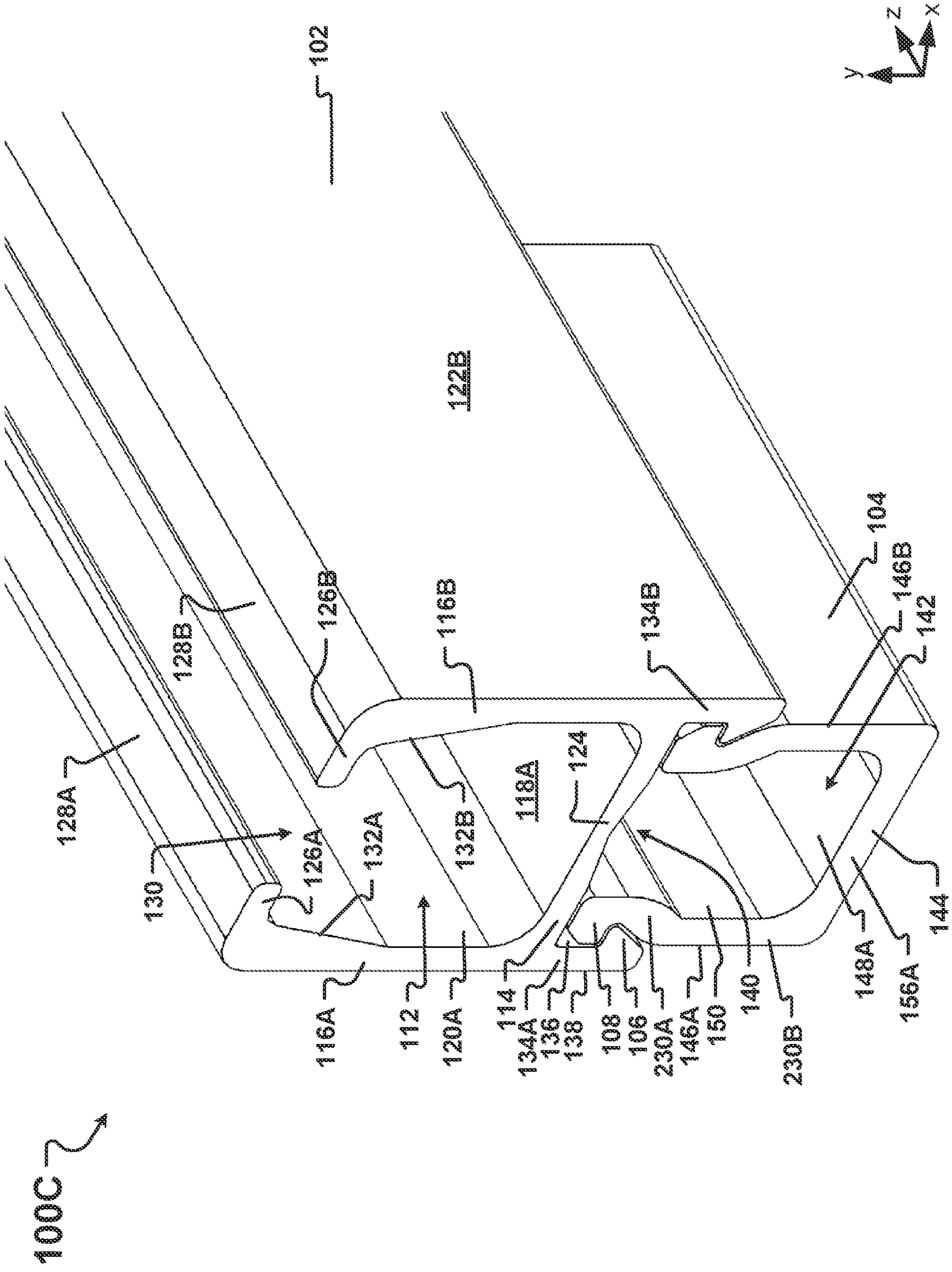
FIG. 4A is a perspective view of a torque actuated rail assembly for interconnecting structures, such as photovoltaic modules, to a metal panel defining a building surface, in accordance with one or more embodiments of the present disclosure.
Figure 4B:
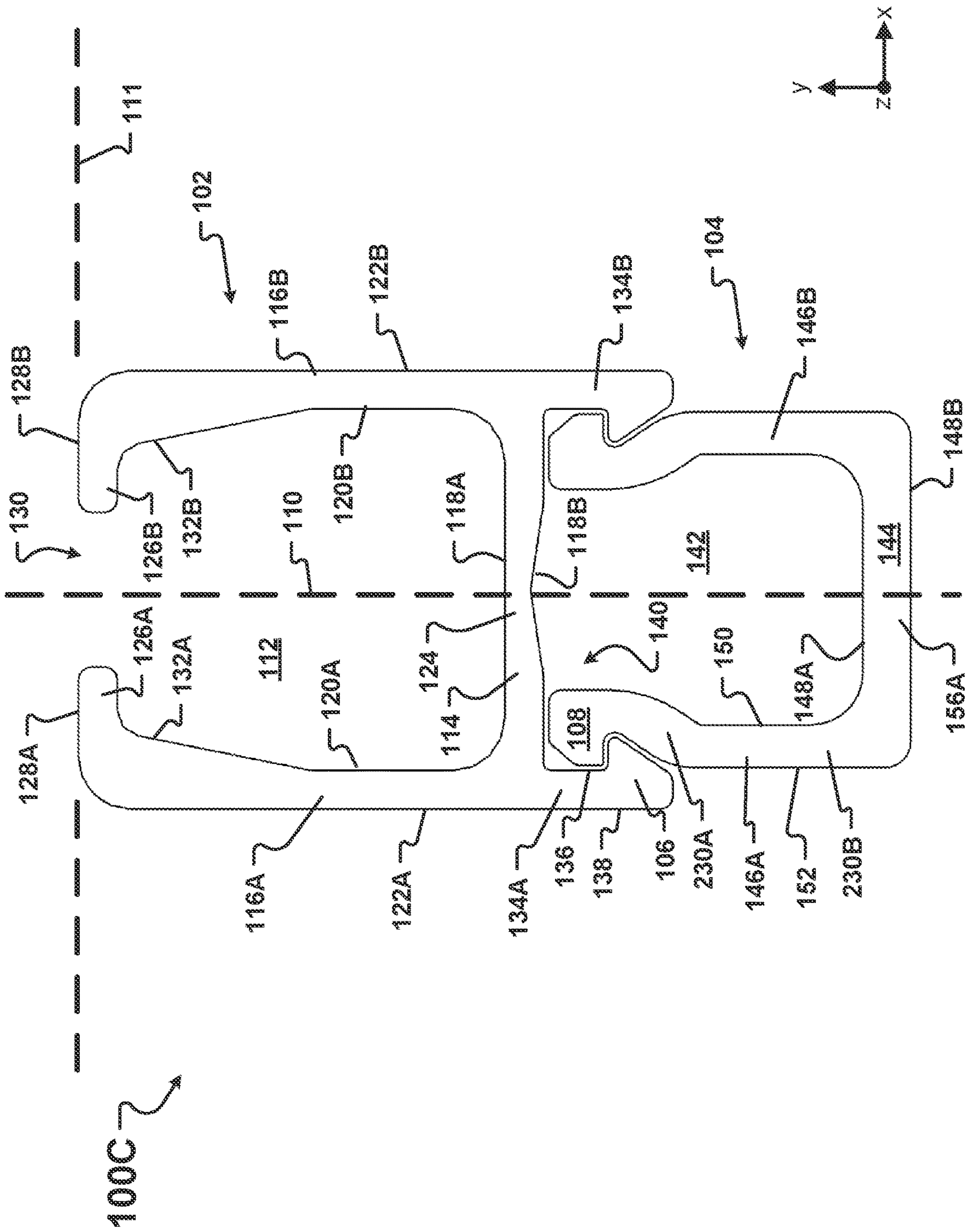
FIG. 4B is a front elevation view of the torque actuated rail assembly in FIG. 4A in a disengaged configuration, in accordance with one or more embodiments of the present disclosure.

Referring now to FIGS. 4A and 4B, another embodiment of the rail assembly 100C is generally illustrated. The rail assembly 100C includes many of the same or similar features as rail assemblies 100A, 100B and operates in the same or similar manner. As depicted in FIGS. 4A and 4B, the rail assembly 100C includes the rail 102, the lag clip 104, and is operable with the grab assembly 158 and the rail nut 160. The rail assembly 100C is configured to receive the building fastener 194 via the lag clip 104.

The rail 102 includes the rail cavity 112 formed by the rail base 114 with bendable portion 124 and the rail arms 116A, 116B, the rail protrusions 126A, 126B with exterior surfaces 128A, 128B, the sloped rail surfaces 132A, 132B, and the one or more rail hooks 106 at the end of the one or more rail legs 134.

The lag clip 104 includes the chamber 142 formed by the endwall 144 and the one or more lag clip members 146, and the one or more lag catches 108 at the end of the one or more lag clip members 146. The one or more lag catches 108 are configured to couple to and engage the one or more rail hooks 106.

The grab assembly 158 includes the rail nut 160 insertable into the rail cavity 112, and the grab 168 coupled to the rail nut 160 via a grab fastener 190. The rail nut 160 is configured to engage the sloped rail surfaces 132A, 132B when the grab fastener 190 is tightened. The grab 168 includes one or more sidewalls 180 and one or more grab protrusions 184 configured to secure a photovoltaic module 224 against the exterior surfaces 128A, 128B of the rail protrusions 126A, 126B when the grab fastener 190 is tightened.

In general, it is noted that any embodiment directed to a rail assembly 100 and/or the components of the rail assembly 100 as described throughout the disclosure should be understood as reading upon the embodiment provided in FIGS. 4A and 4B, to the extent the described embodiments do not directly conflict.

Notably, where there are multiple rail legs 134A, 134B, in some embodiments the rail legs 134A, 134B are equally spaced in the longitudinal direction X from the reference plane 110 as the first rail arm 116A and the second rail arm 116B are spaced in the longitudinal direction X. To offset this, the first lag clip member 146A and the second lag member 146B may be more narrowly spaced in the longitudinal direction X from the reference plane 110 than either the first rail arm 116A and the second rail arm 116B or the rail legs 134A, 134B are spaced in the longitudinal direction X from the reference plane 110. In some embodiments, the one or more rail arms 116A, 116B and the one or more rail legs 134 may be co-planar in the latitudinal direction Y and the extrusion direction Z.

In some embodiments, the lag clip members 146 may include at least one bend or curve inward toward the reference plane 110. For example, the first lag clip member 146A and the second lag member 146B may each include the first portion 230A set at an oblique angle to the second portion 230B. For instance, the oblique angle may be greater than ninety degrees. By way of another example, the first lag clip member 146A and the second lag member 146B may each be a curve set along a defined radius.

Figure 5A:
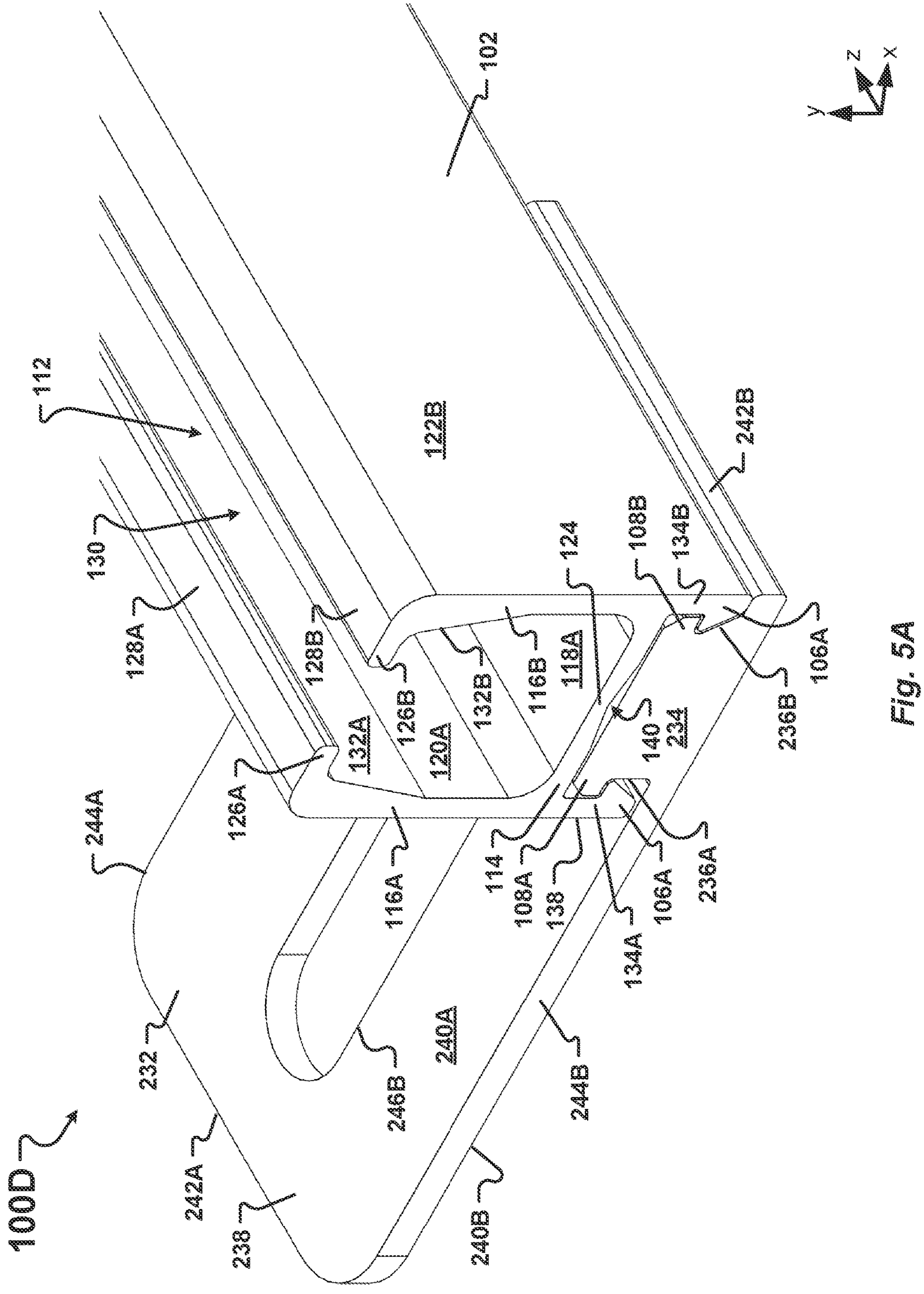
FIG. 5A is a perspective view of a torque actuated rail assembly for interconnecting structures, such as photovoltaic modules, to a metal panel defining a building surface, in accordance with one or more embodiments of the present disclosure.
Figure 5B:
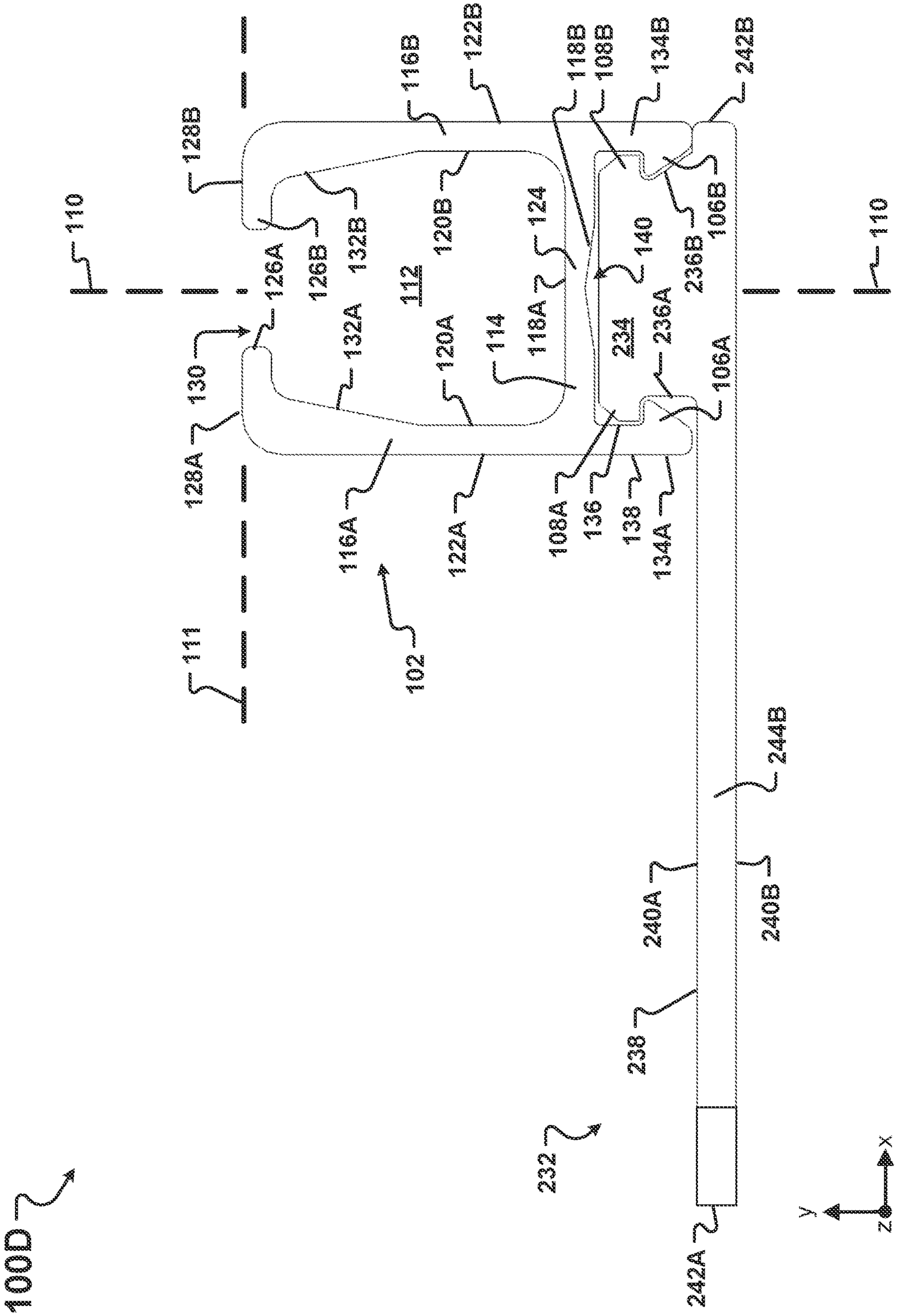
FIG. 5B is a front elevation view of the torque actuated rail assembly in FIG. 5A in a disengaged configuration, in accordance with one or more embodiments of the present disclosure.
Figure 5C:
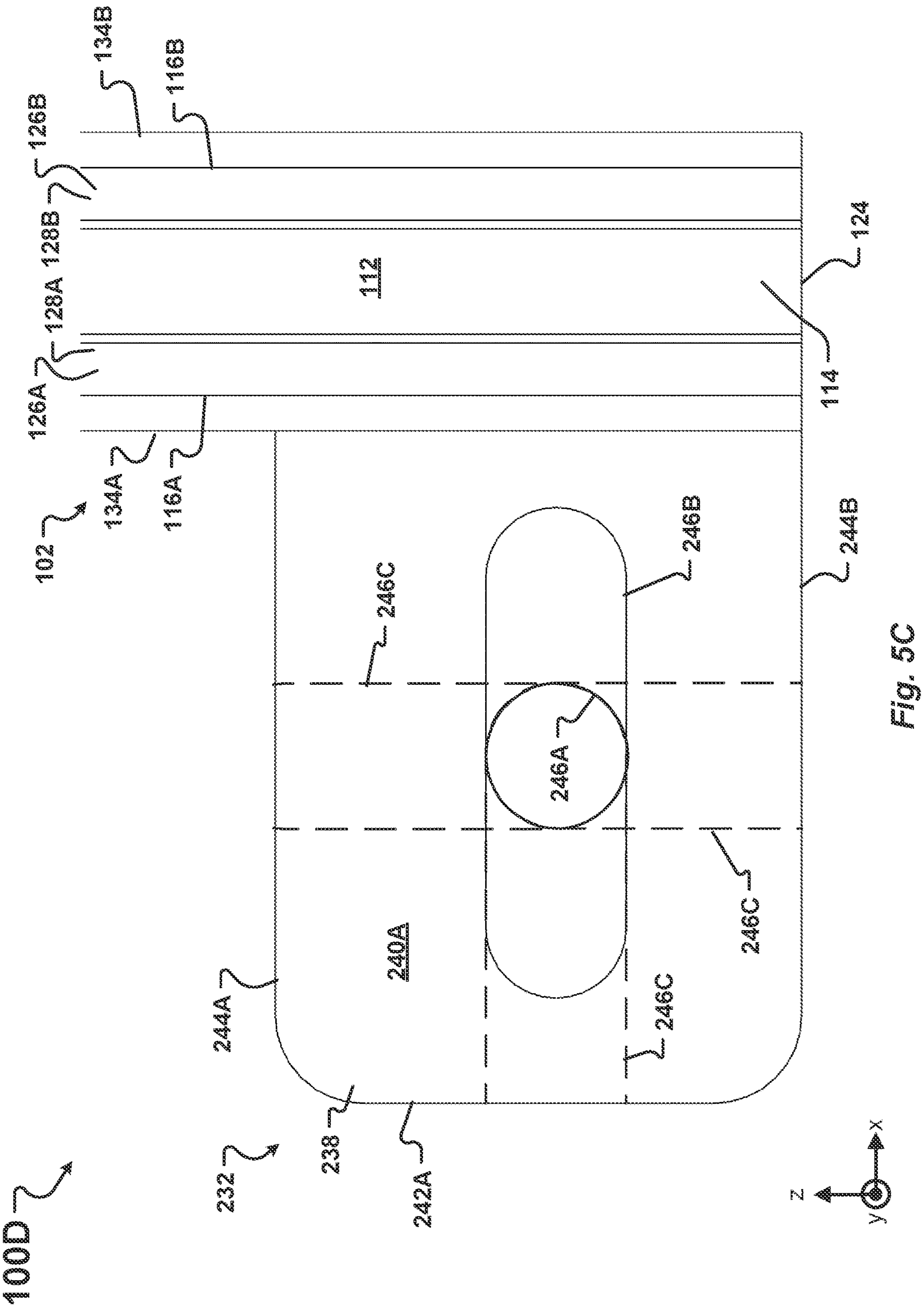
FIG. 5C is a top plan view of the torque actuated rail assembly in FIG. 5A, in accordance with one or more embodiments of the present disclosure.

Referring now to FIGS. 5A and 5B, another embodiment of the rail assembly 100D is generally illustrated. The rail assembly 100D includes many of the same or similar features as rail assemblies 100A, 100B, and 100C and operates in the same or similar manner. As depicted in FIGS. 5A and 5B, the rail assembly 100D includes the rail 102 and is operable with the grab assembly 158 and the rail nut 160. The rail 102 has features that are the same as, or similar to, other embodiments of rails 102 described herein and operates in the same or similar manner.

The rail 102 includes the rail cavity 112 formed by the rail base 114 with bendable portion 124 and the rail arms 116A, 116B, the rail protrusions 126A, 126B with exterior surfaces 128A, 128B, the sloped rail surfaces 132A, 132B, and the one or more rail hooks 106 at the end of the one or more rail legs 134.

The grab assembly 158 includes the rail nut 160 insertable into the rail cavity 112, and the grab 168 coupled to the rail nut 160 via a grab fastener 190. The rail nut 160 is configured to engage the sloped rail surfaces 132A, 132B when the grab fastener 190 is tightened. The grab 168 includes one or more sidewalls 180 and one or more grab protrusions 184 configured to secure a photovoltaic module 224 against the exterior surfaces 128A, 128B of the rail protrusions 126A, 126B when the grab fastener 190 is tightened.

In general, it is noted that any embodiment directed to a rail assembly 100 and/or the components of the rail assembly 100 as described throughout the disclosure should be understood as reading upon the embodiment provided in FIGS. 5A and 5B, to the extent the described embodiments do not directly conflict.

Notably, where there are multiple rail legs 134A, 134B, in some embodiments the rail legs 134A, 134B are equally spaced in the longitudinal direction X from the reference plane 110 as the first rail arm 116A and the second rail arm 116B are spaced in the longitudinal direction X from the reference plane 110. In some embodiments, the one or more rail arms 116A, 116B and the one or more rail legs 134 may be co-planar in the latitudinal direction Y and the extrusion direction Z.

In another embodiment, the rail assembly 100D includes a lag foot 232 in place of the lag clip 104. The lag foot 232 includes a lag body 234. The lag body 234 extends in the latitudinal direction Y and has a first surface 236A and a second surface 236B oppositely disposed from the first surface 236A. In some embodiments, the first surface 236A may be described as extending approximately parallel to the reference plane 110. Optionally, the second surface 236B is oriented at an oblique angle relative to the first surface 236A. It is noted the lag foot 232 may be operable with any rail 102 instead of or in addition to the lag clip 104 of the various rail assemblies as described throughout the present disclosure.

In another embodiment, the one or more lag catches 108 are disposed on the surfaces 236. For example, in some embodiments each surface 236A, 236B includes a lag catch 108A, 108B respectively. Each lag catch 108 extends away in the longitudinal direction X from a surface 236. For example, in some embodiments each lag catch 108 extends outwardly from the surfaces 236 (or away from reference plane 110).

In another embodiment, the lag foot 232 includes a lag plate 238. The lag plate 238 extends in the longitudinal direction X and has a first surface 240A, a second surface 240B opposite disposed from the first surface 240A, a first edge 242A, a second edge 242B oppositely disposed from the first edge 242A, a first end 244A, and a second end 244B oppositely disposed from the first end 244A. For example, the first edge 242A and the second edge 242B may be described as extending approximately parallel to the reference plane 110. By way of another example, the first end 244A and the second end 244B may be described as extending approximately perpendicular to the reference plane 110. In some embodiments, the lag body 234 may be disposed on (or extend above) the first lag plate surface 240A at a position proximate to the second edge 242B on the lag plate 238. In some embodiments, the lag foot 232 may include fillets or chamfers between the lag body 234 and the lag plate 238. Optionally, fillets or chamfers are positioned between the first surface 236A and/or the second surface 236B of the lag body 234 and the lag plate surface 240A of the lag plate 238.

In another embodiment, the lag foot 232 includes a lag foot aperture 246 which passes through the lag plate 238. It is noted the aperture 246 as described herein may be formed with a manufacturing process performed following the extrusion process to form the lag body 234 with one or more lag catches 108 and the lag plate 238.

In some embodiments, the lag foot aperture 246 may be fully contained within a perimeter defined by the lag plate 238. For example, the lag foot aperture 246 may be a round lag foot aperture 246A or an elongated lag foot aperture 246B. For instance, neither the round lag foot aperture 246A nor the elongated lag foot aperture 246B extends to either the first edge 242A, the second edge 242B of the lag plate 238, or the ends 244A, 244B.

In other embodiments, the lag foot 232 may have an elongated aperture slot 246C that exceeds the perimeter defined by the lag plate 238. For example, the elongated aperture slot 246C may exceed the perimeter defined by the lag plate 238 in a longitudinal direction X and pass through the first edge 242A of the lag plate 238. By way of another example, the elongated aperture slot 246C may exceed the perimeter defined by the lag plate 238 in an extrusion direction Z and pass through the first end 244A or the second end 244B of the lag plate 238.

Figure 6A:
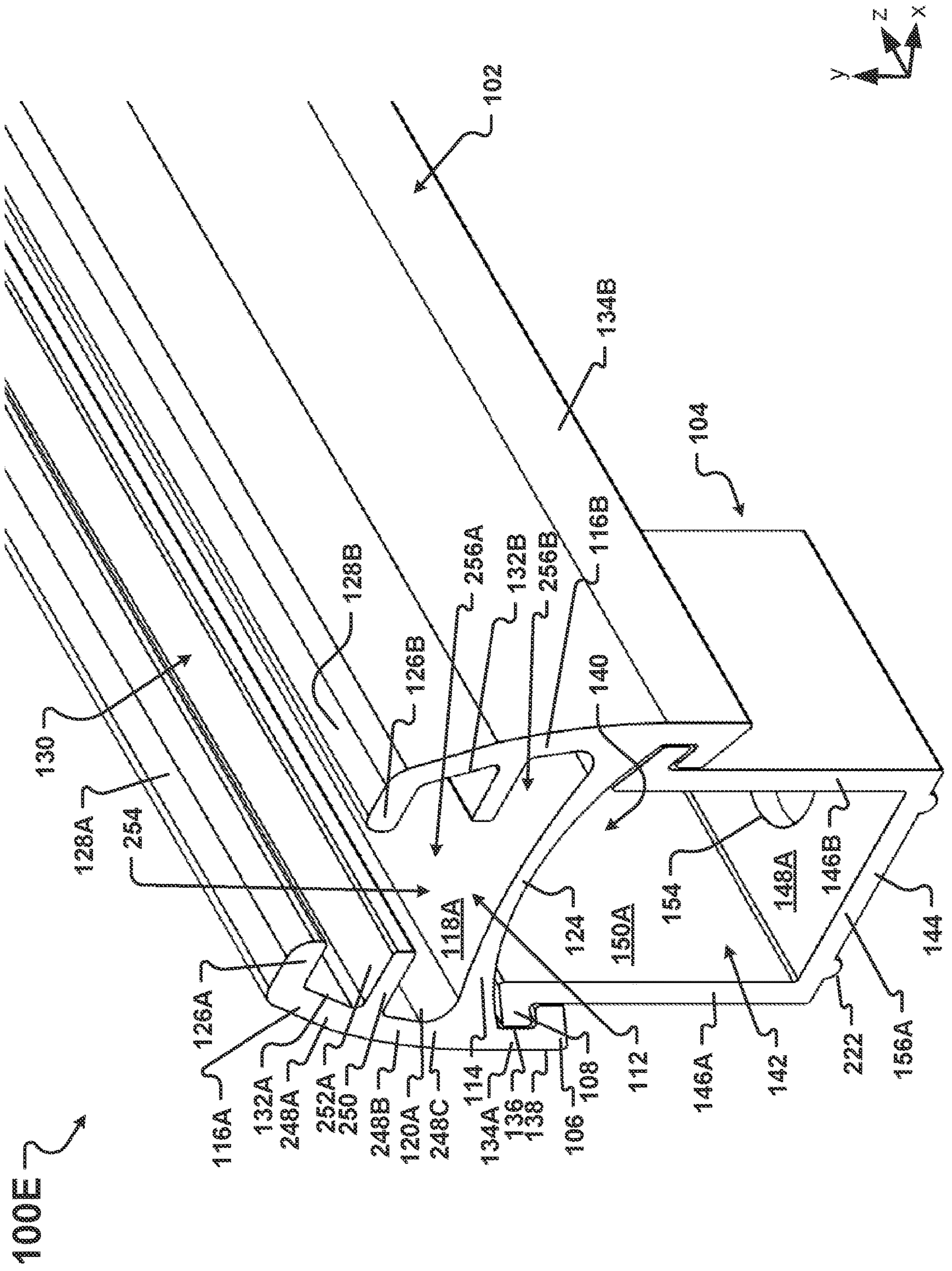
FIG. 6A is a perspective view of a torque actuated rail assembly for interconnecting structures, such as photovoltaic modules, to a metal panel defining a building surface, in accordance with one or more embodiments of the present disclosure.
Figure 6B:
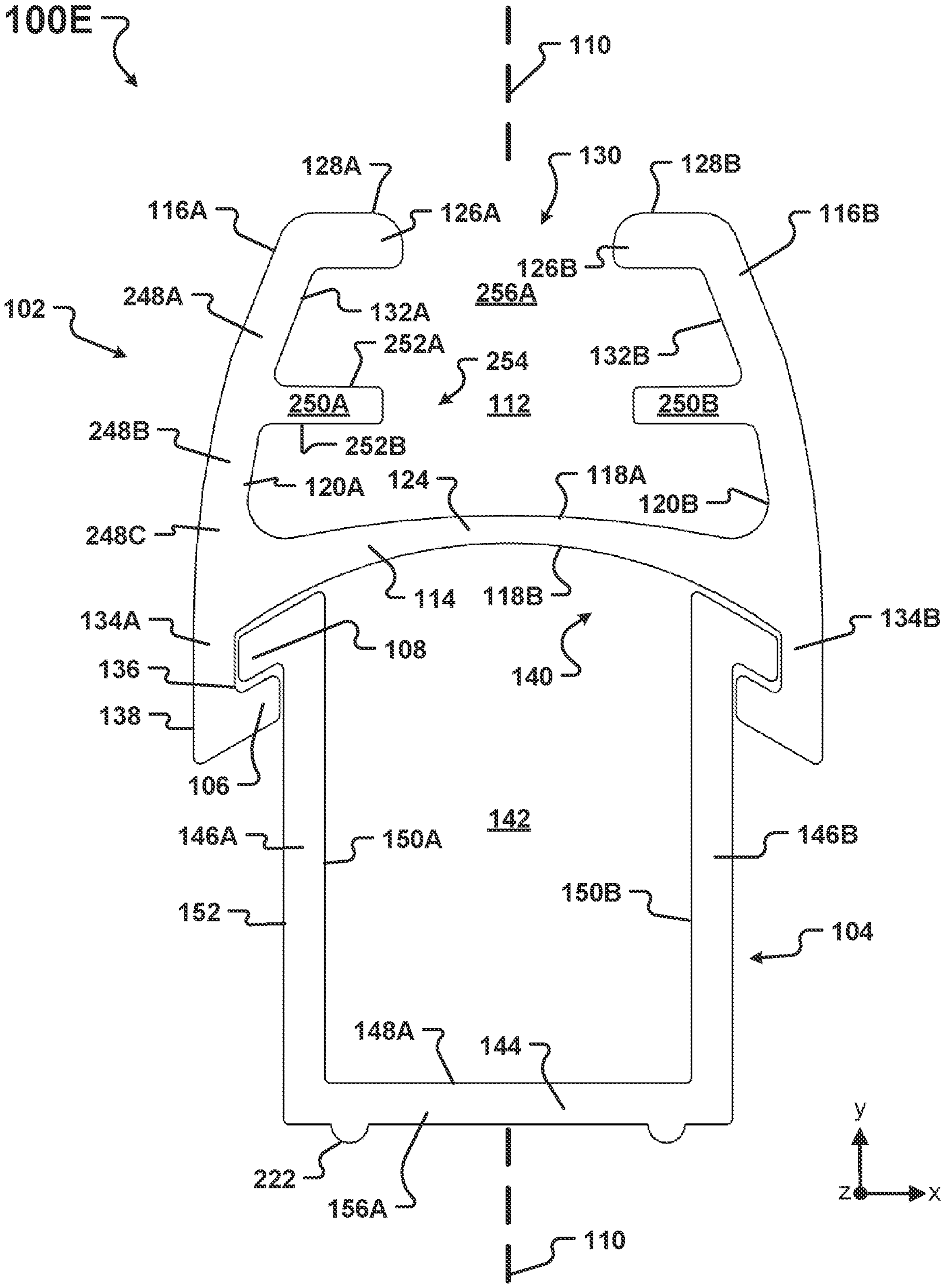
FIG. 6B is a front elevation view of the torque actuated rail assembly in FIG. 6A in a disengaged configuration, in accordance with one or more embodiments of the present disclosure.

Referring now to FIGS. 6A and 6B, another embodiment of the rail assembly 100E is generally illustrated. The rail assembly 100E includes many of the same or similar features as the rail assemblies 100A, 100B, 100C, and 100D and operates in a similar manner. As depicted in FIGS. 6A and 6B, the rail assembly 100E includes the rail 102, the lag clip 104, and is operable with the grab assembly 158 and the rail nut 160. The rail assembly 100E is configured to receive the building fastener 194 via the lag clip 104. The rail 102 includes the rail cavity 112 formed by the rail base 114 with bendable portion 124 and the rail arms 116A, 116B, the rail protrusions 126A, 126B with exterior surfaces 128A, 128B, the sloped rail surfaces 132A, 132B, and the one or more rail hooks 106 at the end of the one or more rail legs 134.

The lag clip 104 includes the chamber 142 formed by the endwall 144 and the one or more lag clip members 146, and the one or more lag catches 108 at the end of the one or more lag clip members 146. The one or more lag catches 108 are configured to couple to and engage the one or more rail hooks 106.

The grab assembly 158 includes the rail nut 160 insertable into the rail cavity 112, and the grab 168 coupled to the rail nut 160 via a grab fastener 190. The rail nut 160 is configured to engage the sloped rail surfaces 132A, 132B when the grab fastener 190 is tightened. The grab 168 includes one or more sidewalls 180 and one or more grab protrusions 184 configured to secure a photovoltaic module 224 against the exterior surfaces 128A, 128B of the rail protrusions 126A, 126B when the grab fastener 190 is tightened.

In general, it is noted that any embodiment directed to a rail assembly 100 and/or the components of the rail assembly 100 as described throughout the disclosure should be understood as reading upon the embodiment of the rail assembly 100E provided in FIGS. 6A and 6B, to the extent the described embodiments do not directly conflict.

Notably, in one embodiment the rail base 114 is contoured with an arch or scalloped area extending into the second surface 118B to define the bendable portion 124 (e.g., in the second surface 118B opposite the first surface 118A from which the first rail arm 116A and the second rail arm 116B extend in the latitudinal direction Y). For example, the contouring may be such that the arch extends above an approximately horizontal plane defined in the longitudinal direction X and the extrusion direction Z of the rail base 114. For instance, the contouring of the first surface 118A and the contouring of the second surface 118B may include respective non-concentric arcs which do not share a common reference center.

In another embodiment, the first rail arm 116A and the second rail arm 116B include at least one bend or curve inward toward the reference plane 110 between the rail base 114 and the rail protrusions 126A, 126B respectively. For example, the first rail arm 116A and the second rail arm 116B may each include a first portion 248A set at an angle to a second portion 248B, which is itself set to a second angle to a third portion 248C. For instance, the first angle and/or the second angle may be greater than ninety degrees. In addition, the first angle may be the same as the second angle, or alternatively the first angle may be different from the second angle.

By way of another example, the first rail arm 116A and the second rail arm 116B may each be a curve set along a defined radius. In some embodiments, at least one portion 248 of the first rail arm 116A and the second rail arm 116B may be co-planar in the latitudinal direction Y and the extrusion direction Z with the one or more rail legs 134. In some embodiments, the one or more lag clip members 146 may be more narrowly spaced in the longitudinal direction X from the reference plane 110 than either at least one portion 248 of the first rail arm 116A and the second rail arm 116B or the rail legs 134A, 134B are spaced in the longitudinal direction X from the reference plane 110.

In another embodiment, the rail 102 includes one or more tabs 250. The one or more tabs 250 include a first surface 252A and a second surface 252B. The one or more tabs 250 extend in the longitudinal direction X in the rail cavity 112 from the interior surfaces 120A, 120B and toward the reference plane 110. In some embodiments, where there are multiple tabs 250A, 250B extending in the longitudinal direction X in the rail cavity 112 from the interior surfaces 120A, 120B respectively, the tabs 250A, 250B may be oppositely disposed. The multiple tabs 250A, 250B may be separated by a tab slot 254, and the tabs 250A, 250B may separate the rail cavity 112 into a first cavity portion 256A and a second portion 256B. The first cavity portion 256A is between the rail protrusions 126 and the tabs 250. The second cavity portion 256B is between the tabs 250 and the rail base 114.

The first cavity portion 256A may define a receptacle for the rail nut 160. For example, the first surfaces 252A of the tabs 250A, 250B may retain the rail nut 160 proximate to the rail protrusions 126A, 126B in the first portion 256A when the rail nut 160 is inserted in the rail cavity 112. The grab fastener 190 may pass through the tab slot 254 into the second portion 256B. In this manner, the rail nut 160 is maintained proximate to a position of use for engagement with the grab fastener 190.

Figure 7A:
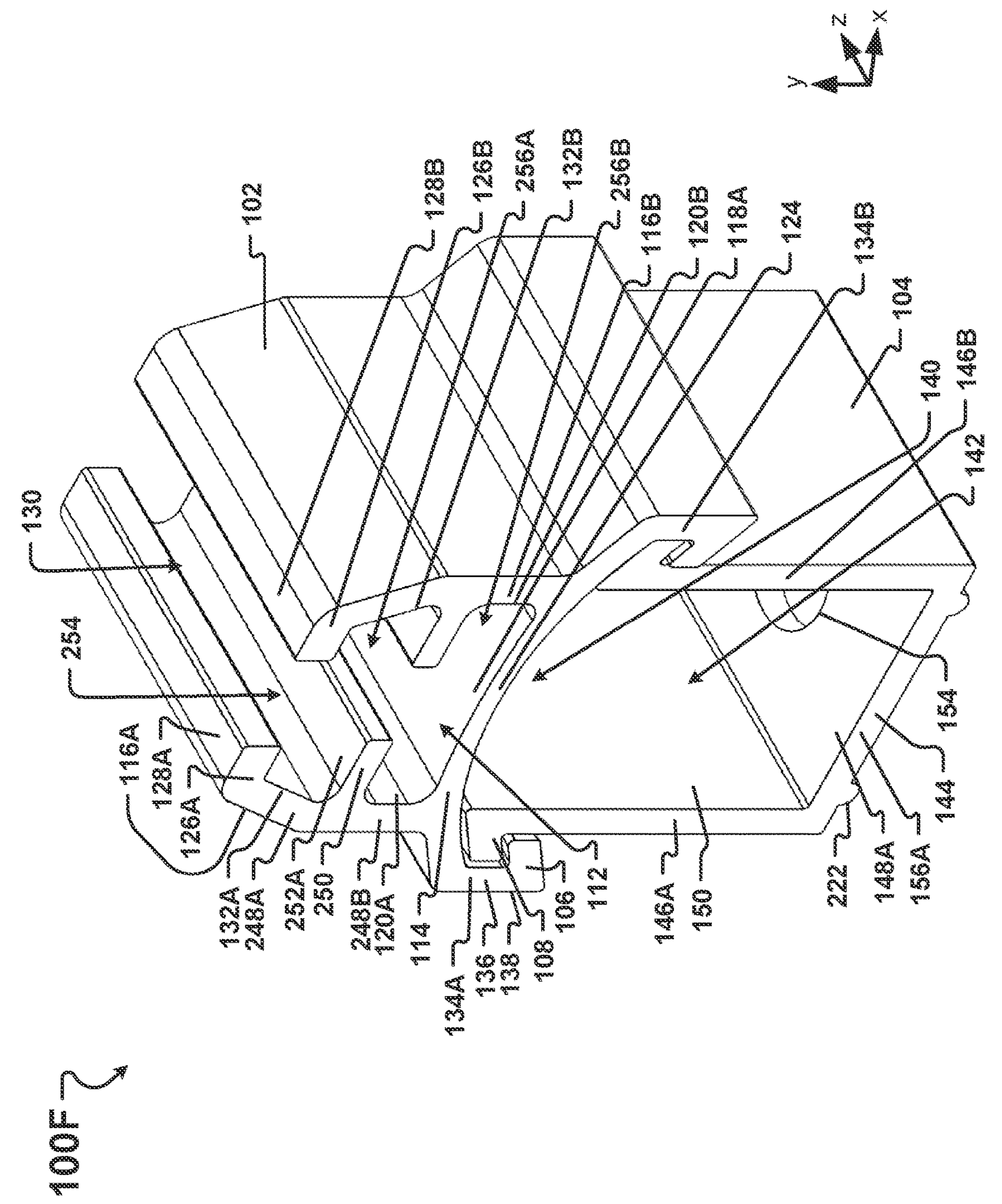
FIG. 7A is a perspective view of a torque actuated rail assembly for interconnecting structures, such as photovoltaic modules, to a metal panel defining a building surface, in accordance with one or more embodiments of the present disclosure.
Figure 7B:
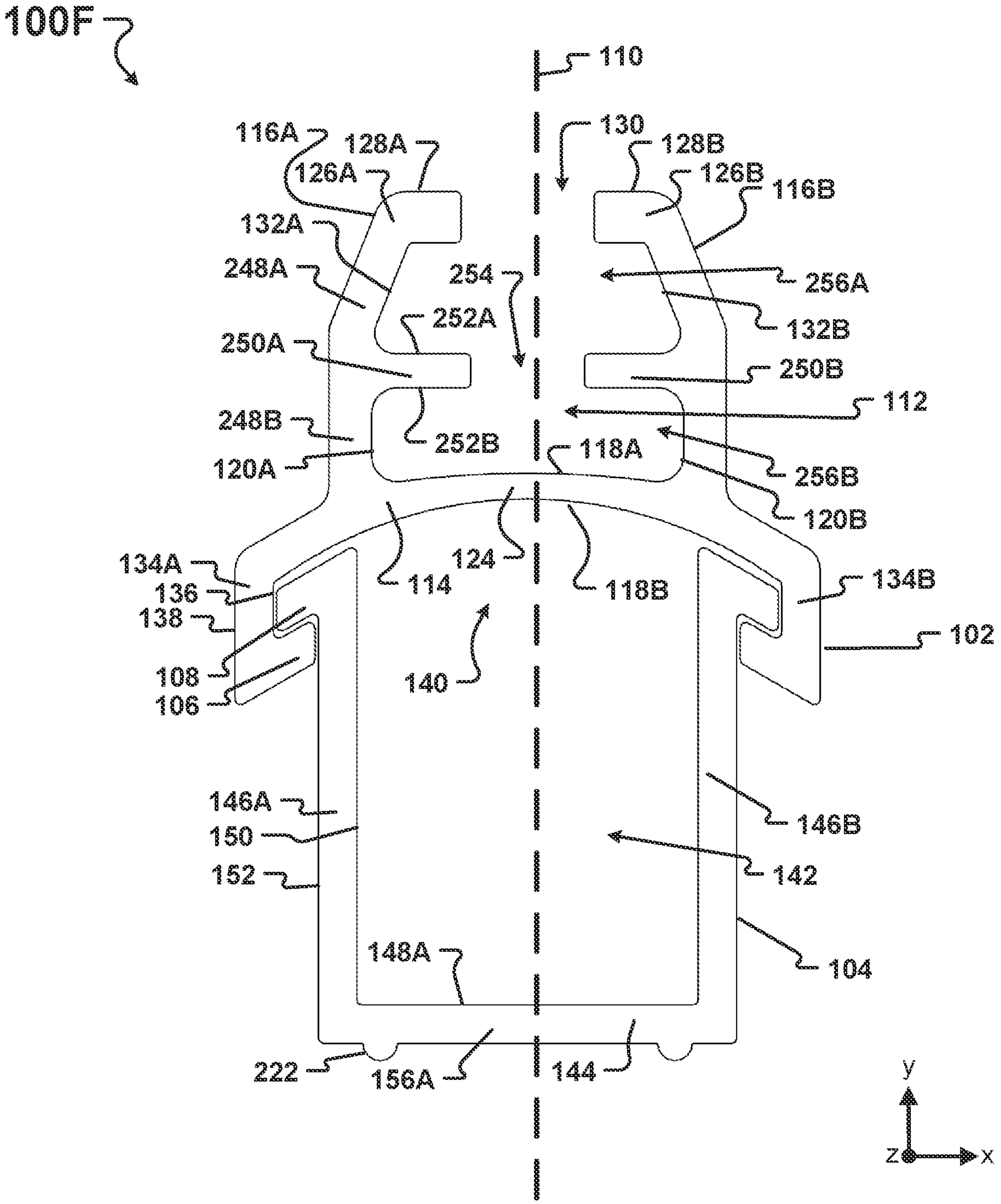
FIG. 7B is a front elevation view of the torque actuated rail assembly in FIG. 7A in a disengaged configuration, in accordance with one or more embodiments of the present disclosure.

Referring now to FIGS. 7A and 7B, another embodiment of the rail assembly 100F is generally illustrated. The rail assembly 100F includes features that are the same as or similar to the features of rail assemblies 100A, 100B, 100C, 100D, and 100E and operates in the same or similar manner.

As depicted in FIGS. 7A and 7B, the rail assembly 100F includes the rail 102, the lag clip 104, and is operable with the grab assembly 158 and the rail nut 160. The rail assembly 100F is configured to receive the building fastener 194 via the lag clip 104. The rail 102 includes the rail cavity 112 formed by the rail base 114 with bendable portion 124 and the rail arms 116A, 116B, the rail protrusions 126A, 126B with exterior surfaces 128A, 128B, the sloped rail surfaces 132A, 132B, and the one or more rail hooks 106 at the end of the one or more rail legs 134.

The lag clip 104 includes the chamber 142 formed by the endwall 144 and the one or more lag clip members 146, and the one or more lag catches 108 at the end of the one or more lag clip members 146. The one or more lag catches 108 are configured to couple to and engage the one or more rail hooks 106.

The grab assembly 158 includes the rail nut 160 insertable into the rail cavity 112, and the grab 168 coupled to the rail nut 160 via a grab fastener 190. The rail nut 160 is configured to engage the sloped rail surfaces 132A, 132B when the grab fastener 190 is tightened. The grab 168 includes one or more sidewalls 180 and one or more grab protrusions 184 configured to secure a photovoltaic module 224 against the exterior surfaces 128A, 128B of the rail protrusions 126A, 126B when the grab fastener 190 is tightened.

In general, it is noted that any embodiment directed to a rail assembly 100 and/or the components of the rail assembly 100 as described throughout the disclosure should be understood as reading upon the embodiment of the rail assembly 100F provided in FIGS. 7A and 7B, to the extent the described embodiments do not directly conflict.

Notably, in one embodiment the rail base 114 is contoured with an arch or scalloped area extending into the second surface 118B to define the bendable portion 124 (e.g., in the second surface 118B opposite the first surface 118A from which the first rail arm 116A and the second rail arm 116B extend in the latitudinal direction Y). For example, the contouring may be such that the arch extends above an approximately horizontal plane defined in the longitudinal direction X and the extrusion direction Z of the rail base 114. The contouring of the first surface 118A and the contouring of the second surface 118B may include respective non-concentric arcs which do not share a common reference center.

In another embodiment, the first rail arm 116A and the second rail arm 116B include at least one bend or curve inward toward the reference plane 110 between the rail base 114 and the rail protrusions 126A, 126B respectively. For example, the first rail arm 116A and the second rail arm 116B may each include the first portion 248A set at an angle to the second portion 248B. For instance, the first angle may be greater than ninety degrees. By way of another example, the first rail arm 116A and the second rail arm 116B may each be a curve set along a defined radius. In some embodiments, the rail legs 134A, 134B may be more spaced further apart in the longitudinal direction X from the reference plane 110 than the first rail arm 116A and the second rail arm 116B or the rail legs 134A, 134B are spaced in the longitudinal direction X from the reference plane 110. In some embodiments, at least one portion 248B of the first rail arm 116A and the second rail arm 116B may be co-planar in the latitudinal direction Y and the extrusion direction Z with the one or more rail clip member 146.

In another embodiment, the rail 102 includes one or more tabs 250. The one or more tabs 250 include a first surface 252A and a second surface 252B. The one or more tabs 250 extend in the longitudinal direction X in the rail cavity 112 from the interior surfaces 120A, 120B and toward the reference plane 110. In some embodiments, where there are multiple tabs 250A, 250B extending in the longitudinal direction X in the rail cavity 112 from the interior surfaces 120A, 120B respectively, the tabs 250A, 250B may be oppositely disposed. The multiple tabs 250A, 250B may be separated by a tab slot 254, and the tabs 250A, 250B may separate the rail cavity 112 into a first cavity portion 256A and a second portion 256B.

The first cavity portion 256A may be described as a nut retention slot for the rail nut 160. For example, the first surface 252A of the tabs 250A, 250B may retain the rail nut 160 proximate to the rail protrusions 126A, 126B in the first portion 256A when the rail nut 160 is inserted in the rail cavity 112, and the grab fastener 190 may pass through the tab slot 254 into the second portion 256B.

Advantages of the present disclosure include a torque actuated rail assembly. Advantages of the present disclosure also include a rail and lag clip or lag foot of the rail assembly. Advantages of the present disclosure also include a grab assembly of the rail assembly. Advantages of the present disclosure also include the grab assembly and the rail being configured to receive a portion of a photovoltaic module, the lag clip being configured to receive a building fastener, and the rail assembly being configured to secure the photovoltaic module to a building surface including trapezoidal ribs. Embodiments of the present disclosure are also directed to one or more rail hooks of the rail being configured to couple to one or more lag catches of the lag rail or lag foot. Advantages of the present disclosure also include the one or more rail hooks of the rail being configured to engage the one or more lag catches of the lag rail or lag foot through an application of force to the grab assembly and the transfer of that force to sloped rail surfaces of the rail, where engaging the sloped rail surfaces causes the one or more rail hooks to press against the one or more lag catches.

In this regard, the present disclosure provides a solution to a long-felt but unsolved need regarding installation of structures on building surfaces including trapezoidal ribs with mounting assemblies, without damaging the building surfaces with the mounting assemblies. The rail assembly as described throughout the disclosure may be capable of coupling to a building surface while preventing damage caused by installing additional screws in the building surface and without creating new penetrations through the building surface. The rail assembly as described throughout the disclosure may be capable of securing the photovoltaic module to the building surface without damaging or otherwise interfering with the operation of the photovoltaic module.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. Further, it is to be understood that the claims are not necessarily limited to the specific features or steps described herein. Rather, the specific features and steps are disclosed as embodiments of implementing the claimed systems and methods.

To provide additional background, context, and to further satisfy the written description requirements of 35 U.S.C. § 112, the following references are incorporated by reference herein in their entireties: U.S. Pat. Nos. 7,758,011, 9,085,900, 9,611,652, 10,443,896, 10,903,785, and PCT Publication WO 2019/074956.

What is claimed is:

1. A torque actuated rail assembly selectively securable to a building surface, comprising:

a rail, comprising:

a rail base;

two rail arms extending in a first latitudinal direction from the rail base, each rail arm including a sloped rail surface proximate to a rail protrusion, each rail protrusion including an exterior rail surface, wherein the two rail arms are operable to transition from a first configuration to a second configuration following an application of a force to the sloped rail surfaces causing the rail base to bend; and two rail legs extending in a second latitudinal direction from the rail base, each rail leg including a rail hook, each rail hook extending inwardly; and a lag clip, comprising:

an endwall; and a first lag clip member and a second lag clip member extending in the first latitudinal direction from the endwall, each lag clip member including a lag catch, each lag catch extending outwardly, wherein the rail hooks are operable to couple to the lag catches, wherein the rail is disengageable from the lag clip when the two rail arms are in the first configuration, and wherein the rail is engaged to the lag clip when the two rail arms are in the second configuration and the rail hooks move inwardly and press into the lag catches.

2. The rail assembly of claim 1, wherein the rail and the lag clip are fabricated from extruded aluminum.

3. The rail assembly of claim 1, wherein a reference plane defined by a latitudinal axis and an extrusion axis bisects the rail base, and wherein the two rail arms are approximately parallel to the reference plane in the first configuration, and wherein the two rail arms are set at an acute angle to the reference plane in the second configuration.

4. The rail assembly of claim 1, wherein the two rail legs are spaced farther apart in a longitudinal direction than the two rail arms.

5. The rail assembly of claim 1, further comprising a grab assembly, comprising:

a rail nut positionable within a rail cavity defined by the rail base and the two rail arms, the rail nut including a rail nut aperture;

a grab positionable a select latitudinal distance from the exterior rail surface of each rail protrusion, the grab including a grab aperture; and a grab fastener extendable through the grab aperture and through the rail nut aperture to selectively couple the rail nut to the grab, wherein an application of torque to the grab fastener draws the rail nut from a first latitudinal position within the rail cavity in the first configuration to a second latitudinal position within the rail cavity in the second configuration, the second latitudinal position being closer to the rail protrusions than the first latitudinal position, wherein the force is applied by the rail nut to the sloped rail surfaces when the rail nut is in the second latitudinal position to cause the rail base to bend.

6. The rail assembly of claim 5, wherein the grab comprises:

a grab body;

a first sidewall and a second sidewall extending in a latitudinal direction from the grab body, the first sidewall having a first exterior surface and the second sidewall having a second exterior surface, wherein the grab aperture is positioned between the first and second sidewalls;

a first grab protrusion extending from the grab body and away from the first exterior surface, the first grab protrusion having a first grab surface, wherein the first grab surface and the first exterior surface define a first cavity for a first building accessory; and a second grab protrusion extending from the grab body and away from the second exterior surface, the second grab protrusion having a second grab surface, wherein the second grab surface and the second exterior surface define a second cavity for a second building accessory.

7. The rail assembly of claim 5, further comprising a second lag clip and a second grab assembly, wherein the second lag clip and the second grab assembly are spaced on the rail a select distance from the lag clip and the grab assembly.

8. The rail assembly of claim 1, wherein the lag clip comprises a lag clip aperture extending through the endwall that is configured to receive a building fastener to secure the lag clip to the building surface.

9. The rail assembly of claim 8, further comprising a gasket selectively positionable between an exterior surface of the endwall of the lag clip and the building surface when the lag clip is coupled to the building surface via the building fastener.

10. The rail assembly of claim 9, wherein the exterior surface of the lag clip endwall comprises two gasket protrusions configured to confine the gasket in a select position proximate to the lag clip aperture.

11. The rail assembly of claim 1, wherein:

in the first configuration, the rail protrusions of the two rail arms are separated by a first distance to define a rail extrusion slot; and in the second configuration, the rail protrusions are separated by a second distance that is greater than the first distance.

12. The rail assembly of claim 11, wherein:

in the first configuration, the rail hooks of the two rail legs are separated by a third distance; and in the second configuration, the rail hooks are separated by a fourth distance that is less than the third distance.

13. The rail assembly of claim 12, wherein:

in the first configuration, the lag catches of the first and second lag clip members are separated by a fifth distance; and in the second configuration, the lag catches are pressed inwardly by the rail hooks such that the lag catches are separated by a sixth distance that is less than the fifth distance.

14. The rail assembly of claim 1, wherein the rail base comprises a scalloped area that defines a bendable section of the rail base, wherein the two rail arms extend away from a first surface of the rail base, and wherein the scalloped area extends into a second surface of the rail base.

15. The rail assembly of claim 1, wherein:

in the first configuration, the rail base has a first shape; and in the second configuration, the rail base has a second shape that is different from the first shape.

16. A system to couple a photovoltaic module to a rib of a building surface, comprising:

a rail with a rail hook;

a lag clip with an aperture and a lag catch configured to couple to the rail hook, wherein the lag clip is configured to couple to the rib of the building surface when a building fastener is extended through the aperture and into a fastener aperture in the rib; and a grab assembly configured to cause the rail hook to engage with the lag catch following an application of a force, wherein the grab assembly and the rail are configured to position the photovoltaic module a select distance above the building fastener.

17. The system of claim 16, the rail comprising:

a rail base;

an arm extending in a first latitudinal direction away from a first surface of the rail base, the arm including a sloped rail surface proximate to a rail protrusion, the protrusion including an exterior rail surface; and a leg extending in a second latitudinal direction away from a second surface of the rail base, the leg including the rail hook, wherein the rail hook extends toward the rail base.

18. The system of claim 17, the lag clip comprising:

an endwall with an exterior surface that defines a reference plane; and a lag clip member extending from the endwall and including the lag catch, the lag catch extending away from an outer surface of the lag clip member and toward the reference plane, wherein the rail is disengaged and movable relative to the lag clip when the arm is in a first configuration, wherein the rail is engaged and fixed relative to the lag clip when the arm is in a second configuration, wherein the arm is configured to transition between the first configuration and the second configuration following the application of the force by the grab assembly to the sloped rail surface which causes the rail base to bend.

19. The system of one of claim 18, the grab assembly comprising:

a rail nut selectively positioned within a rail cavity of the rail, the rail nut including a rail nut aperture;

a grab of the grab assembly selectively spaced a select distance from the exterior rail surface of the rail protrusion, the grab including a grab aperture; and a grab fastener extendable through the grab aperture to threadably engage the rail nut aperture to selectively couple the grab to the rail nut, wherein an application of torque to the grab fastener draws the rail nut from a first position within the rail cavity in the first configuration to a second position within the rail cavity in the second configuration to cause the rail nut to engage the sloped rail surface and to apply the force to the sloped rail surface.

20. A torque actuated rail assembly selectively securable to a surface of a building, comprising:

a rail, comprising:

a rail base;

two rail arms extending in a first latitudinal direction from the rail base, each rail arm including a sloped rail surface proximate to a rail protrusion, each rail protrusion including an exterior rail surface, wherein the two rail arms are configured to transition from a first configuration to a second configuration following an application of a force to the sloped rail surfaces causing the rail base to bend; and two rail legs extending in a second latitudinal direction from the rail base, each rail leg including a rail hook, each rail hook extending inwardly; and a lag foot, comprising:

a lag plate; and a lag body extending from the lag plate and including: a first surface with a first lag catch facing in a first longitudinal direction; and a second surface with a second lag catch facing in a second longitudinal direction opposite to the first longitudinal direction;

wherein the rail hooks are operable to couple to the lag catches, wherein the rail is disengaged from the lag foot when the two rail arms are in the first configuration and the rail hooks disengage from the lag catches, and wherein the rail is engaged to the lag foot when the two rail arms are in the second configuration and the rail hooks move inwardly and press into the first and second lag catches.

* * * * *